United States Patent [19]
Gould et al.

[11] Patent Number: 5,428,707
[45] Date of Patent: Jun. 27, 1995

[54] APPARATUS AND METHODS FOR TRAINING SPEECH RECOGNITION SYSTEMS AND THEIR USERS AND OTHERWISE IMPROVING SPEECH RECOGNITION PERFORMANCE

[75] Inventors: Joel M. Gould, Winchester; Elizabeth E. Steele, Brookline; James K. Baker, West Newton, all of Mass.

[73] Assignee: Dragon Systems, Inc., Newton, Mass.

[21] Appl. No.: 976,413

[22] Filed: Nov. 13, 1992

[51] Int. Cl.⁶ .............................................. G10L 9/00
[52] U.S. Cl. .................................... 395/2.4; 395/2.6; 395/2.64
[58] Field of Search .................................. 381/41–45; 395/2, 2.4, 2.6, 2.64

[56] References Cited

U.S. PATENT DOCUMENTS

| | | | |
|---|---|---|---|
| 4,297,528 | 10/1981 | Beno | 179/1 SB |
| 4,336,421 | 6/1982 | Welch et al. | 179/1 SD |
| 4,394,538 | 7/1983 | Warren et al. | 179/1 SD |
| 4,439,161 | 3/1984 | Wiggins et al. | 434/201 |
| 4,509,133 | 4/1985 | Monbaron et al. | 364/513.5 |
| 4,651,289 | 3/1987 | Maeda et al. | 364/513.5 |
| 4,677,673 | 6/1987 | Ukita et al. | 381/43 |
| 4,720,863 | 1/1988 | Li et al. | 381/42 |
| 4,731,845 | 3/1988 | Matsuki et al. | 381/43 |
| 4,751,737 | 6/1988 | Gerson et al. | 381/43 |
| 4,776,016 | 10/1988 | Hansen | 381/43 |
| 4,783,803 | 11/1988 | Baker et al. | 381/42 |
| 4,829,575 | 5/1989 | Lloyd | 381/43 |
| 4,831,653 | 5/1989 | Katayama | 381/43 |
| 4,833,713 | 5/1989 | Muroi et al. | 381/43 |
| 4,837,830 | 6/1989 | Wrench, Jr. et al. | 381/42 |
| 4,837,831 | 6/1989 | Gillick et al. | 381/43 |
| 4,866,778 | 9/1989 | Baker | 381/43 |
| 4,903,305 | 2/1990 | Gillick et al. | 381/41 |
| 4,903,306 | 2/1990 | Nakamura | 381/42 |
| 4,964,077 | 10/1990 | Eisen et al. | 364/900 |
| 4,975,959 | 12/1990 | Benbassat | 381/41 |
| 4,979,213 | 12/1990 | Nitta | 381/43 |
| 4,994,983 | 2/1991 | Landell et al. | 364/513.5 |
| 5,003,603 | 3/1991 | Searcy et al. | 381/43 |
| 5,027,406 | 6/1991 | Roberts et al. | 381/43 |
| 5,036,539 | 7/1991 | Wrench, Jr. et al. | 381/43 |
| 5,065,431 | 11/1991 | Rollett | 381/43 |
| 5,097,509 | 3/1992 | Lennig | 381/43 |
| 5,122,972 | 6/1992 | Richards et al. | 395/157 |
| 5,123,086 | 6/1992 | Tanaka et al. | 395/155 |
| 5,136,654 | 8/1992 | Ganong, III et al. | 381/41 |
| 5,146,503 | 9/1992 | Cameron et al. | 381/43 |

*Primary Examiner*—Allen R. MacDonald
*Assistant Examiner*—Michelle Doerrler
*Attorney, Agent, or Firm*—Edward W. Porter

[57] ABSTRACT

A tutorial instructs how to use a word recognition system, such as one for speech recognition. It specifies a set of allowed response words for each of a plurality of states. It sends messages on how to use the recognizer in certain states, and, in others, presents exercises in which the user is to enter signals representing expected words. It scores each such signal against word models to select which response word corresponds to it, and then advances to a state associated with that selected response. This scoring is performed against a large vocabulary even though only a small number of responses are allowed, and the signal is rejected if too many non-allowed words score better than any allowed word. The system comes with multiple sets of standard signal models; it scores each against a given user's signals, selects the set which scores best, and then performs adaptive and batch training upon that set. Preferably, the tutorial prompts users to enter the words used for training in an environment similar to that of the actual recognizer the tutorial is training them to use. The system will normally simulate the recognition of the prompted word, but will sometimes it will simulate an error. When it does, notifies the user if he fails to correct the error. The recognizer associated with the tutorial allows users to perform adaptive training either on all words, or only on those whose recognition has been corrected or confirmed. The recognizer also uses a context language model which indicates the probability that a given word will be used in the context of other words which precede it in a grouping of text.

37 Claims, 59 Drawing Sheets

-DRAGONDICTATE PROGRAM~144
  -INITIALIZE~204
  -TERMINATE AND STAY RESIDENT~206
  -GET USER INPUT BY MONITORING KEYSTROKE INTERRUPTS AND, IF
  MICROPHONE IS ON, UTTERANCE INTERRUPTS~208
  -IF RECEIVED KEYSTROKE IS:~210
      -"+", CALL VOICE CONSOLE SUBROUTINE
      -"-", CALL OOPS BUFFER SUBROUTINE
      -...
      -ANY OTHER KEY, PASS TO ACTIVE PROGRAM
  -IF RECEIVE UTTERANCE~212
      -CALL RECOGNIZER~214
      -IF BEST SCORING WORD IS:~216
          -CHOICE COMMAND SELECTING A WORD IN ALTERNATE CHOICE
          WINDOW~226
                  -IF CHOICE COMMAND SELECTS OTHER THAN BEST SCORING
                  WORD~228
                      -SIMULATE TYPING NUMBER OF BACKSPACE CHARACTERS
                      EQUAL TO NUMBER OF CHARACTERS IN FIRST CHOICE
                      WORD~230
                      -SIMULATE TYPING CHARACTERS OF SELECTED WORD~232
              -REMOVE CHOICE WINDOW~234
              -MAKE SELECTED WORD FIRST CHOICE~236
              -SET UTTERANCE'S CONFIRMED_FLAG~254
              -CALL ADAPTIVE_TRAINING SUBROUTINE FOR CONFIRMED
              UTTERANCE AND FIRST CHOICE WORD~256
          -"CHOOSE-10", OR "SCRATCH THAT"~360
              -BACKSPACE NUMBER OF CHARACTERS IN BEST SCORING
              WORD~362
              -REMOVE CHOICE WINDOW~364
              -REMOVE UTTERANCE'S ENTRY IN OOPS BUFFER~366
          -"OOPS"~368
              -CALL OOPS_SUBROUTINE~370
          -...
          -NOT ONE OF ABOVE COMMANDS~218
              -REMOVE PREVIOUS CHOICE WINDOW IF ANY~224
              -SIMULATE TYPING OF UTTERANCE'S BEST SCORING WORD~220
              -PLACE CHOICE WINDOW ON SCREEN NEAR CURSOR~222
              -IF CONFIRMED_TRAINING_ONLY_FLAG IS FALSE OR IF THE
              CONFIRMED_FLAG OF THE OLDEST ENTRY IN THE OOPS
              BUFFER IS SET~392
                      -CALL ADAPTIVE TRAINING SUBROUTINE FOR TOKEN OF
                      THE OLDEST ENTRY IN THE OOPS BUFFER AGAINST
                      THAT ENTRY'S FIRST CHOICE WORD, UNLESS ALREADY
                      DONE~394
                      -CALL UPDATE ONEGRAM, UPDATE DIGRAM, AND UPDATE
                      CONTEXT LANG MODEL SUBROUTINES BASED ON OLDEST
                      ENTRY'S FIRST CHOICE WORD~396
                      -IF SAVING_TOKEN_FLAG IS SET, SAVE OLDEST
                      ENTRY'S TOKEN LABELED WITH ITS FIRST CHOICE
                      WORD IN A FILE, BUFFERING SAVES TO REDUCE DISK
                      ACCESS~398
              -ADD NEW ENTRY TO OOPS BUFFER FOR LAST UTTERANCE,
              INCLUDING ITS TOKEN, NINE BEST SCORING WORDS, AND A
              ZEROED CONFIRM_FLAG~400

FIG. 5

```
-VOICE CONSOLE SUBROUTINE~146
    -IF SYSTEM HAS ONE OR MORE USER FILES DEFINED~402
        -ENABLE FULL VOICE CONSOLE MENU
    -IF NOT~404
        -LIMITED VOICE CONSOLE MENU TO LOAD USER OR EXIT
    -VOICE CONSOLE LOOP~406
        -CLEAR OTHER PROMPTS, IF ANY, AND DISPLAY VOICE CONSOLE
        MENU~408
        -GET USER INPUT~410
        -IF INPUT IS:~412
            -"LOAD USER"~414
                -PROMPT FOR USER NAME~416
                -GET INPUT~420
                -IF USER ENTERS A NEW USER NAME~422
                    -PROMPT IF WANT TO CREATE NEW USER~424
                    -IF NOT, RETURN TO TOP OF VOICE CONSOLE
                    LOOP~426
                    -IF SO~428
                        -PROMPT IF WANT TO RUN TUTORIAL~430
                        -IF USER SELECTS YES~432
                            -EXIT VOICE CONSOLE
                            -LOAD AND RUN TUTORIAL
                        -ELSE~434
                            -EXIT VOICE CONSOLE
                            -LOAD AND RUN SELECT_BASE_VOCAB
                            PROGRAM
                -SELECT USER'S .VOC AND .USR FILES FOR USE BY
                RECOGNIZER~446
                -EXIT VOICE CONSOLE~448
            -...
            -"UTILITIES"~450
                -DISPLAY UTILITIES MENU~452
                -GET INPUT~452
                -IF INPUT IS:
                    -...
                    -"PARAMETERS",~454
                        -DISPLAY PARAMETERS MENU~456
                        -GET INPUT~456
                        -IF INPUT IS
                            -...
                            -"CONFIRMED TRAINING ONLY", SET
                            CONFIRMED_ TRAINING_ONLY_FLAG~468
                            -"SAVE TOKEN", SET
                            SAVE_TOKEN_FLAG~460
                            -...
                    -...
                -...
            -...
```

FIG. 6

-OOPS SUBROUTINE~148
    -MAKE 2ND MOST RECENT UTTERANCE IN OOPS BUFFER THE CURRENT OOPS
    WORD~372
    -REPEAT UNTIL EXIT FROM WITHIN~374
        -DISPLAY OOPS MENU WITH ONLY CURRENT OOPS WORD HAVING
        ALTERNATE CHOICES SHOWN~376
        -GET INPUT~378
        -IF INPUT IS:~380
            -CHOOSE-1 OR OKAY, REMOVE OOPS MENUS, MAKE ALL
            CORRECTIONS TO OUTPUT, AND EXIT OOPS SUBROUTINE~381
            -CHOOSE-2, SELECT SECOND CHOICE WORD, REMOVE OOPS MENUS,
            MAKE ALL CORRECTIONS TO OUTPUT, AND EXIT OOPS
            SUBROUTINE~382
            -...~386
            -SELECT-1, REMOVE ALTERNATE CHOICE MENU FROM CURRENT OOPS
            WORD~383
            -SELECT-2, REMOVE ALTERNATE CHOICE MENU FROM CURRENT OOPS
            WORD, MAKE SECOND CHOICE WORD THE FIRST CHOICE~384
            -...~386
            -LEFT-1, MAKE WORD ONE LEFT OF CURRENT OOPS WORD THE
            CURRENT OOPS WORD~388
            -LEFT-2, MAKE WORD TWO LEFT OF CURRENT OOPS WORD THE
            CURRENT OOPS WORD~390
            -...~386
            -RIGHT-1, MAKE WORD ONE RIGHT OF CURRENT OOPS WORD THE
            CURRENT OOPS WORD~394
            -...~386

FIG. 7

-OOPS BUFFER~160
    -ENTRY1
    -ENTRY2
    -ENTRY3~238
    -ENTRY4
    -ENTRY5~238
    -ENTRY6~238
    -ENTRY7
    -ENTRY8
    -ENTRY9
    -ENTRY10
    -ENTRY11
    -ENTRY12
    -READ/WRITE POINTER~240

FIG. 8

-OOPS BUFFER ENTRY~238
    -TOKEN~244
    -WORD_1~246A
    -WORD_2
    -WORD_3~246
    -WORD_4
    -WORD_5~246
    -WORD_6~246
    -WORD_7
    -WORD_8
    -WORD_9
    -VOCABULARY~248
    -STATE~250
    -CONFIRMED_FLAG~252

FIG. 9

```
-USERNAME.VOC FILE~162
    -LIST OF WORDS~260
        -FOR EACH
            -WORD~263
            -PHONEME SEQUENCE~262
            -PREFILTERING WORD START~264
    -LIST OF STATES~266
        -FOR EACH
            -STATE~267
            -LIST OF WORDS OR INCLUDED STATES~268
                -FOR EACH
                    -WORD OR STATE~269
                    -TRANSITION TO ANOTHER STATE~270
                    -EXTRA DATA (SUCH AS KEYSTROKE SEQUENCE)~272
            -DEFAULT TRANSITION~274
            -DEFAULT EXTRA DATA~276
```

FIG. 10

```
-USERNAME.USR FILE~164
    -PREFILTERING MODELS~280
    -PIC TABLE~282
        -FOR EACH PHONEME TRIPLE
            -ITS ASSOCIATED SEQUENCE OF PELS~284
            -DURATION MODEL~286
    -PEL MODEL LIST~288
        -FOR EACH PEL
            -PEL~291
            -1 AMPLITUDE PARAMETER~290
            -7 SPECTRAL PARAMETERS~292
            -12 CEPSTRAL PARAMETERS~294
    -HELPER MODEL LIST~296
        -FOR EACH WORD FOR WHICH USER UTTERANCES SCORE POORLY AGAINST
         PHONETIC MODEL
            -WORD~298
            -PHONETIC MODEL OF WORD, IF ANY~300
            -SEQUENCE OF PELS~302
```

FIG. 11

```
-ADAPTIVE_TRAINING SUBROUTINE~152
    -IF WORD HAS ONE OR MORE PHONETIC MODELS~304
        -IF HAS TWO OR MORE PHONETIC MODELS~306
            -SCORE TOKEN AGAINST EACH AND SELECT BEST SCORING
             PHONETIC MODEL~308
        -ELSE, SELECT THE SINGLE PHONETIC MODEL~310
        -CALL TRAINING SUBROUTINE FOR TOKEN AND PHONETIC MODEL~312
    -IF WORD HAS HELPER MODEL FOR SELECTED PHONETIC SPELLING~314
        -CALL TRAINING SUBROUTINE FOR TOKEN AND HELPER MODEL~316
        -IF SCORE WORSE THAN SPECIFIED AMOUNT~318
            -IF THERE IS A PHONETIC MODEL FOR WORD~320
                -DELETE HELPER MODEL~321
            -ELSE, CALL TRAIN_NEW_MODEL SUBROUTINE FOR TOKEN~322
    -IF WORD HAS NO PHONETIC OR HELPER MODEL, CALL TRAIN_NEW_MODEL
     SUBROUTINE FOR TOKEN~324
```

FIG. 12

-TRAINING SUBROUTINE (TOKEN LIST, WORD MODEL)~326
    -REPEAT UNTIL ITERATION IMPROVES SCORE OF MATCHES BY LESS THAN
    SPECIFIED AMOUNT~328
        -FOR EACH TOKEN IN TOKEN LIST~330
            -TIME ALIGN AND SCORE PARAMETER VECTORS OF TOKEN AGAINST
            PELS OF WORD MODEL~332
        -UPDATE PELS OF WORD MODEL~334

FIG. 13

-TRAIN_NEW_MODEL SUBROUTINE (TOKEN LIST)~336
    -SET PEL_NUMBER IN PROPORTION TO AVERAGE LENGTH OF TOKENS IN TOKEN
    LIST~338
    -DIVIDE EACH TOKEN INTO PEL_NUMBER SEGMENTS OF APPROXIMATELY EQUAL
    LENGTH~340
    -MAKE AN INITIAL MODEL FOR THE WORD WITH A PEL FOR EACH OF THE
    PEL_NUMBER SEGMENTS MADE IN THE TOKENS, WITH EACH PEL'S PARAMETERS
    BEING BASED ON THE VECTORS OF THE ONE OR MORE TOKENS IN ITS
    ASSOCIATED SEGMENT~342
    -CALL TRAINING SUBROUTINE WITH TOKEN LIST AND INITIAL MODEL~344

FIG. 14

-BATCH_TRAINING PROGRAM~184
    -FOR EACH WORD FOR WHICH HAVE TOKENS~464
        -IF WORD HAS ONE OR MORE PHONETIC MODEL~466
            -FOR EACH PHONETIC MODEL~468
                -SCORE ALL TOKENS AGAINST PHONETIC MODEL AND REMOVE
                OUTLYERS FROM MODEL'S TOKEN LIST~469
            -FOR EACH TOKEN WHICH IS ON TOKEN LISTS FOR DIFFERENT
            PHONETIC MODELS OF WORD, REMOVE IT FROM ALL BUT TOKEN
            LIST OF PHONETIC MODEL AGAINST WHICH IT SCORED BEST~470
            -FOR EACH PHONETIC MODEL~472
                -CALL TRAINING SUBROUTINE FOR MODEL AND ITS TOKEN
                LIST~474
        -IF WORD HAD HELPER MODEL~476
            -IF HELPER MODEL HAS PHONETIC MODEL
                -CALL TRAINING SUBROUTINE FOR HELPER MODEL WITH
                TOKEN LIST FOR THAT PHONETIC MODEL FROM ABOVE
            -ELSE
                -SCORE TOKENS AGAINST HELPER MODEL, REJECT OUTLYERS
                -CALL TRAINING SUBROUTINE FOR NON-REJECTED TOKENS
                AND HELPER MODEL
            -IF SCORE AGAINST HELPER MODEL WORSE THAN SPECIFIED
            AMOUNT
                -IF THERE IS A PHONETIC MODEL FOR WORD
                    -DELETE HELPER MODEL
                -ELSE, CALL TRAIN NEW MODEL SUBROUTINE FOR TOKEN
        -IF WORD HAS NO PHONETIC OR HELPER MODEL~478
            -SCORE TOKENS AGAINST EACH OTHER, REJECT OUTLYERS
            -CALL TRAIN_NEW_MODEL SUBROUTINE FOR TOKENS
            -MAKE RESULTING MODEL A HELPER MODEL FOR WORD

FIG. 15

```
-SELECT_BASE_VOCAB PROGRAM~186
    -DISPLAY SENTENCE AND PROMPT USER TO SEPARATELY SPEAK EACH HILITED
    WORD IN THAT SENTENCE~436
    -FOR EACH WORD IN SENTENCE, STARTING WITH FIRST~438
        -HILITE WORD
        -GET NEXT UTTERANCE
        -LABEL UTTERANCE'S TOKEN AS BEING FOR HILTITED WORD
    -SCORE EACH UTTERANCE'S TOKEN AGAINST ITS LABELED WORD IN EACH OF
    BASE VOCABULARIES~440
    -ADD SCORES OF ALL UTTERANCES FOR EACH VOCABULARY~442
    -SELECT BASE VOCABULARY WITH BEST SCORE, BASING USER'S .VOC AND
    .USR FILES ON SELECTED BASE VOCABULARY~444
```

FIG. 16

```
-TUTORIAL PROGRAM~172
    -INITIALIZE~460
    -REPEAT UNTIL EXIT FROM WITHIN~461
        -GET NEXT LINE OF LESSON FILE~462
        -INTERPRET AND EXECUTE THAT LINE~463
```

FIG. 17

```
-LESSON FILE~182
-CHAPTER1--BASE FILE SELECTION~464A
      -SET DEFAULTS FOR CHAPTER~476
      -LESSION~468A
            -DISPLAY INTRODUCTORY SCREEN
            -GET INPUT
         -...
         -SELECT BASE FILE LESSON~468B
            -RUN SELECT_BASE_VOCAB
         -...
-CHAPTER2--INTRODUCTION TO TUTORIAL~464
-CHAPTER3--HOW DRAGONDICTATE WORDS~464
-CHAPTER4--THE VOICE CONSOLE AND DISABLING THE MICROPHONE~464
-CHAPTER5--LEARNING TO DICTATE
-CHAPTER6--BASIC PUNCTUATION
-CHAPTER7--CORRECTING DICTATION WITH THE CHOICE LIST~464B
-CHAPTER8--DELETING UTTERANCES WITH [CHOOSE 10]
-CHAPTER9--SPELLING WORDS NOT ON CHOICE LIST
-CHAPTER10-THE DICTIONARY AND ADDING NEW WORDS
-CHAPTER11-CORRECTING OLD ERRORS WITH THE OOPS BUFFER
-CHAPTER12-DICTATING DATES, NUMBERS, AND ADDRESSES
-CHAPTER13-SAVING YOUR VOCABULARY FILES
-...
-CHAPTERN~464C
      -SET DEFAULTS FOR CHAPTER
      -BATCH TRAINING LESSON~468C
            -PROMPT USER IF WANTS TO PERFORM BATCH TRAINING~486
            -IF USER SAYS YES, CALL BATCH_TRAINING~488
            -ELSE, CONTINUE TO NEXT LESSION
         -...
      -EXIT LESSON~468D
            -PROMPT USER IF WANTS TO EXIT TUTORIAL~490
            -IF USER SAYS YES, EXIT TUTORIAL~492
            -ELSE, PROMPT USER TO CALL TUTOR MENU FOR OPTIONS~494
         -...
   -...
-DICTATION MODULE~466A
-GLOBAL MODULE~466B
-TUTOR MENU MODULE~466C
      -SET DEFAULTS FOR MODULE
      -DISPLAY TUTOR MENU
      -GET IMPUT
      -BRANCH BASEDD ON INPUT
   -...
```

FIG. 18

```
-CHAPTER~464
      -SET DEFAULTS FOR CHAPTER~469
      -LESSON~468
            -OPTIONALLY DISPLAY MESSAGE~470A
            -OPTIONALLY FAKE DICTATION ACTION~470B
            -OPTIONALLY ADD ENTRIES TO STACK~470C
            -GET INPUT~470D
            -CONTINUE OR BRANCH BASED ON INPUT~470E
      -LESSON~468
      -LESSON~468
         -...
```

FIG. 19

```
-GET_EXPECTED_RESPONSE SUBROUTINE~178
    -CALL GET_ALLOWED_RESPONSE SUBROUTINE~520
    -IF RETURNS EXPECTED WORD AS USER RESPONSE~522
        -RETURN
    -IF RETURNS OTHER ALLOWED RESPONSE IN EVENT STACK~524
        -EXECUTE FUNCTION FOLLOWING THAT ALLOWED RESPONSE IN EVENT
        STACK
    -IF FUNCTION CALLED FROM EVENT STACK RETURNS WITH A "REPEAT", JUMP
    TO START OF THIS SUBROUTINE~525
```

FIG. 20

```
-GET_ALLOWED_RESPONSE SUBROUTINE~180
    -SET UTTERANCE_NUMBER TO 0~526
    -UTTERANCE_LOOP: REPEAT UNTIL EXIT FROM WITHIN~528
        -INCREMENT UTTERANCE_NUMBER~530
        -WAIT FOR USER INPUT~532
        -IF KEYSTROKE, RETURN WITH KEY AS RESPONSE~534
        -CALL LARGE VOCABULARY RECOGNIZER TO SCORE UTTERANCE'S TOKEN
        AGAINST LARGE VOCABULARY, REQUESTING SCORE OF BEST SCORING 25
        WORDS~536
        -SET USER_RESPONSE TO ZERO~538
        -WORD_LIST_LOOP: FOR EACH WORD RETURNED BY THE RECOGNIZER, IN
        ORDER OF SCORE WITH BEST SCORING FIRST~540
            -IF ITS SCORE IS WORSE THAN A GIVEN LEVEL~542
                -EXIT WORD_LIST_LOOP
            -IF IT IS AN ALLOWED RESPONSE WORD~546
                -SET USER_RESPONSE TO THE BEST SCORING ALLOWED
                RESPONSE WORD~548
                -CALL ADAPTIVE_TRAINING SUBROUTINE FOR TOKEN, AND
                ANY SIMILAR TOKEN[X]s FROM PREVIOUS LOOP, AND BEST
                SCORING ALLOWED RESPONSE WORD, IF THAT WORD IS THE
                EXPECTED WORD~550
                -LABEL TOKEN WITH BEST SCORING ALLOWED RESPONSE
                WORD, IF THAT WORD IS THE EXPECTED WORD~552
                -RETURN~553
        -IF USER_RESPONSE IS ZERO~554
            -SAVE TOKEN AS TOKEN[UTTERANCE_NUMBER]~556
            -IF UTTERANCE_NUMBER = 1~558
                -PROMPT USER TO REPEAT WHAT JUST SAID
            -OTHERWISE~560
                -PROMPT USER TO SAY EXPECTED WORD~562
                -IF UTTERANCE_NUMBER >2~564
                    -COMPARE TOKEN[X]s WITH EACH OTHER~566
                    -IF THREE SCORE WITHIN A GIVEN DISTANCE OF EACH
                    OTHER~568
                        -LABEL THE THREE CLOSELY SCORING TOKEN[X]s
                        WITH EXPECTED WORD~570
                        -SET USER_RESPONSE TO EXPECTED WORD~572
                        -EXIT UTTERANCE_LOOP~574
                    -ELSE IF UTTERANCE_NUMBER = 5,~576
                        -LABEL THREE TOKEN[X]s WHICH COMPARE MOST
                        CLOSELY AS EXPECTED WORD~578
                        -SET USER_RESPONSE TO EXPECTED WORD~580
                        -EXIT UTTERANCE_LOOP~582
        -IF USER_RESPONSE IS NOT ZERO~584
            -CALL ADAPTIVE TRAINING SUBROUTINE FOR UTTERANCE'S THREE BEST
            SCORING TOKEN[X]s AND EXPECTED WORD~
            -SAVE THREE CLOSEST TOKEN[X]s, LABELED BY THEIR ASSOCIATED
            EXPECTED WORD~585
```

FIG. 21

```
-SAME_DOCUMENT_WORD_LIST~192
    -FOR EACH WORD IN LIST
        -WORD~828
        -COUNT~830
        -OTHER_WORD_LIST~832
            -FOR EACH WORD IN LIST
                -WORD~834
                -COUNT~836
```

FIG. 22

```
-FILE_WORD_LIST~190
    -FOR EACH WORD IN LIST
        -WORD~816
        -COUNT~818
```

FIG. 22A

-BUILD_CONTEXTS PROGRAM~188
    -PROMPT USER TO SPECIFY FILES~800
    -GET USER SPECIFICATION~802
    -FOR EACH FILE SPECIFIED~804
        -CLEAR FILE_WORD_LIST~806
        -FOR EACH WORD IN FILE~808
            -IF NOT IN BASIC VOCABULARY~812
                -IF NOT ALREADY IN FILE_WORD_LIST~814
                    -ADD IT TO FILE_WORD_LIST WITH A COUNT OF ONE
                -ELSE~820
                    -ADD ONE TO THAT WORD'S COUNT IN FILE_WORD_LIST
        -FOR EACH GIVEN WORD IN FILE_WORD_LIST~810
            -IF NOT ALREADY IN SAME_DOCUMENT_WORD_LIST~822
                -ADD IT WITH ITS COUNT TO SAME_DOCUMENT_WORD_LIST
            -ELSE~824
                -ADD IT COUNT TO WORD'S ENTRY IN
                SAME_DOCUMENT_WORD_LIST
            -FOR EACH OTHER WORD IN FILE_WORD_LIST~826
                -IF OTHER WORD IS NOT ALREADY IN OTHER_WORD_LIST OF
                GIVEN WORD'S ENTRY IN SAME_DOCUMENT_WORD_LIST~838
                    -ADD OTHER WORD TO THAT OTHER_WORD_LIST, WITH A
                    COUNT EQUAL TO ITS COUNT IN FILE_WORD_LIST
                -ELSE~840
                    -ADD OTHER WORD'S COUNT IN FILE_WORD_LIST TO
                    ITS COUNT THAT OTHER_WORD_LIST
    -CLUSTER OTHER_WO RD_LISTS IN SAME_DOCUMENT_WORD_LIST INTO CLUSTERS
    CALLED CONTEXTS~842
    -FOR EACH CONTEXT~843
        -FOR EACH WORD IN ITS OTHER_WORD_LIST~844
            -PLACE WORD IN CONTEXT'S_WORD_LIST~845
    -FOR EACH GIVEN WORD IN SAME_DOCUMENT_WORD_LIST~846
        -CREATE WORD'S_CONTEXT_LIST ENTRY FOR THE WORD~847
        -FOR EACH CONTEXT~848
            -CREATE A CONTEXT ENTRY FOR THE CONTEXT UNDER THE CURRENT
            WORD IN THE WORD'S_CONTEXT_LIST~849
            -IN THE CONTEXT ENTRY ASSIGN THE GIVEN WORD AN
            IF_WORD_CONTEXT SCORE FOR THE CONTEXT REPRESENTING THE
            CONDITIONAL PROBABLY OF A WORD BEING A CONTEXT WORD IF
            THE GIVEN WORD HAS APPEARED (BASED ON THE RATIO OF THE
            COUNT TOTAL FOR ALL WORDS IN THE CONTEXT IN THE GIVEN
            WORD'S OTHER_WORD_LIST TO THE COUNT TOTAL OF ALL WORDS IN
            THAT OTHER_WORD_LIST)~850
            -IN THE CONTEXT ENTRY ASSIGN THE GIVEN WORD AN
            IF_CONTEXT_WORD SCORE REPRESENTING THE CONDITIONAL
            PROBABILITY OF A WORD BEING THE GIVEN WORD IF WORDS OF
            THE CONTEXT HAVE APPEARED (BASED ON THE RATIO OF THE
            TOTAL OF THE GIVEN WORD'S COUNTS IN THE OTHER_WORD_LISTS
            OF EACH WORD IN THE CONTEXT TO THAT OF ALL WORDS IN THOSE
            SAME OTHER_WORD_LISTS)~851

FIG. 23

```
-CONTEXT_LANG_MODEL~170
    -FOR EACH CONTEXT
        -CONTEXT~852
        -MOVING_AVERAGE_SCORE~854
        -CONTEXT'S_WORD_LIST~856
            -FOR EACH WORD IN CONTEXT
                -WORD~858
        -LAST_LOADED_WORD POINTER~860
    -WORD'S_CONTEXT_LIST~862
        -FOR EACH WORD IN VOCABULARY
            -WORD~866
            -FOR EACH CONTEXT~868
                -CONTEXT~869
                -IF_WORD_CONTEXT SCORE~870
                -IF_CONTEXT_WORD SCORE~872
```

FIG. 24

```
-UPDATE_CONTEXT_LANG_MODEL SUBROUTINE~158
    -ADD FIRST CHOICE WORD TO 1000 WORD WORD LIST BUFFER~890
    -AFTER EVERY EVEN MULTIPLE OF 500 WORDS~892
        -FOR EACH GIVEN WORD IN BUFFER~894
            -FOR EACH CONTEXT~896
                -UPDATE GIVEN WORD'S IF_WORD_CONTEXT SCORE FOR
                CONTEXT AS A FUNCTION OF RATIO OF NUMBER OF
                OCCURRENCES OF CONTEXT WORDS TO ALL WORDS IN
                BUFFER~898
        -FOR EACH ACTIVE CONTEXT~900
            -FOR EACH WORD IN TOTAL VOCABULARY~901
                -UPDATE WORD'S IF_CONTEXT_WORD SCORE FOR CONTEXT AS
                A FUNCTION OF RATIO OF NUMBER OF OCCURRENCES OF THE
                GIVEN WORD TO ALL WORDS IN THE BUFFER~902
    -FOR EACH CONTEXT~904
        -UPDATE CONTEXT'S MOVING_AVERAGE_SCORE BY FIRST CHOICE WORD'S
        IF_WORD_CONTEXT SCORE~906
    -FOR EACH GIVEN CONTEXT THAT IS NOT FULLY LOADED WITH A BETTER
    MOVING AVERAGE SCORE THAN ANY OTHER PARTIALLY LOADED CONTEXT,
    STARTING WITH BEST SCORING CONTEXTS FIRST~908
        -ORDER WORD'S IN CONTEXT'S SUBVOCABULARY BY
        IF_CONTEXT_SCORE~909
        -LOAD GIVEN CONTEXT FROM DISK INTO TEMPORARY RAM~910
        -LOAD-LOOP: FOR EACH OTHER PARTIALLY LOADED CONTEXT THAT GIVEN
        CONTEXT SCORES BETTER THAN~912
            -UNLOAD-LOOP: REPEAT UNTIL EXIT FROM WITHIN~914
                -UNLOAD OTHER CONTEXT'S LAST CURRENTLY LOADED
                WORD~916
                -LOAD GIVEN CONTEXT'S FIRST CURRENTLY UNLOADED
                WORD~918
                -IF OTHER CONTEXT IS FULLY UNLOADED, EXIT UNLOAD-
                LOOP~920
                -IF GIVEN CONTEXT IS FULLY LOADED, EXIT LOAD-
                LOOP~922
```

C:\VT > voicetyp.exe
DOS/16M Protected Mode RunTime                  Version 4.20
Copyright (C) Rational Systems, Inc.            1987 - 1992
Dragon Systems Speech Driver Version 4.04.28 ALPHA INHOUSE ACPA 32PAR
For use with the IBM VoiceType (TM) Speech Recognition System
(C) Copyright Dragon Systems, Inc.              1986-1992

DragonD ┌─VoiceConsole──────────────────┐ 1991,1992
(C) Cop │ Plus Turn microphone on       │
        │  G   GO TO SLEEP              │
        │  E   EDIT words               │
   ****  │  S   SAVE vocabulary          │  on contained herein    *******
   ****  │  N   LOAD USER                │  y and should be        *******
   ****  │  R   REVERT TO SAVED          │  AECI #:BCR-0113.       *******
        │  T   TRAIN                    │
INHOUSE │  L   TUTORIAL                 │     401
        │  U   UTILITIES                │
        │  C   CONTINUE                 │
        │                               │
Press P │ MIC=OFF [Default Application] │
        └───────────────────────────────┘
C:\VT >
C:\VT >
```

C:\VT > voicetyp.exe                    Version 4.20
DOS/16M Protected Mode RunTime          1987 - 1992
Copyright (C) Rational Systems, Inc.
Dragon Systems Speech Driver Version 4.04.28 ALPHA INHOUSE ACPA 32PAR
For use with the IBM VoiceType (TM) Speech Recognition System
(C) Copyright Dragon Systems, Inc.      1986-1992

DragonD┌─VoiceConsole─────────────────┐nc. 1990,1991,1992
   (C) Cop│                          │
          │  Turn microphone on      │
   ****   │  GO TO SLEEP             │ information contained herein  *******
   ****   │  EDIT words              │ roprietary and should be      *******
   ****   │  SAVE vocabulary         │ Agreement AECI #:BCR-0113.    *******
          │N LOAD USER               │
          │  REVERT TO SAVED         │         ┌── 401A
   INHOUSE│  TUTORIAL                │
          │  UTILITIES               │
   Press P│C CONTINUE                │
          │                          │
          │ MIC=OFF                  │
          └──────────────────────────┘
C:\VT >
C:\VT >
```

Figure 27

```
C:\VT > vt
C:\VT > voicetyp.exe
DOS/16M Protected Mode RunTime              Version 4.20
Copyright (C) Rational Systems, Inc.         1987 - 1992
Dragon Systems Speech Driver Version 4.04.28 ALPHA INHOUSE ACPA 32PAR
For use with the IBM VoiceType (TM) Speech Recognition System
(C) Copyright Dragon Systems, Inc.           1986-1992

DragonDictate 100K Version 1.40.00
   (C) Copyright Dragon Systems, Inc. 1990,1991,1992

****    This program and the information contained herein    ******
  ****    is Confidential and Proprietary and should be        ******
  ****    treated as such. SEE Agreement AECI #:BCR-0113.      ******

INHOUSE VERSION

Press Plus for menu

┌─────────────────────────┐
│ ┌─────────────────────┐ │
│ │ Enter user name:    │ │
│ └─────────────────────┘ │
└─────────────────────────┘
             ⌒418

C:\VT > voicetyp.exe
DOS/16M Protected Mode RunTime                Version 4.20
Copyright (C) Rational Systems, Inc.         1987 - 1992
Dragon Systems Speech Driver Version 4.04.28 ALPHA INHOUSE ACPA 32PAR
For use with the IBM VoiceType (TM) Speech Recognition System
(C) Copyright Dragon Systems, Inc.            1986-1992

DragonDictate 100K Version 1.40.00
(C) Copyright Dragon Systems, Inc. 1990,1991,1992

****    This program and the infomation contained herein      *******
****    is Confidential and Proprietary and should be         *******
****    treated as such. SEE Agreement AECI #:BCR-0113.       *******

INHOUSE VERSION

Press Plus for menu
                              ┌─────────────────────────────┐
                              │  Create new user  foo2? [Y/N] │──426
                              └─────────────────────────────┘
C:\VT >
C:\VT >
```

C:\VT > voicetyp.exe                        Version 4.20
DOS/16M Protected Mode RunTime
Copyright (C) Rational Systems, Inc.        1987 - 1992
Dragon Systems Speech Driver Version 4.04.28 ALPHA INHOUSE ACPA 32PAR
For use with the IBM VoiceType (TM) Speech Recognition System
(C) Copyright Dragon Systems, Inc.          1986-1992
```

```
DragonD ┌─IMPORTANT!─────────────────────────────────┐
   (C) Cop│                                         n  │
          │  As a NEW USER, it is very IMPORTANT to    │
     ****│   run the tutorial. This will teach you     │  ******
     ****│   how to operate DragonDictate correctly and│  ******
     ****│   allow the system to adapt to your voice   │  ******
          │   more quickly.                             │       436
          │                                             │
   INHOUSE│  This will greatly improve the accuracy    │
          │   of your dictation, and allow you to use   │
          │   the system more easily.                   │
    Press P│                                            │
          │  Would you like to run the tutorial? Y/N   │
   C:\VT >│                                            │
   C:\VT >└────────────────────────────────────────────┘
```

Figure 30

```
                                                    ,471
         GetValidEvent( mask=1 )
   472      Globals:
            TIMEOUT 40 (moff) (noclr) --> CALL global-mic-off
            ANYKEY (moff) (noclr) --> CALL global-mic-off
            ANYKEY (norm) (nxpg) (moff) (noclr) --> CALL global-unknown-key
            KEY 'Enter' (norm) (nxpg) (moff) (noclr) --> CALL global-key-not-now
            KEY 'KeyPadEnter' (norm) (nxpg) (moff) (noclr) --> CALL global-key-not-now
            ANYSPELLKEY (norm) (nxpg) (moff) (noclr) --> CALL global-key-not-now
            KEY '+' (norm) (nxpg) (moff) (noclr) --> CALL global-wrong-plus-key
            KEY '-' (norm) (nxpg) (moff) (noclr) --> CALL global-wrong-minus-key
            TIMEOUT 40 (norm) (nxpg) (noclr) --> CALL global-timeout
            KEY 'F1' (norm) (nxpg) (moff) (noclr) --> CALL global-get-help
            UTT "[get help]" (norm) (nxpg) (noclr) --> CALL global-get-help
            UTT_TOO_LOUD (norm) (nxpg) (moff) (noclr) --> CALL global-too-loud
            UTT_TOO_SOFT (norm) (nxpg) (moff) (noclr) --> CALL global-too-soft
            REJECTED_UTT (norm) (nxpg) (moff) (noclr) --> CALL global-rejected-utt
            UTT_STRANGE (norm) (nxpg) (moff) (noclr) --> CALL global-rejected-utt
            TALK_TOO_FAST (norm) (nxpg) (moff) (noclr) --> CALL global-talk-too-fast
            UTT_TOO_LONG (norm) (nxpg) (moff) (noclr) --> CALL global-utt-too-long
            KEY 'Esc' (norm) (nxpg) (moff) (noclr) --> CALL global-escape
            KEY 'Minus' (norm) (nxpg) (moff) (svmsg) --> CALL global-mainmenu
            UTT "[Tutor menu]" (norm) (nxpg) (svmsg) --> CALL global-mainmenu
            KEY 'Plus' (norm) (nxpg) (moff) (svmsg) --> CALL global-voice-console
            UTT "[voice console]" (norm) (nxpg) (svmsg) --> CALL global-voice-console
   474      Defaults:
            LASTWORD "[new paragraph]" (norm) (noclr) --> CALL default-lastword
            NEXTWORD ", "comma"" (norm) (noclr) --> CALL default-nextword
            LASTWORD "[new paragraph]" (nxpg) (noclr) --> CALL default-nextpage
            CURWORD "down" (nxpg) (noclr) --> CALL default-nextpage
            NEXTWORD ", "comma"" (nxpg) (noclr) --> CALL default-nextword
            KEY 'F2' (norm) (noclr) --> CALL default-no-function-keys
            KEY 'F3' (norm) (noclr) --> CALL default-no-function-keys
            KEY 'F4' (norm) (noclr) --> CALL default-no-function-keys
            KEY 'F5' (norm) (noclr) --> CALL default-no-function-keys
            KEY 'F6' (norm) (noclr) --> CALL default-no-function-keys
            KEY 'F7' (norm) (noclr) --> CALL default-no-function-keys
            KEY 'F8' (norm) (noclr) --> CALL default-no-function-keys
            KEY 'F9' (norm) (noclr) --> CALL default-no-function-keys
            KEY 'F10' (norm) (noclr) --> CALL default-no-function-keys
            UTT "[oops!]" (norm) --> CALL d3gd-oops
   476      Cases:
            UTT "down" (norm) --> *e
            UTT "[choose 1 ]" (norm) --> GOTO d2gd-said-okay
            UTT "[okay]" (norm) --> GOTO d2gd-said-okay
            KEY 'Backspace' (norm) --> CALL d2gd-ignore-backspace
            LASTSPELLKEY '[' (norm) --> CALL d2gd-one-right
   477      ANYSPELLKEY (norm) --> CALL d2gd-one-wrong
            Ceiling:
            End of Stack.
```

FIG. 32

```
                    DragonDictate Tutorial - Main Menu

Esc    "continue"   to clear this menu and continue running the Tutorial
F1     "[get help]" for more information on using the tutorial menu
F2     "quit"       to exit the tutorial (option saving your place)
F3     "reset"      to revert-to-saved and restart the current topic Or select one of the following topics: (asterisk means completed)

A      "alpha"      Base File Selection
B      "bravo"      Introduction to the Tutorial
C      "charlie"    How DragonDictate Works
D      "delta"      The Voice Console and Disabling the Microphone
E      "echo"       Learning to Dictate
F      "foxtrot"    Basic Punctuation
G      "golf"       Saving Your Vocabulary Files
H      "hotel"      Correcting Dictation with the Choice List
I      "india"      Deleting Utterances with [choose 10]
J      "juliett"    Spelling Words Not on Choice List
K      "kilo"       The Dictionary and Adding New Words
L      "lima"       Correcting Old Errors with the Oops Buffer
M      "mike"       Dictating Dates, Numbers, and Addresses Say "[next page]" to see more topics
```

Figure 33

```
    /*******************************************************************
    / ** MODULE NAME: final7.pln
    / ** Copyright (c) Dragon Systems,Inc. 1992
    | ** OWNER:       Joel Gould
    | ** CREATED:     September 4, 1992
    | ** FUNCTIONS
    | ** DESCRIPTION
502{ ** Chapter 7
    | ** This topic teaches the user to correct dictation errors by
    | ** selecting words from the choice list.
    | *******************************************************************
    | ** MODIFICATIONS
    | ** ...
    | **
    \*******************************************************************
504ᴸCHAPTER Correcting Dictation with the Choice List /DEFAULT NOCLEAR LASTWORD            CALL default-lastword
    /DEFAULT NOCLEAR NEXTWORD            CALL default-nextword
    |DEFAULT NEXTPAGE NOCLEAR LASTWORD   CALL default-nextpage
    |DEFAULT NEXTPAGE NOCLEAR CURWORD    CALL default-nextpage
    |DEFAULT NEXTPAGE NOCLEAR NEXTWORD   CALL default-nextpage
    |DEFAULT NOCLEAR 'F2'                CALL default-no-function-keys
    |DEFAULT NOCLEAR 'F3'                CALL default-no-function-keys
    |DEFAULT NOCLEAR 'F4'                CALL default-no-function-keys
506{DEFAULT NOCLEAR 'F5'                CALL default-no-function-keys
    |DEFAULT NOCLEAR 'F6'                CALL default-no-function-keys
    |DEFAULT NOCLEAR 'F7'                CALL default-no-function-keys
    |DEFAULT NOCLEAR 'F8'                CALL default-no-function-keys
    |DEFAULT NOCLEAR 'F9'                CALL default-no-function-keys
    |DEFAULT NOCLEAR 'F10'               CALL default-no-function-keys
    \DEFAULT NOCLEAR ANYSPELLKEY         CALL default-no-spelling-keys

* IF INORDER GOTO chap7-start

508ᴸEDITOR RESET

* LESSON chap7-start

510⌐CONSOLE MIC ON
   ⌐CONSOLE SLEEP OFF
512ᴸPROMPT HIDE
514ᴸEDITOR SHOW
*-----------------------------------------------------------------
     /`{HIGH}TOPIC: CORRECTING DICTATION WITH THE CHOICE LIST{NORM}
     |
     |`This topic describes how to use the choice list to correct dictation
516{ `errors. You are going to learn how to:
     |`
     | ` \b Accept {NAMENORM}'s default choice
     |`
     \ ` \b Choose another word from the choice list
```

FIG. 34-1

```
     \ ˙Please say {SAY}"[okay]" to continue.{CR}
      \˙Please say {UTT}"[Tutor menu]" to display the menu.

518 ⌒ EXPECTING "[okay]"

IF INORDER CALL chap7-bonus-text

⎧ PROMPT RESET
590 ⎨ PROMPT SHOW
       ⎩ PROMPT HIGHLIGHT OFF
       *
       *

* PROMPT /when/suddenly/a/white/rabbit/with/pink/eyes/
       * PROMPT /ran/close/by/her/. \"period\"/
      ⎧ PROMPT /[new paragraph]/
      ⎪ PROMPT /there/was/nothing/so/very/remarkable/in/that/; \"semicolon\"/
      ⎪ PROMPT /nor/did/Alice/think/it/so/very/much/out/of/the/way/to/
      ⎪ PROMPT /hear/the/rabbit/say/to/itself/, \"comma\"/" \"open quote\"/
592 ⎨ PROMPT /oh/dear/! \"exclamation point\"/oh/dear/! \"exclamation point\"/
      ⎪ PROMPT /I/shall/be/too/late/! \"exclamation point\"/" \"close quote\"/
      ⎪ PROMPT /( \"open paren\"/when/she/thought/it/over/afterwards/, \"comma\"/
      ⎪ PROMPT /it/occurred/to/her/that/she/ought/to/have/wondered/at/this/, \"co
      ⎩ PROMPT /but/at/the/time/it/all/seemed/quite/natural/) \"close paren\"/;
      \"semicolon\"/

596 ⌒ PROMPT HIGHLIGHT ON

598 ⎰ ˙Since you are starting a new topic, please start a new paragraph
    ⎱ ˙in your document. Say {SAY}"[new paragraph]".

602 ⌒ EXPECTING "[new paragraph]"
604 ⌒ CHOICELIST 1="[new paragraph]"

606 ⎰ ˙Please begin dictating this lesson by saying the first word in the
    ⎱ ˙Text Prompter, {SAY}"there".

610 ⌒ EXPECTING "there"
612 ⌒ CHOICELIST 1="there"

⎧ ˙This is a choice list, which has appeared every time you've dictated a w
       ⎪
616 ⎨ ˙If the word you said is correctly identified, it is listed first on the
       ⎪ ˙choice list. However, you still have to tell {NAMENORM} that this
       ⎩ ˙recognition is correct.

˙There are three ways to do this.

620 ⌒ NEWPAGE

622 ⎰ ˙The first is to say the next word. This
```

FIG. 34-2

622 {
- is the method you used in the previous topic.
- The second way is to say {UTT}"[okay]". You used this method in earlier topics.
- The third way is to say {UTT}"[choose 1]", since you want to choose the first word on the choice list.

626 ~ NEWPAGE

630 {
- Until now, the word the Text Prompter asked you to dictate has always appeared as the first word on the choice list. But that doesn't always h when you dictate in {NAMENORM}.
- Sometimes the word you dictate will be an alternate choice on the list.
- Sometimes it won't be on the list at all.
- Please continue dictating from the Text Prompter, starting with {SAY}"was".

636 ~ EXPECTING "was"
*----------------------------------------------------------------
638 ~ call dictate1-no-error   * next: "nothing"
640 ~ call dictate1-no-error   * next: "so"

652 {
- Sometimes {NAMENORM} identifies the word said as a possibility, but not as the most likely choice. When this happens, the word will appear on the choice list, but not as the first choice.
- Please dictate the next word.

656 ~ call dictate1-no-error   * next: "very"
*----------------------------------------------------------------
660 ~ CHOICELIST 1="vary" 3="very"
666 ~ POINTAT CHOICELIST 3

668 {
- Although you said {UTT}"very", {NAMENORM} thought that the most likely thing that you said was {UTT}"vary".
- {NAMENORM} learns from its mistakes and adapts to your style of speech.
- Therefore, you must correct any recognition errors immediately.

NEWPAGE

672 {
- If you fail to correct {NAMENORM}'s mistake in this case, every time you {UTT}"very", it will type {UTT}"vary". If this mistake goes by undetecte other words are also affected.
- The next time you say {UTT}"merry", {NAMENORM} may think you mean {UTT}"marry".

NEWPAGE

FIG. 34-3

676 ⎧ `If, as in this case, the word you spoke is not in the first position
    ⎨ `on the choice list, you must tell {NAMENORM} which word you actually
    ⎨ `spoke. You do this with the {UTT}"[choose n]" command, where {UTT}"n" re
    ⎩ `the number of the word on the choice list.

`NEWPAGE

680 ⎰ `In this case, you want {NAMENORM} to select the third word.
    ⎱ `Please say {SAY}"[choose 3]" now.

684 ~ CASE {NEXTWORD} CALL must-say-choose-n
686 ~ EXPECTING "[choose 3]"
    *------------------------------------------------------------------
688 ~ CHOOSE 3

⎧ `Saying {UTT}"[choose 3]" made {NAMENORM} erase the word {UTT}"vary"
    ⎨ `from the text and type the word {UTT}"very" instead.
    ⎨
692 ⎨ `Because you chose the word you spoke, {NAMENORM} no
    ⎨ `longer needs to show a list of possible interpretations of the utterance
    ⎨ `and it has removed the choice list from the screen.
    ⎨
    ⎨ `As soon as you say the next word, the choice list will re-appear with a
    ⎩ `new set of possibilities.

`NEWPAGE

⎧ `For the rest of this tutorial, the {NAMENORM} Tutorial will allow
    ⎨ `random recognition errors
    ⎨ `to occur while you practice your dictation.  Correct them as soon as
    ⎨ `they happen, to prevent corruption
    ⎨ `of your vocabulary.
    ⎨
696 ⎨ `If {NAMENORM} correctly identifies the word you say, continue on to
    ⎨ `the next word.  If it incorrectly identifies the word you say, correct i
    ⎨ `by saying {UTT}"[choose n]", where {UTT}"n" is the number of the desired
    ⎨ `word on the choice list. If you don't correct your errors, the Tutorial
    ⎨ `will remind you.
    ⎨
    ⎨ `To start dictating again, please say the next word on your
    ⎩ `Text Prompter, {SAY}"remarkable".

700 ~ EXPECTING "remarkable"
    *------------------------------------------------------------------
702 ~ call dictate1-no-error          * next: "in"
708 ~ call dictate1-no-error          * next: "that"

714 ~ CHOICELIST 1={CURWORD}

720 ~ Please say {SAY}"; \"semicolon\"".

FIG. 34-4

```
724 ─┬─ CASE "[choose 1]" CALL d1gd-said-okay
     └─ CASE "[okay]" CALL d1gd-said-okay
726 ── EXPECTING ";  \"semicolon\""

728 ── call dictate1-no-error              * next: "nor"
*------------------------------------------------------------
     ┌ *must-correct-errors
     │
     │ `Notice that the word "nor" did not appear first on
734 ─┤ `your choice list. Please choose the correct word now,
     └ `and then continue dictating.

*------------------------------------------------------------
738 ── CALL dictate1-on-list               * next: "did"

┌ CHOICELIST 1={CURWORD}
762 ─┤ CASE "[choose 1]" CALL d1gd-said-okay
     │ CASE "[okay]" CALL d1gd-said-okay
     └ EXPECTING "Alice"
     *------------------------------------------------------------
     *                                     expecting:
     *                                     ------------
766 ── CALL dictate1-no-error              * think
768 ── CALL dictate1-no-error              * it
770 ── CALL dictate1-on-list               * so
     CALL dictate1-no-error                * very
     CALL dictate1-no-error                * much
     CALL dictate1-on-list                 * out
     CALL dictate1-on-list                 * of
     CALL dictate1-no-error                * the
     CALL dictate1-no-error                * way
     CALL dictate1-no-error                * to
     CALL dictate1-no-error                * hear
     CALL dictate1-no-error                * the
     CALL dictate1-on-list                 * rabbit
     CALL dictate1-no-error                * say
     CALL dictate1-no-error                * to
     CALL dictate1-on-list                 * itself
     CALL dictate1-no-error                * ,  \"comma\"
     CALL twoword1-open-quote              * "  \"open quote\"
                                           * oh
     CALL dictate1-no-error                * dear `{NAMENORM} has two words for the {UTT}'!' character:
`{UTT}"! \"exclamation point\"" and
`{UTT}"! \"exclamation mark\"".

`While you use the {NAMENORM} Tutorial, however,
`only {UTT}"! \"exclamation point\"" is active.
```

FIG. 34-5

```
***********************************************************************
** MODULE NAME: dictate.pln
** Copyright (c) Dragon Systems,Inc. 1992
** AUTHOR:      Joel Gould
** CREATED:     Sept 17, 1992
** FUNCTIONS
** DESCRIPTION
** {NAMESHORT} Trainer lesson plan component
** -Originally part of global.pln, this file contains the lesson plan
** code which handles dictation practice
** ...
***********************************************************************
* MODIFICATIONS
** ...
***********************************************************************
*
* DICTATION PRACTICE SUBROUTINE - 1
*
* Includes support for
*    - choose words
*
* Each subroutine should be called for one word in the teleprompter.
* Just before calling the subroutine should be an EXPECTING command
* for the word in question.  Each subroutine will end with an EXPECTING
* command and return only if the next word in the teleprompter was
* spoken.
*
* For example:
*
* PROMPT /one/two/three/four/
* EXPECTING "one"
* CALL dictate1-no-error    * one is 1st on choice list; expecting two
* CALL dictate1-no-error    * two is 1st on choice list; expecting three
* CALL dictate1-on-list     * three is put in random slot on choice list
*              *              upon exit we will be expecting four
* CHOICELIST 1="four"
*
***********************************************************************
*
* ---> DICTATE1-RANDOM
*
* Currently forces an on-list error if we just had a misrecognition.
* Also introduces errors 5% of the time (just to be sure we get one)
*
LESSON dictate1-random
IF SHORTWORD GOTO dictate1-no-error
RANDOMIZE 50 dictate1-no-error
IF MISRECOG  GOTO dictate1-on-list
RANDOMIZE  5 dictate1-on-list
GOTO dictate1-no-error
*-----------------------------------------------------------------------
***********************************************************************
```

FIG. 35-1

```
*
* ---> DICTATE1-NO-ERROR
*
* Put current word first on choice list, then get the next word
*
640~LESSON dictate1-no-error
640A~CHOICELIST 1={CURWORD}
640B~LESSON dictate1-no-error-after
640C~HIGHLIGHT NEXTWORD                    * LASTWORD <- CURWORD
640D~CASE "[okay]"      GOTO d1gd-said-okay
640E~CASE "[choose 1]"  GOTO d1gd-said-okay
640F~EXPECTING {CURWORD}
640G~RETURN
*-----------------------------------------------------------------
* We end up here if the user has said OKAY or something else which
* accepts the last word and clears the choice list.  Here we expect
* him, to say the next word.
*
646~LESSON d1gd-said-okay
646A~CHOOSE {LASTWORD}
646B~EXPECTING {CURWORD}
646C~RETURN
*-----------------------------------------------------------------

*****************************************************************
*
* ---> DICTATE1-ON-LIST
*
* Pick a random slot for the word to appear which is not the first
* slot on the choice list.  Make sure the user says "choose-N",
* then get the next word
*
740~LESSON dictate1-on-list
740A~CHOICELIST ?={CURWORD}
740B~HIGHLIGHT NEXTWORD                    * LASTWORD <- CURWORD
740C~CASE {CURWORD}     CALL d1on-say-choose-n
740D~CASE "[okay]"      CALL d1on-say-choose-n
740E~CASE "[choose 1]"  CALL d1on-say-choose-n
740F~EXPECTING "[choose {?}]"
740G~CHOOSE {?}
740H~EXPECTING {CURWORD}
740I~RETURN
*-----------------------------------------------------------------
746~LESSON d1on-say-choose-n
746A~AFTERSEEN 1 d1on-short1-say-choose-n ⎛ The performance of {NAMESHORT} improves with every error it makes,
746B  ⎨  but only if you correct the mis-recognitions.  If you do not correct
       ⎝ every error, {NAMESHORT}'s performance will get worse.

⎛ {NAMESHORT} has incorrectly identified the word you just spoke.
```

FIG. 35-2

```
       ⌈ ˙The correct word {UTT}{LASTWORD} is on the choice list, however,
       ⌊ ˙and you can correct {NAMESHORT}'s mis-recognition. Please {WHAT2DO}.

746D ~ REMOVEUTT
746E ~ RETURN REPEAT
     *--------------------------------------------------------------
748  ~ LESSON d1on-short1-say-choose-n
748A ~ RANDOMIZE 25 d1on-short2-say-choose-n
748B ~ RANDOMIZE 33 d1on-short3-say-choose-n
748C ~ RANDOMIZE 50 d1on-short4-say-choose-n 748D ⌠ ˙Please correct {NAMESHORT}'s mis-recognition before continuing.
     ⌡ ˙Please {WHAT2DO}.

748E ~ REMOVEUTT
748F ~ RETURN REPEAT
     *--------------------------------------------------------------
750  ~ LESSON d1on-short2-say-choose-n ˙Please {WHAT2DO} to correct that last mis-recognition.

REMOVEUTT
       RETURN REPEAT
     *--------------------------------------------------------------
752  ~ LESSON d1on-short3-say-choose-n ˙It is very important to correct all mis-recognitions to
       ˙prevent your vocabulary files from being corrupted.
       ˙Please say {SAY}{EXPECTED}.

REMOVEUTT
       RETURN REPEAT
     *--------------------------------------------------------------
754  ~ LESSON d1on-short4-say-choose-n ˙Correct the last error before continuing to dictate.

REMOVEUTT
       RETURN REPEAT
     *--------------------------------------------------------------
```

FIG. 35-3

```
* ---> DICTATE3-RANDOM
*
* Currently forces an on-list error if we just had a misrecognition.
* Also introduces errors 5% of the time (just to be sure we get one)
*
* When an error is indicated, we choose on-list 60% of the time and
* off-list 40% of the time.
*
779   LESSON dictate3-random
779A  IF SHORTWORD GOTO dictate3-no-error
779B  RANDOMIZE 50 dictate3-no-error
779C  IF MISRECOG  GOTO d3-error
779D  RANDOMIZE 5  d3-error
779E  GOTO dictate3-no-error
     *--------------------------------------------------------------
779F  LESSON d3-error
779G  RANDOMIZE 60 dictate3-on-list
779H  GOTO dictate3-off-list
     *--------------------------------------------------------------
```

FIG. 35-4

TOPIC: CORRECTING DICTATION WITH THE CHOICE LIST

This topic describes how to use the choice list to correct dictation errors. You are going to learn how to:

■ Accept DragonDictate's default choice

■ Choose another word from the choice list

Please say "[okay]" to continue.
Please say "[Tutor menu]" to display the menu.

F1="get help"   Minus=save/quit   Plus=mic on/off   Pln 1 Topic 8 Ln 6

Figure 36

There was nothing so very remarkable in that; nor did Alice think it so very much out of the way to hear the rabbit say to itself "oh dear! oh — 594 since you are starting a new topic, please start a new paragraph in your document. Say "[new paragraph]". — 600

F1="get help"   Minus=save/quit   Plus=mic on/off   Pln 1 Topic 8 Ln 6

Figure 37

There was nothing so very very remarkable in that; nor did Alice think it so very much out of the way to hear the rabbit say to itself "oh dear! Oh — 594 since you are starting a new topic, please start a new paragraph in your document. Say "[new paragraph]". — 600

F1="get help"   Minus=save/quit   Plus=mic on/off   Pln 1 Topic 8 Ln 6

Figure 38

There was nothing so very remarkable in that; nor did Alice think it so
very much out of the way to hear the rabbit say to itself "oh dear! Oh There F1    there
F2    their
F3    never
F4    they're
F5    better
F6    where
F7    error
F8    bearer
F9    mirror
F10   [reject]

This is a choice list, which has appeared every time
you've dictated a word.

If the word you said is correctly identified, it is listed
first on the choice list. However, you still have to tell
DragonDictate that this recognition is correct.

There are three ways to do this.

say "[next page]" to continue

F1="get help"   Minus=save/quit   Plus=mic on/off   Pln 1 Topic 8 Ln 6

Figure 40

There was nothing so very very remarkable in that; nor did Alice think it so very much out of the way to hear the rabbit say to itself "oh dear! Oh ⟵594

There ⟵613

| | |
|---|---|
| F1 | there |
| F2 | their |
| F3 | never |
| F4 | they're |
| F5 | better |
| F6 | where |
| F7 | error |
| F8 | bearer |
| F9 | mirror |
| F10 | [reject] |

224

The first is to say the next word. This is the method you used in the previous topic.

The second way is to say "[okay]". You used this method in earlier topics.

The third way is to say "[choose 1]", since you want to choose the first word on the choice list.

say "[next page]" to continue, or "[previous page]"

⟵624

⟵628

F1="get help"   Minus=save/quit   Plus=mic on/off   Pln 1 Topic 8 Ln 6

Figure 41

There was nothing so very remarkable in that; nor did Alice think it so very much out of the way to hear the rabbit say to itself "oh dear! oh

594

613 ⌒ There

| | |
|---|---|
| F1 | there |
| F2 | their |
| F3 | never |
| F4 | they're |
| F5 | better |
| F6 | where |
| F7 | error |
| F8 | bearer |
| F9 | mirror |
| F10 | [reject] |

224

632

Until now, the word the Text Prompter asked you to dictate has always appeared as the first word on the choice list. But that doesn't always happen when you dictate in DragonDictate.

Sometimes the word you dictate will be an alternate choice on the list.

Sometimes given won't be on the list at all.

Please continue dictating from the Text Prompter, starting with was.

or "[previous page]"

634

F1="get help"   Minus=save/quit   Plus=mic on/off       Pln 1 Topic 8 Ln 6

Figure 42

There was nothing so very very remarkable in that; nor did Alice think it so very much out of the way to hear the rabbit say to itself "oh dear! Oh ⌐594

There was ⌐642

F1    was
F2    lost
F3    wants
F10   [reject]
⌐644

F1="get help"   Minus=save/quit   Plus=mic on/off   Pln 1 Topic 8 Ln 6

Figure 43

There was nothing so very remarkable in that; nor did Alice think it so very much out of the way to hear the rabbit say to itself "oh dear! Oh ⟵ 594

There was nothing ⟵ 648

| | |
|---|---|
| F1 | nothing |
| F2 | often |
| F3 | but |
| F4 | button |
| F5 | method |
| F6 | putting |
| F7 | buffet |
| F8 | perfect |
| F9 | - "hyphen" |
| F10 | [reject] |

⟵ 650

F1="get help"  Minus=save/quit  Plus=mic on/off  Pln 1 Topic 8 Ln 6

Figure 44

There was nothing so very remarkable in that; nor did Alice think it so very much out of the way to hear the rabbit say to itself "oh dear! Oh — 594

There was nothing so — 650

| | |
|---|---|
| F1 | nothing |
| F2 | often |
| F3 | but |
| F4 | button |
| F5 | method |
| F6 | putting |
| F7 | buffet |
| F8 | perfect |
| F9 | - "hyphen" |
| F10 | [reject] |

658

Sometimes DragonDictate identifies the word said as a possibility, but not as the most likely choice. When this happens, the word will appear on the choice list, but not as the first choice.

Please dictate the next word.

654

Pln 1 Topic 8 Ln 6

F1="get help"  Minus=save/quit  Plus=mic on/off

Figure 45

There was nothing so very remarkable in that; nor did Alice think it so very much out of the way to hear the rabbit say to itself "oh dear! Oh ⟵594

There was nothing so very ⟵690

Saying "[choose 3]" made DragonDictate erase the word "vary" from the text and type the word "very" instead.

Because you chose the word you spoke, DragonDictate no longer needs to show a list of possible interpretations of the utterance, and it has removed the choice list from the screen.

As soon as you say the next word, the choice list will re-appear with a new set of possibilities.

say "[next page]" to continue

⟵694

F1="get help"   Minus=save/quit   Plus=mic on/off   Pln 1 Topic 8 Ln 6

Figure 50

There was nothing so very remarkable in that; nor did Alice think it so very much out of the way to hear the rabbit say to itself "oh dear! oh ⟵594

There was nothing so very

```
                                                        ⟵698
For the rest of the Tutorial, the DragonDictate Tutorial
will allow random recognition errors to occur while you
practice your dictation. Correct them as soon as they
happen, to prevent corruption of your vocabulary.

If DragonDictate correctly identifies the word you say,
continue on to the next word. If it incorrectly identifies
the word you say, correct it by saying "[choose n]", where
"n" is the number of the desired word on the choice list. If
you don't correct your errors, the Tutorial will remind you.

To start dictating again, please say the next word on your
Text Prompter, "remarkable".
                                             or "[previous page]"
```

F1="get help"   Minus=save/quit   Plus=mic on/off   Pln 1 Topic 8 Ln 6

Figure 51

There was nothing so very very remarkable in that; nor did Alice think it so very much out of the way to hear the rabbit say to itself "oh dear! Oh ⌐594

There was nothing so very remarkable in ⌐710

| | |
|---|---|
| F1 | in |
| F2 | been |
| F3 | him |
| F4 | and |
| F5 | thin |
| F6 | it |
| F7 | end |
| F8 | hidden |
| F9 | did |
| F10 | [reject] |

⌐712

F1="get help"   Minus=save/quit   Plus=mic on/off   Pln 1 Topic 8 Ln 6

Figure 53

There was nothing so very very remarkable in that⁣ nor did Alice think it so very much out of the way to hear the rabbit say to itself "oh dear! oh ⟵594

There was nothing so very remarkable in that ⟵716

```
F1   that
F2   have
F3   the
F4   got
F5   to
F6   data
F7   fat
F8   path
F9   not
F10  [reject]
```
⟵718

Please say "semicolon". ⟵722

F1="get help"  Minus=save/quit  Plus=mic on/off      Pln 1 Topic 8 Ln 6

Figure 54

There was nothing so very very remarkable in that; nor did Alice think it so very much out of the way to hear the rabbit say to itself "oh dear! Oh ⌐594

There was nothing so very remarkable in that; ⌐730

```
F1    ; "semicolon"   ⌐732
F2    chemical
F10   [reject]
```

Pln 1 Topic 8 Ln 6

F1="get help"  Minus=save/quit  Plus=mic on/off

Figure 55

There was nothing so very very remarkable in that; nor did Alice think it so very much out of the way to hear the rabbit say to itself "oh dear! Oh ~594

There was nothing so very remarkable in that; more ~742

| | |
|---|---|
| F1 | more |
| F2 | for |
| F3 | nor |
| F4 | war |
| F5 | your |
| F6 | poor |
| F7 | or |
| F8 | lower |
| F9 | core |
| F10 | [reject] |

~744

Notice that the word "nor" did not appear first on your choice list. Please choose the correct word now, and then continue dictating. ~736

F1="get help"  Minus=save/quit  Plus=mic on/off     Pln 1 Topic 8 Ln 6

Figure 56

There was nothing so very very remarkable in that; nor did Alice think it so very much out of the way to hear the rabbit say to itself "oh dear! Oh ~594

There was nothing so very remarkable in that; nor ~760

F1="get help"   Minus=save/quit   Plus=mic on/off   Pln 1 Topic 8 Ln 6

Figure 57

There was nothing so very remarkable in that; nor did Alice think it so very much out of the way to hear the rabbit say to itself "oh dear! Oh ~594

There was nothing so very remarkable in that; nor did ~764

| | |
|---|---|
| F1 | did |
| F2 | been |
| F3 | and |
| F4 | in |
| F5 | it |
| F6 | him |
| F7 | thin |
| F8 | dead |
| F9 | head |
| F10 | [reject] |

~768

F1="get help"  Minus=save/quit  Plus=mic on/off  Pln 1 Topic 8 Ln 6

Figure 58

There was nothing so very remarkable in that; nor did Alice think it so very much out of the way to hear the rabbit say to itself "oh dear! Oh ⟵594

There was nothing so very remarkable in that; nor did Alice

F1  think
F2  thick
F3  pick
F4  picked
F5  it
F6  - "hyphen"
F7  and
F8  fifth
F9  fit
F10 [reject]

F1="get help"   Minus=save/quit   Plus=mic on/off   Pln 1 Topic 8 Ln 6

Figure 59

There was nothing so very very remarkable in that; nor did Alice think it so very much out of the way to hear the rabbit say to itself "oh dear! Oh ⌐594

| F1 | Alice |
| F2 | palace |
| F3 | balance |
| F4 | Dallas |
| F5 | balanced |
| F6 | ballast |
| F7 | mouse |
| F8 | bells |
| F9 | ballots |
| F10 | [reject] |

There was nothing so very remarkable in that; nor did Alice think

F1="get help"  Minus=save/quit  Plus=mic on/off   Pln 1 Topic 8 Ln 6

Figure 60

There was nothing so very remarkable in that; nor did Alice think it so ~594
very much out of the way to hear the rabbit say to itself "oh dear! Oh There was nothing so very remarkable in that; nor did Alice think its ~772

~774

| F1 | its |
| F2 | if |
| F3 | it |
| F4 | it's |
| F5 | infant |
| F6 | Inc. |
| F7 | in |
| F8 | hit |
| F9 | did |
| F10 | [reject] |

F1="get help"    Minus=save/quit    Plus=mic on/off    Pln 1 Topic 8 Ln 6

Figure 61

There was nothing so very very remarkable in that; nor did Alice think it so 594
very much out of the way to hear the rabbit say to itself "oh dear!" Oh There was nothing so very remarkable in that; nor did Alice think its F1    its
F2    if
F3    it
F4    it's
F5    infant
F6    Inc.
F7    in
F8    hit
F9    did
F10   [reject]

778

The performance of Dictate improves with every error
it makes, but only if you correct the
mis-recognitions. If you do not correct every error,
Dictate's performance will get worse.

Dictate as incorrectly identified the word you just
spoke.

The correct word "it" is on the choice list, however,
and you can correct Dictate's mis-recognition. Please
say "[choose 3]".

F1="get help"  Minus=save/quit  Plus=mic on/off   Pln 1 Topic 8 Ln 6

Figure 62

There was nothing so very very remarkable in that; nor did Alice think it so very much out of the way to hear the rabbit say to itself "oh dear! Oh ~594

There was nothing so very remarkable in that; nor did Alice think it

F1="get help"   Minus=save/quit   Plus=mic on/off   Pln 1 Topic 8 Ln 6

Figure 63

APPARATUS AND METHODS FOR TRAINING SPEECH RECOGNITION SYSTEMS AND THEIR USERS AND OTHERWISE IMPROVING SPEECH RECOGNITION PERFORMANCE

FIELD OF THE INVENTION

The present invention relates to apparatus and methods for improving the performance which individual users can obtain on systems, such as speech or handwriting recognition systems, which recognize signals generating by such users to represent a succession of words or symbols.

BACKGROUND OF THE INVENTION

Systems capable of performing speech recognition are well known in the prior art. These are systems which respond to a spoken word by producing the textual spelling, or some other symbolic output, associated with that word. Commonly, speech recognition systems operate in the following manner. First, they receive from a microphone, an electrical representation of the acoustic signal generated by the utterance of the word to be recognized. In FIG. 1 a simplified representation of such an acoustic signal 100 is shown in the form of a spectrogram, which plots frequency along the vertical axis, time along the horizontal axis, and which represents intensity of the sound at any given frequency and time by degree of darkness. Such systems normally receive such signals as an analog waveform, which corresponds to the variations in air pressure over time associated with the sound of a spoken word. As they receive such signals they perform an analog to digital conversion, which converts the amplitude of the acoustic signal into a corresponding digital value at each of a succession of evenly spaced points in time. Commonly, such sampling is performed between 6,000 to 16,000 times per second for speech recognition. Once a digital representation of the amplitude waveform is obtained, digital signal processing is performed upon that digital waveform. For example, in the DragonDictate speech recognition system, versions of which have been sold by the assignee of the present invention for over a year, the digital signal processing is used to take an FFT, or fast Fourier transform, of the signal. This produces a digitized spectrogram representation 102 of the signal shown in FIG. 2. This spectrogram provides a vector, that is an ordered succession of variables, 104 which represents the intensities at each of seven frequency ranges for each 50th of a second. Although not shown in FIG. 1 or FIG. 2, the vector 104 also includes twelve cepstral parameters. These cepstral parameters provide frequency related information for each fiftieth of a second which focuses on that part of the total speech signal which is generated by a user's vocal tract, and, thus, which is particularly relevant in speech recognition.

Once a series of vectors 104 is produced for an utterance, as is shown in FIG. 2, that series 102, which we call a token, is matched against each of plurality of word models 108 to find which of them it most closely matches. As is shown in FIG. 2, when this matching is performed, a process known as time aligning seeks to successive portions of the word model 108 as it is fitted against the token model 102 to achieve the best match. On FIG. 2, this is shown, for example, by the mapping of the two token vectors 104A against the single word model vector 109A, and the mapping of the three vectors 104B against the single model vector 109B. When this comparison is done, silence models 110 and 112, respectively are put at the beginning and end of each word model. This is done because the utterance to be recognized will normally be proceeded and followed by silence in a discreet utterance recognizer, in which words to be recognized are to be spoken separately.

FIG. 3 schematically represents the recognition process, in which the process of time aligning shown in FIG. 2 is performed between the utterance model 102 and each of the plurality of word models labeled 108A through 108N. The circles with loop arrows on top of them shown in FIG. 3 correspond to the model vectors 109 shown in FIG. 2, which also have looped arrows on top of them. The looped arrow represents the fact that when the time aligning occurs a given vector in the word model can be mapped against one or more vectors of the token. A score is given to each of the mappings, indicating how similar the vectors of the token are to those of each of the word models they are mapped against. The word whose word model has the best score is normally considered the recognized word.

The above description of the basic operation of a speech recognition system is a highly simplified one. Much more detailed descriptions of such systems is given in U.S. Pat. Nos. 4,783,803, issued to James K. Baker et al. on Nov. 8, 1988, and entitled "*Speech Recognition Apparatus And Method*"; 4,903,305, issued to Laurence Gillick et al. on Feb. 20, 1990, and entitled "*Method for Representing Word Models For Use In Speech Recognition*"; 4,866,778, issued to James K. Baker on Sep. 12, 1989, and entitled "*Interactive Speech Recognition Apparatus*", and 5,027,406, issued to Jed Roberts et al. on Jun. 25, 1991, and entitled "*Method For Interactive Speech Recognition And Training*". The patents have all been assigned to the assignee of the present invention, and they are all hereby incorporated by reference herein.

SUMMARY OF THE INVENTION

It is an object of the present invention to provide apparatus and methods for increasing the ease and accuracy with which a user of a recognition system, such as a speech recognition system, can train that system to understand his words.

It is another object of the present invention to provide apparatus and methods which increase the ease and accuracy with which a major portion of the population can use such a recognition systems which come with pre-trained word models.

It is yet another object of the present invention to provide apparatus and methods to train word models in an environment which encourages the user to enter those words in much the same manner as he would when using the actual recognizer for which the models are being trained.

It is still another object of the present invention to provide apparatus and methods for training word models which reduces the probability that any sample inputs will be used to train incorrect models.

It is yet another object of the present invention to provide apparatus and methods which make it more easy and more pleasant for users to train themselves how to use such a recognition system, including how to correct recognition errors and not to make common mistakes.

It is still another object of the present invention to provide apparatus and methods for accomplishing both the task of training a user how to operate a recognition system and allowing the user to train the system to his input at the same time.

It is yet another object of the present invention to provide apparatus and methods which increase the ability of a speech recognition system to better reject the recognition of inputs which are not of words in a small currently active vocabulary.

It is still another object of the present invention to provide apparatus and methods which enable a large vocabulary recognition system which can only perform comparisons against a given number of models at one time to recognize a higher percent of words than would otherwise be possible.

It is yet another object of the present invention to provide apparatus and methods which enable a large vocabulary recognition system to use context dependent language model information on a large number of words without requiting excessive amounts of memory.

The present invention relates to methods and apparatus for enabling a user to obtain improved recognition performance with a word recognition system, such as one designed to recognize speech. In one preferred embodiment the system involves a tutorial which instructs a user how to use the recognizer. The tutorial specifies a set of allowed response words for each of a plurality of states and associates with each a new state which it will enter in response to the recognition of a user generated signal of that response word. This system sends a user instructional messages on how to use the recognizer in certain states. In others, it presents the user with recognition exercises in which the user is expected to simulate use of the recognizer by generating signals representing a word corresponding to one of the response words allowed for that state. The system uses a recognizer to recognize a user generated signal, to score the closeness of the match between that signal and models for a plurality of words, including the response words allowed for the current state, it responds to the scores produced by the recognizer to select which of the response words for the current state probably corresponds to the user generated signal for that state, and it advances to the state associated with that selected response word.

In some embodiments of the invention, the recognizer scores the user generated signals against a large vocabulary even only a small vocabulary of response words are allowed at any given time. In this case, the decision of whether a given allowed response word is selected as recognized depends on how many other words from the large vocabulary the signal scores better against than the given allowed response. In some embodiments, the system incorporates signal information from user generated signals recognized as a given response words into signal models for those words, and this information is also used in the signal models of other words which have similar signal features to the recognized words.

In some embodiments the system prompts the user to enter the user generated signal expected in a given state again if the previous signal did not sufficiently match any allowed responses. If the user generated signal made in response to that prompt does not sufficiently match any allowed response, it explicitly prompts the user to enter a particular allowed response word. When multiple user generated signals have been received in a given state, none of which match well against an allowed response words, the system matches the signals against each other to determine which appear to be of the word the user was trying to communicate, and it selects those for training purposes.

In a preferred embodiment, the tutorial prompts users to enter a succession of words in an interface environment similar to that in which the user will use the recognizer which the tutorial is training them to use. In these embodiments, the system often prompts the user to enter a succession of words as if they were entering a sequence of text. The system will normally simulate recognizing the expected word, including displaying up an alternate choice menu, but sometimes it will simulate an error in that recognition and its associated choice menu. When it simulates such an error, it expects the user to enter a word which instructs the system to correct the error. At any given time the system may have at least three types of allowed response words. The first type is the expected word, which is often a word in the sequence of text the user is to enter or a word to correct a simulated error. The second type are the command words, which allow the user to move in the tutorial and perform other functions. The third are common mistake words, which correspond to mistakes which users are likely to make when using the tutorial, such as failing to correct a simulated error.

Preferably the tutorial comes with multiple sets of standard signal models for a plurality of words. Preferably it performs a test to select which set of signal models appear to work best for the user, and then the system performs adaptive training to improve the selected set of models as the tutorial is performed. Preferably the user is also given the option of performing batch training upon the models based on the signals which have been recognized as his or her allowed responses by the tutorial.

The invention also relates to a recognizer which allows users to indicate whether adaptive training is to be performed on all words, or only on those whose recognition the user specifically corrects or confirms. The invention also relates to a recognizer which derives and uses a context language model. This indicates the probability that a given word will be used given the context of other words which precede it in the same document, paragraph, or other grouping of text. This context language model is used to load different sub-vocabularies in and out of memory as a function of the words which the user is currently entering.

The above summary of the invention, is provided for the purpose of providing an overview. It is not intended to be as accurate, or as complete, as the description of the invention contained in the claims. Where there is any disagreement between the two, the language of the claims should be considered the more accurate description of the invention.

DESCRIPTION OF THE DRAWINGS

These and other aspects of the present invention will become more evident upon reading the following description of the preferred embodiment in conjunction with the accompanying drawings, in which:

FIG. 5 is a simplified pseudo-code representation of the DragonDictate Program, representing features relevant to the present invention;

FIG. 6 is a simplified pseudo-code representation of the Voice Console Subroutine of DragonDictate, representing features relevant to the present invention;

FIG. 7 is a simplified pseudo-code representation of the Oops Subroutine of DragonDictate, presenting features which are relevant to the present invention;

FIG. 8 is a schematic representation of the Oops Buffer, which is used to buffer information about the recognition of recent utterances so the user can make corrections to such recognitions;

FIG. 9 is a schematic representation of the data stored in each of the, up to twelve, entries of the Oops Buffer shown in FIG. 8;

FIG. 10 is a schematic representation of the data contained in the .VOC File for each trained user of DragonDictate;

FIG. 11 is a schematic representation of the .USR File which also stores information for each trained user;

FIG. 12 is a simplified pseudo-code representation of the Adaptive Training Subroutine of DragonDictate;

FIG. 13 is a simplified pseudo-code representation of the Training Subroutine of DragonDictate;

FIG. 14 is a simplified pseudo-code representation of the Train New Model subroutine of DragonDictate;

FIG. 15 is a simplified pseudo-code representation of the Batch Training Program which can be used in conjunction with DragonDictate;

FIG. 16 is a simplified pseudo-code representation of the Select Base Vocab Program which can be used in conjunction with DragonDictate;

FIG. 17 is a simplified pseudo-code representation of the Tutorial Program which can be used to train users how to use DragonDictate while at the same time training DragonDictate to better recognize the user's speech patterns;

FIG. 18 is a simplified pseudo-code representation of the Lesson File which contains the instructional material used by the Tutorial Program of FIG. 17;

FIG. 19 is a simplified pseudo-code representation of the general form of each chapter in the Lesson File shown in FIG. 18;

FIG. 20 is a simplified pseudo-code representation of the Get Expected Response subroutine used by the Tutorial Program of FIG. 17;

FIG. 21 is a pseudo-code representation of the Get Allowed Response Subroutine used by the Tutorial Program of FIG. 17;

FIGS. 22 and 22A are schematic representation of data structures used by the Build Context program of FIG. 23;

FIG. 23 is a pseudo-code representation of the Build Contexts program which is used to build a Context Language Model from textual information contained in specified files;

FIG. 24 is a schematic representation of the data structure of the Context Language Model produced by the Build Contexts Program of FIG. 23.

FIG. 25. is a pseudo code representation of the Update Context Language Model Subroutine Which responds to successively recognized words by updating information in the context language model shown in FIG. 24 and by swapping in or out of memory vocabularies which are associated with different contexts;

FIGS 26 through 30 show the screen prompts produced by the Voice Console Subroutine of FIG. 6 when a new user seeks to use DragonDictate;

FIG. 32 is a textual representation of the Event Stack used by the Tutorial Program;

FIG. 33 represents the screen prompt when the user selects the tutorial menu of the Tutorial Program;

FIG. 34 is a copy of the actual text selected parts of Chapter 7 in the Lesson File which is represented schematically in FIG. 18;

FIG. 35 is a copy of the actual text of selected parts of the Dictate Module of the Lesson File which is represented schematically in FIG. 18;

FIGS. 36–63 are a sequence screens which can result from execution of the potion of Chapter 7 of the Lesson File shown in FIG. 34.

It should be appreciated that the screen drawings included in the filing of this application have printed the line drawing characters used in the actual MS-DOS screen displays of the present invention as as foreign characters.

DETAILED DESCRIPTION OF PREFERRED EMBODIMENTS

Figure 4:
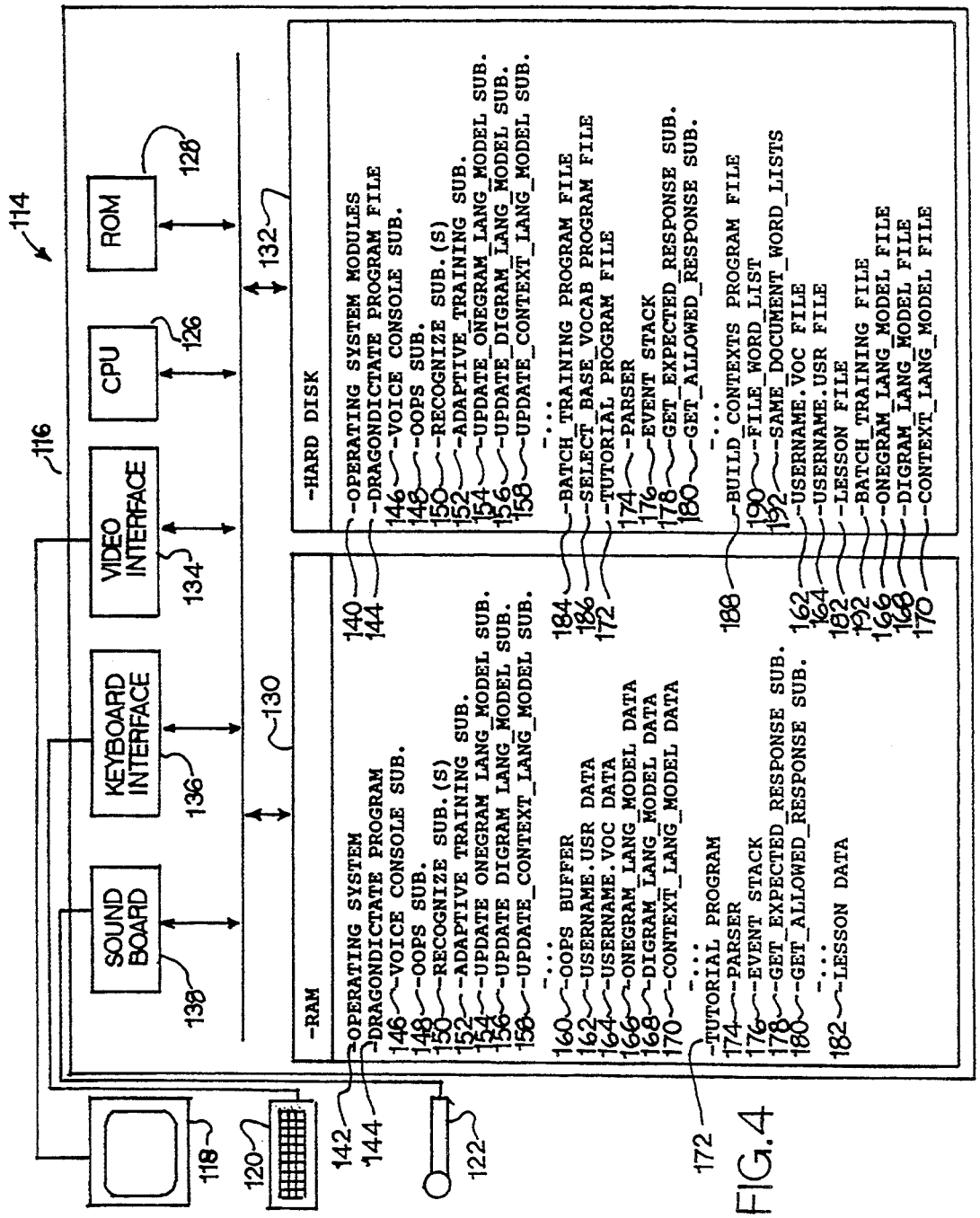
FIG. 4 is a schematic representation of a computer system which contains program information causing it to function as apparatus for performing the functions of the present invention.

FIG. 4 represents apparatus for performing speech recognition related functions of the present invention. This apparatus, 114, includes a computer 116, which in the described embodiment is preferably a 386 or 486 IBM-PC compatible personal computer using the MS-DOS operating system, a video display 118, a keyboard 120, and a microphone 122. The personal computer 116 includes, among other things, a bus 124, a CPU, or central processing unit, 126, a portion of read-only memory, or ROM, 128, a portion of random-access memory, or RAM, 130, a hard disk 132, a video interface 134, a keyboard interface 136, and a sound board 138.

As is well known in the prior art, the CPU 126, is a piece of circuitry designed to execute instructions recorded in the ROM and RAM memories 128 and 130, respectively. In response to those instructions, it is capable of reading and writing information from various devices connected to it over the bus 124, and for performing tests and calculations based on that information. The ROM, 128, stores basic operating system functions, including those enabling the computer to initialize when first turned on. This initialization includes reading more of the operating system program 140 from the hard disk 132 into the RAM 130, from which it can then be executed. This is done because the ROM is capable of storing information even when the computer 116, is turned off, whereas the RAM 130, can only store information while the computer remains on.

The RAM 130 besides storing the portions of operating system instructions 142 which are currently being executed, is also capable of storing the instructions and data of the preferred version of the DragonDictate Program, 144. This version includes features of the current invention. As is indicated in FIG. 4, when the DragonDictate Program is loaded in RAM, the instructions of the Voice Console, Oops, Recognize, Adaptive Training, Update Onegram Language Model, Update Digram Language Model, and Update Context Language Model subroutines, 146, 148, 150, 152, 154, 156, and 158, respectively, which are part of DragonDictate are also loaded. When DragonDictate is loaded to RAM it also contains the OOPS buffer 160, and data from the .USR File 162, the .VOC File 164, the Onegram Language Model 166, Digram Language Model 168, and Context Language Model 170. In the situation shown in FIG. 4, the RAM 130 also has loaded into it the Tutorial Program 172, including it parser 174, Event Stack 76, Get Expected Response Subroutine 178, Get Allowed Response Subroutine 180, and one or more portions of the Tutorial's associated Lesson File 182.

As those skilled in the computing art understand, all of the programs contained in the hard disk 132 can be loaded into RAM 130, when the user, or the programs being executed by the user, so desire, provided there is room left to do so. When this is done the instructions contained in those programs function in conjunction with the CPU 126 as means for performing the functions which those instructions dictate, and the data structures created by those programs or read in from data files on the hard disk function as means for providing and storing various forms of information needed by, or produced by, those functions.

The other programs on the hard disk 132 which are relevant to the present invention include the Batch Training Program 184, the Select Base Vocabulary Program 186, and the Build Contexts Program 188. When the Build Contexts Program is loaded into memory, it has associated with it a File Word List 190 and a Same Document Word List 192, which will be described below. The hard disk also includes the .VOC file 162, and the .USR files 164, which provide information on a given user's word models, and the Lesson File 182, which is used with the Tutorial Program 172. A Batched Training File 192 can be used either by the Tutorial Program or the DragonDictate Program itself to store tokens of utterances for later training uses. The Onegram, Digram and Context Language Model files provide Onegram, Digram and Context language model information which is used by the recognizer of the DragonDictate Program.

The computer 116 also includes a video interface 134 for communicating with the video monitor 118, a keyboard interface 136 for receiving input from a keyboard 120, and a sound board 138. The sound board includes circuitry for receiving an electric signals representing an acoustic amplitude waveform from the microphone 122, and for performing various digital signal processing, or DSP, operations upon those signals. These DSP operations include deriving the amplitude parameter, seven spectral parameters, and twelve cepstral parameters which make up the parameter vector associated with each fiftieth of a second of the acoustic signal received from the microphone.

FIG. 5 is a highly simplified pseudo code representation of certain features of the DragonDictate Program. DragonDictate is a terminate and stay resident, or TSR, program, of a type well known to programmers of IBM PC-compatible computers. When the user types the command to execute DragonDictate, the instructions contained in its program 144 are loaded from the hard disk into RAM and the CPU starts to execute its instructions. Once this is done, step 204 initializes the program, including installing special interrupt handlers. These will cause the program to be called every time an utterance is received from the microphone by the sound board 138 or a keystroke is received from the keyboard by the keyboard interface 136. Once the initialization step 204 is complete, step 206 causes the DragonDictate Program to terminate, that is, it causes the CPU to stop executing its instructions, and returns it to executing instructions of the operating system. However, once this is done, the instructions of the Dictate program remain loaded in memory, and step 208 will be called by the interrupt handlers previously loaded by step 204 whenever an utterance or a keystroke is received by the computer.

When such input is received, if step 208 detects that it is a keystroke, step 210 causes the Voice Console Subroutine 146 to be called if the keystroke is that of the plus key on the keyboard's number pad and the OOPS Subroutine 148 to be called if it is the minus key associated with that number pad. If any other key is received, step 210 will normally merely return to whatever other program was being executed before the keystroke was received, passing the keystroke back to the operating system for use by that other program.

If the input detected by DragonDictate's interrupt handlers is a an utterance, step 212 causes step 214 to call DragonDictate's recognize subroutine 150, shown in RAM in FIG. 4. This recognition subroutine compares the utterance against each of the words in the currently active subset of DragonDictate's 30,000 word vocabulary. It then normally returns with a list of the nine words whose word models scored best against the token of the utterance just received, with the score for each. Then step 216 branches to whichever one of the conditions listed below it is met by the best scoring word just returned by the recognizer.

Most of the time the condition 218 of the test 216 is met. This condition is met when the user dictates any word other than certain command or correction words. When this condition is met, a step 224 removes any choice window which might have existed from a previous recognition, as is described below. Then step 220 simulates the typing of a text sequence associated with the best scoring word. It does this by supplying them to the operating system as if they had been received from the keyboard. Normally the text sequence corresponds to the spelling of the best scoring word. DragonDictate has been designed to operate as a TSR so that its recognizer can be used to simulate keyboard input for virtually any normal DOS program. After step 220, step 222 causes a choice window to be placed on the screen of the DOS program which just received keystrokes from step 222. This choice window lists the nine best scoring words returned by the recognizer with the inscription F1-F9, respectively, next to each such word, as is shown in the choice window, 224, in FIG. 40. Also included is a tenth choice indicate by "F10" key which indicates a choice to reject all of the words in the choice window. If the recognizer returns less than nine best choice words, the choice window will only show as many best scoring words as the recognizer returns.

If the best scoring word returned by the call to the recognizer in step 214 is a Choice Command, such as "Choose-1", "Choose-2", or "Choose-3", indicating that the user wishes to select a specifically numbered word shown on a currently displayed choice menu as the intended word for the utterance represented by that choice window, the condition 226 will be met and the steps under that condition in FIG. 5 will be executed. If the Choice Command selects any word other than that listed first in the choice window, which is the best scoring word which had its corresponding text entered into the program with which DragonDictate is being used, the condition of step 228 will be met. When this occurs, step 230 simulates the typing of a number of backspace characters equal to the number of characters in the choice window's first choice word. This normally has the effect of deleting the text associated with that word from the program with which DragonDictate is being used. Then step 232 simulates the typing of the characters of the word selected by the Choice Command. Whenever a Choice Command selects a word in the choice menu, whether or not the word selected is of the first choice in that window, step 234 removes the choice window associated with the previous recognition, if any. Then step 236 makes the word selected by the Choice Command the first choice word, WORD_1 in the OOPS buffer entry shown in FIG. 9 for the utterance for which the selection was made.

FIG. 8 describes DragonDictate's OOPS buffer 160. This buffer can store an entry 238 for each of up to the last twelve utterances received by the DragonDictate Program which corresponded to text output (i.e., words other than most commands). The OOPS buffer operates as a cyclical buffer with a Read/Write Pointer 240, which points to both the last entry placed in the buffer, and the location for the next entry. When the buffer has had twelve or more entries placed in it, the location for the next entry is also the location of the oldest entry in the buffer. Each entry 238 in the OOPS buffer, has the structure shown in FIG. 9. This includes the token 224 for the utterance associated with the entry and the nine best scoring words 246 against that token, including the word 246a which is indicated as the first choice word for that utterance. The entry also includes vocabulary information 248, which indicates which of the possible vocabularies which can be used with DragonDictate was in effect at the time of the recognition, and state information 250, which indicates which state in that vocabulary was active at the time of the recognition. In addition, the entry includes a Confirmed$_{13}$Flag 252, which is used to indicate whether or not the user has specifically confirmed the first choice word stored in the Word_1 slot, 246a.

Returning to FIG. 5, the step 236 performed after a Choice Command has been detected by step 226 makes the selected word indicated by Choice Command, the first choice word, WORD$_1$31, 246a shown in FIG. 9. Then step 254 sets the Confirmed_Flag 252, shown in FIG. 9, for that utterance's OOPS buffer entry 238 to indicate that the user has specifically selected the first choice word associated with the entry's token. This usually indicates that the token has a much higher chance of having been properly labeled than if the Confirmed_Flag had not been set, and, thus, that the token provides more reliable data for training. Next step 256 calls the Adaptive Training Subroutine for the utterance and first choice word of the OOPS buffer entry in which the user has just specifically selected the Word_1. This is done because, since the user has explicitly selected Word_1 for the token with a Choice Command, it is presumed that the token has been properly labeled, and thus is safe to use for adaptive training.

FIG. 12 describes the Adaptive Training Subroutine 152. Before this subroutine is described, the data structures used to store word models contained in the .VOC and .USR Files shown in FIGS. 10 and 11 will be described. The .VOC and .USR Files contain all the information necessary to define a vocabulary, the word models of that vocabulary, the states of that vocabulary, and the character output which DragonDictate is to produce in response to recognition of each word in that vocabulary. The text "USERNAME" shown in FIGS. 10 and 11 before the file extension names ".VOC" and ".USR" take the place of the actual up to eight character user name which is entered by the user for whom these models are kept.

Figure 1:
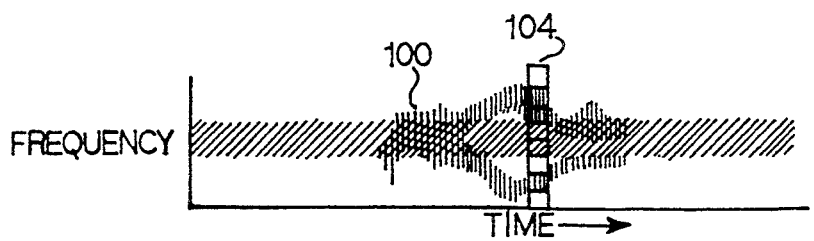
FIG. 1 is a schematic spectrographic representation of the utterance of a word.
Figure 2:
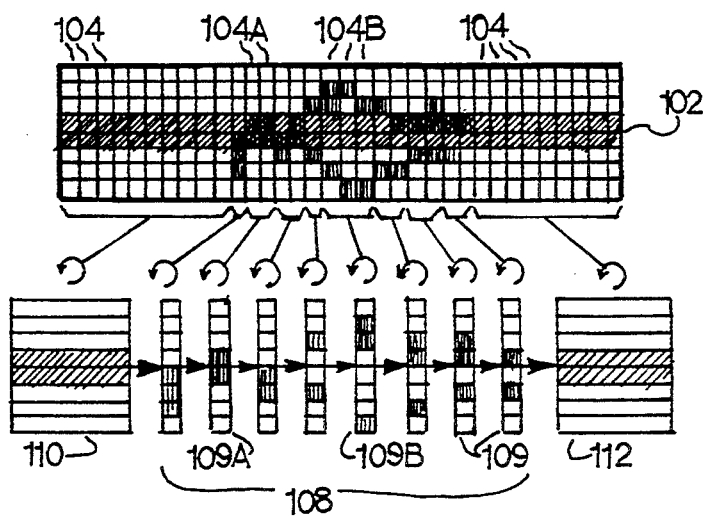
FIG. 2 is a schematic representation of a token, comprised of a series of parameter vectors, used to represent an utterance, and of the time-alignment and comparison of that token against a word model comprised of a sequence of corresponding parameter vectors.
Figure 3:
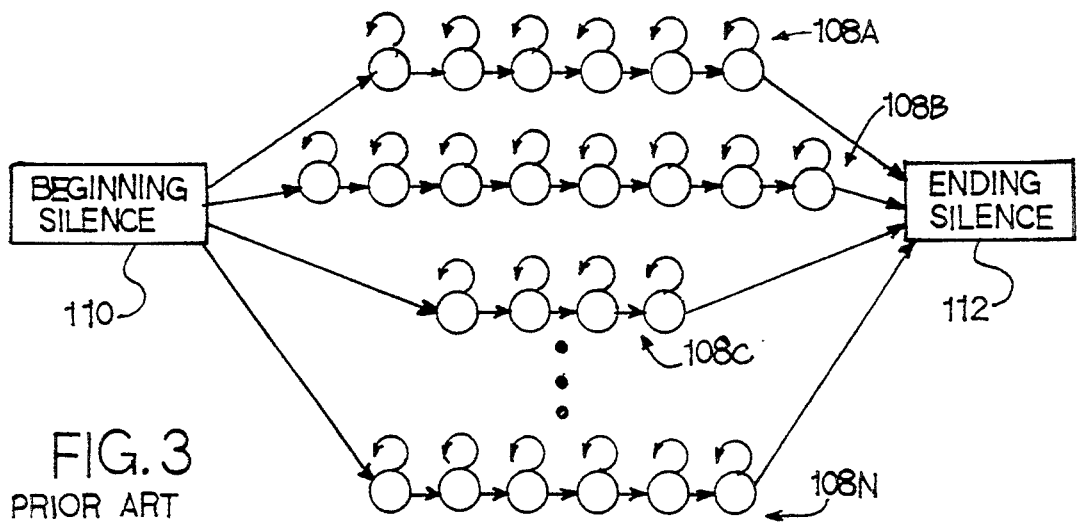
FIG. 3 is a schematic representation of the matching of a token against each of a plurality of models representing different vocabulary words.

As shown in FIG. 10, the .VOC file contains a list 260 of each word in the vocabulary. This list contains for each such word, its ID 263, its phonemic spelling 262, if the word is one which comes predefined with DragonDictate, and a pre-filtering word start 264. As is explained above, the phonemic spelling 262, is roughly similar to the phonetic spelling of words contained in common dictionaries. That is, it gives for each word the sequence of one or more phonemes which describe the speech sounds which make up the pronunciation of that word. The pre-filtering start 264, identifies the pre-filter model associated with that word. As has been described in U.S. Pat. No. 4,783,803, referred to above, and U.S. Pat. No. 4,837,831 issued to Laurence Gillick et al. on Jun. 6, 1989, and entitled "Method For Creating And Using Multiple Word Sound Models in Speech Recognition" which has been assigned to the assignee of the present application and which is hereby incorporated herein by reference, pre-filtering models are used to rapidly winnow down the number of words which remain viable candidates for a successful match against a given utterance. This is done by scoring the start of the token upon which a recognition is being performed against each of the pre-filtering models and then only performing more complete comparisons, of the type indicated in FIGS. 2 and 3, against words whose associated pre-filtering word start model scores did well in that pre-filtering.

The .VOC file, 162, also includes a list of states 266, which lists for each state a list 268 of the words or included states 269 which are in that state. Then for each of those words or included states it lists the transition 270 to another state, if any, which should be made from that state when a word listed for that state or one of its included states is recognized. In addition, for each word or state in the list 268, there is also an extra data field 272, which normally includes the keystroke sequence the typing of which should be simulated when that word or a word from that included state is recognized. The list of states 266 also includes for each state a default transition 274 and default extra data field 276, which work like the transition 270 and extra data 272 fields, just described, except that they define the transition and the data output which should be produced for any word or included state of a state 267 which do not have such values explicitly defined for them in their associated fields 270 and 272.

FIG. 11 describes the .USR file 164. This file includes the pre-filtering models 280 referred to by the pre-filtering word start fields 264 of the. VOC file. These prefiguring models are somewhat similar to the word models 108 shown in FIGS. 2 and 3, except that they model the beginning sounds of words and except that each one of them is associated with a plurality of word models The .USR file also includes a PIC, or phoneme-in-context, table 282. This table contains for each possible combination of three phonemes found in the phoneme sequences 262 in the. VOC file, a sequence 284 of phoneme elements, or PELs. Also associated with each phoneme triple is a duration model 286 which indicates the time length associated with each PEL in the phoneme triple. The .USR file also includes the PEL model list 288 which defines for each PEL, an ID 291, and the values of its one amplitude parameter 290, seven spectral parameters 292, and twelve spectral parameters 294. Each of these parameters includes both an arithmetic mean and a weighing factor, which is a function of the statistical deviation of the values from which that mean has been derived.

The .USR file also includes a helper model list 296 which includes a list of zero or more helper models. These are word models which the system creates if the user defines a new word for which it does not have a phonetic model, or for words for which the phoneme-based models does not provide good recognition. For each helper model in the list 296 there is stored an identification 298 of the word it represents, the phonetic model, if any, associated with the helper model, and a sequence of PELs, or phonetic elements, 302 defined in the PEL model list 288. The phonetic model 300 is stored with the helper models made for words which have more than one phonetic spelling, such as the word "live", which can rhyme with either "give" or "hive".

Returning to FIG. 12, we can now explain the Adaptive Training Subroutine 152. This is the subroutine called to incrementally improve the models in a user's .USR File by causing those models to include information derived from a token labeled as representing a given word. When the Adaptive Training Subroutine is called for a given token and first choice word, the subroutine tests in step 304 to see if the word has one or more phonetic models. If so, steps 306, 310 and 312 will be performed. Step 306 tests to see if the word against which the token is to be trained has more than one phonetic spelling. If so, step 306 scores the token against each of the phonetic models and selects the best scoring phonetic model as the one against which the adaptive training is to be performed. If step 306 finds that the word only has one phonetic model, step 310 causes that model to be selected for purposes of the adaptive training. Once this is done, step 312 calls the Training Subroutine 326 which actually performs the training.

FIG. 13 describes this Training Subroutine. It is designed to be called with a list of one or more tokens and a given word model, either a helper model or one constructed from the phonemic spelling of a word against which each of the tokens in the token list is to be scored. The Training Subroutine has a loop 328 which repeatedly iterates through scoring the tokens in the token list against the word model until the amount by which that score improves from one iteration to the next is less than a specified amount. The iteration includes a step 330 which causes a step 332 to time-align and score the parameter vectors of each token against the phonetic elements of the word model. Once this is done in a given iteration for all the tokens, step 334 updates the phonetic elements in the word model to reflect the information contained in the token parameter vectors which have been time-aligned against it. The loop 338 is repeated until the amount by which the total score produced by steps 330 and 332 improves by less than a specified amount, indicating that further iteration will yield little improvement in the model and that the training is substantially complete.

Returning to FIG. 12, regardless of whether step 304 causes steps 306, 308, 310 and 312 to be performed, upon the completion of step 304 the Adaptive Training Subroutine executes step 314. This step tests to see whether the phonetic spelling selected for the word to be trained in step 308 or 310 already has a helper model. If so, step 316 calls the Training Subroutine 326, just described, for the token and the helper model. Once this is done, step 318 tests to see if the score obtained by the last iteration of the Training Subroutine is worse than a specified amount, indicating that the helper model is not a good model of the utterance. If so, step 320 checks to see if there is a phonetic model for the word. If so, step 321 deletes the helper model, which will cause the system to rely upon its phonetic model. If there is not a phonetic model for the word, step 322 will call the Train New Model Subroutine 336 shown in FIG. 14 to train a new model for the token.

FIG. 14 describes this Train New Model Subroutine 336. Step 338 sets a variable PEL Number based on the average length of the tokens in the token list. Then step 340 divides each token in the token list into PEL Number segments with each segment having as close to the same number of 1/50th of a second acoustic parameter vectors 104, of the type shown in FIG. 2, as is possible. Then step 342 makes an initial model for the word which has one PEL 109, of the type shown in FIG. 2, for each of the PEL Number segments created in step 340, with the parameters of each such PEL being derived from the vectors 104 of the one or more tokens which are in that PELs associated segment. Then step 344 calls the Training Subroutine with the token list and this initial model. The Training Subroutine iterates through the process of time aligning and updating the PELs of the model until it is substantially an optimal word model based on the acoustic information contained in the one or more tokens of the token list.

Returning to FIG. 12, if the tests in the steps 304 and 3 14 of the Adaptive Training Subroutine both fail, indicating that the word to be trained has no phonetic or helper model, step 324 calls the Train New Model Subroutine, just described, to make a new helper model for it.

Returning now to FIG. 5, we have described how, if DragonDictate receives an utterance whose best scoring word is a Choice Command which selects a word in the alternate choice window, step 256 calls the Adaptive Training Subroutine to train the word selected by that Choice Command against the token of the utterance for which a choice window was displayed.

If, however, the best scoring word for an utterance received by DragonDictate is "Choose-10" or "Scratch That", the system interprets this as an instruction by the user that none of the words displayed in the current choice window, including the first choice word, were intended for that window's utterance. If "Choose-10" or "Scratch-That" is recognized, the condition of step 360 will be met, and step 362 will cause a number of backspace keystrokes corresponding to the number of characters in the best scoring word in the choice window to be sent to the operating system, so as to erase the characters inserted for the former best scoring word by the step 220, when that best scoring word was originally recognized. Step 364 removes the choice window associated with the erroneous utterance, and step 366 removes the utterance's entry in the Oops Buffer shown in FIG. 8.

If the best-scoring utterance returned by the recognizer in step 214 is the OOPS command, the condition in step 368 is met, and step 370 will call the OOPS subroutine 148.

FIG. 7 provides a partial description of the Oops Subroutine. It shows that when that subroutine is called, step 372 makes the second most-recent utterance in the Oops Buffer the current Oops Word. This is done because users can correct the error of the most recent utterance in the Oops Buffer by means of the Choice Commands described above with regard to steps 226 and 360 in FIG. 5. It is also done because when speakers are dictating rapidly they often detect recognition errors after they have said one more word in addition to that for which the misrecognition occurred. Once step 372 has been performed, a loop 374 repeatedly performs the steps 376, 378, and 380 until it is exited from within. Step 376 displays the Oops Menu, which shows the first choice word, Word__1, for each of the last twelve utterances for which there are entries in the OOPS Buffer 160, shown in FIG. 8. It display these first choice words in a special bar across the display screen. Step 376 also displays an alternate choice window immediately above or below the current Oops Word, which, when the subroutine is first called, is the second to the most recent entry in the OOPS Buffer. Then step 378 get input from the user, and step 380 branches based upon that input.

If the input is the word "Choose-1" or "Okay", step 381 removes the Oops Menu and exits the Oops Subroutine, since the user has indicated that the current first choice for the current Oops Word is okay, and this is interpreted as an indication that the user desires to exit the OOPS menu. Before step 381 exits the Oops Subroutine, it sends to the operating system the keystrokes necessary to makes the corrections, if any, made to any first choice words displayed in the Oops Menu. It does this by simulating the typing of a sufficient number of backspaces to erase all the way back to the oldest utterance corrected in the OOPS buffer, and then simulates all the keystrokes necessary to cause the entry of all the first choice words in the buffer from that oldest corrected word forward If the user says "Choose-2", step 382 selects the second choice word in the alternate choice menu, makes it the first choice word for the current Oops word, sets the Confirmed Flag for the current Oops Word, and then removes the Oops Menu and makes all the corrections which have been made to any first choice words in the Oops Menu by sending backspaces and keystrokes to the operating system, as described in the paragraph above with regard to step 381. As is indicated by the ellipses 386 following step 382, the system responds to "Choose-3" through "Choose-9" in a manner which corresponds to that in which it responds to "Choose-2".

The "Choose-n" command just describe is used to not only to choose a word in the current choice menu, but also to exit the Oops Menu and make all the corrections entered while that menu was up. The "Select-n" commands 383 and 384 shown in FIG. 7 are similar, in that they make the nth word in the current choice window of the Oops Menu the first choice word for the current Oops word, set the current Oops Word's Confirmed Flag, and remove the choice window. But they do not cause the Oops Menu to be remove, send keystrokes to the operating system to make the corrections which have been made to the Oops Menu, or exit the Oops Subroutine. The "Select-n" command allows the user to make multiple corrections in the Oops Menu before exiting it.

If the user says "Left-1", step 388 moves the current Oops Word left by one word. Similarly, if the user says "Left-N", other steps will move the Oops Word left by N words. If the user says "Right-N", step 394 or similar steps move the Oops Word right by N words.

The Oops Buffer allows much more rapid dictation, since it frees the user from the need to wait until verifying the results of one recognition before advancing to the next.

Returning to FIG. 5, when step 218 detects that the user has said an utterance other than a command, after steps 224, 220, and 222 are performed, step 392 tests to see if DragonDictate's Confirmed Training Only Flag is false or the Confirmed Flag of the oldest entry in the Oops Buffer is set. This test is performed at this time, because a new entry is added to the Oops Buffer for each utterance other than a command, and, thus, the system should decide whether it wants to use the recognition information in the oldest entry in the Oops Buffer to update word and language models before it overwrites that oldest entry with a new one. Such word and language model updates are normally not performed until a word is removed from the OOPS buffer to give the user time to correct that word, while it is in the OOPS buffer.

The test in step 392 will be met if either the user has actually confirmed an utterance's first choice word, as indicated by a true value for the Confirmed Flag 252, shown in FIG. 9, or if the Confirmed Training Only Flag is false, indicating that the user wants all normal utterances to be used for adaptive training. This flag is provided because, when a user is being careful and watching the output associated with each recognition, he or she is, in effect, confirming the recognition of words by speaking the next word. In such a case, the tokens received from each such utterance would have a high chance of being accurately labeled, and, thus, should be useful for adaptive training. In this case the user should set the Confirmed Training Only Flag to False. In some instances, however, users do not want to take the time necessary to correct most recognition errors. In this instance, the user can set the Confirmed Training Only Flag to True, indicating that only utterances for which the user has explicitly taken the trouble to either correct or confirm the first choice word should be used to train the models.

If the test in step 392 is met, meaning that the utterance should be used for adaptive training, step 394 calls the Adaptive Training Subroutine for the oldest entry in the Oops Buffer, causing its token to be trained against that entry's first choice word, unless that adaptive training has already been called for the utterance in response to a Choice Command or Oops command specifically selecting the first choice for that utterance. Then step 396 calls the Update Onegram, Update Digram, and Update Context Language Model Subroutines 154, 156, and 158 shown in the RAM in FIG. 4. The Onegram Language Model indicates the probability that an individual word will be spoken, based on the frequency with which that word has been spoken in previous text relative to other words. The Digram Language Model indicates the probability of a second word being spoken, given a first word just spoken. This probability is based on the ratio of the number of times the second word has followed the first, to the number of times the first word has occurred, in a given body of training text. And, as will be explained below in greater depth, the Context Language Model describes the probability that a given word will occur when a given vocabulary context is active and the probability that the words in that context will occur if that given word has been spoken. The probabilities from these respective language models are combined and used to alter the score produced by the acoustic matches, of the type shown in FIG. 2 and 3, performed by the recognizer. This is done so to improve the accuracy of the recognizer's scores by taking into account the linguistic information contained in those language models. A more detailed explanation of the concepts behind language models is given in U.S. Pat. No. 4,783,803, described above.

The language model update subroutines called by step 396 are used to update the language model statistics for the Onegram, Digram, and Context Language Models to reflect the recognition of the first choice word of the oldest entry in the OOPS buffer. The Onegram language score is updated merely by incrementing both a count of total words and a count for the particular first choice word. The digram language model is updated by increasing the score for the digram associated with the last word which was used to update the language models and the current word being used to update the language model, and the method of updating the context language model will be described below in more detail with regard to FIG. 25.

Once the language models have been updated, step 398 cause a copy of the oldest entry's token to be saved in conjunction with the entry's first choice word if the Saving Token Flag has been set. This flag indicates that the user wants tokens to be saved in a file for purposes of batch training. Once this is done, step 400 adds a new entry to the OOPS buffer for the most recent utterance, including its token, 9 best scoring words, and a zero confirmed flag indicating that the user has not yet specifically confirmed its first choice word.

As is described above, when DragonDictate operates in the background as a TSR, it normally responds to utterances by inserting characters or backspaces into the DOS program which is currently being executed and by putting up Oops Menu or Choice windows. If, however, the user presses the plus key or says an utterance associated with the Voice Console Subroutine, either step 210, or another step not in FIG. 5, will cause the Voice Console Subroutine 146 to be called up.

FIG. 6 describes portions of the Voice Console Subroutine which are relevant to the present invention. When it is called, step 402 checks to see if the system has .VOC and .USR Files defined for any users. If so, it will enable the full Voice Console Menu 401 shown in FIG. 26. If not, step 404 will cause the Voice Console Menu to only have the Load User and Exit commands active, which causes that menu to appear as shown at 40 1A in FIG. 27. Then the subroutine advances to step 406, which is its command loop. At the top of this loop, the subroutine performs a step 406 which clears other Voice Console prompts, if any, and displays the Voice Console Menu 401 shown in FIG. 26, or 401 A shown in FIG. 27. Then step 410 waits for user input and step 412 branches upon that input once received.

If the input is Load User 414, step 416 prompts for a user name with the window 418 shown in FIG. 28. After step 420 gets such a user name, step 422 tests to see if the name entered is a new one, that is one for which there are no associated .VOC and .USR files. In the preferred embodiment, the actual characters entered in response to the user name window 418 must be limited a string of no more than eight characters, and that string is used to define the part of the .VOC and .USR file names which proceeds the "." in those file's names.

If the test of step 422 is met, indicating that the user has typed a name for which there are no associated .VOC and .USR files, step 424 asks the user if he wants to create a new user, as is indicated by the window 426 shown in FIG. 29. This window lists the user name typed in response to window 418, following it by a "Y/N", asking for a "Yes" or "No" answer, respectively. If the user presses "N", step 426 returns to the top of the Voice Console loop 406. If the user presses "Y", indicating that the user does want to create a new user, step 428 causes step 430 and step 432 or 434 to be performed. Step 430 places the prompt window 436 on the screen, as shown in FIG. 30. The prompt explains that it would be beneficial for the user to run the Tutorial Program 172, and asks whether or not to start the tutorial with a "Y/N". If the user responds "Y", step 432 exits from the Voice Console Subroutine and then loads and runs the tutorial. The operation of this tutorial will be described at length below. If the user decides not to run the tutorial, step 434 will exit the Voice Console and will then load and run the Select Base Vocabulary Program 186 shown in FIG. 16.

Running the tutorial is very beneficial because it not only teaches the user how to use DragonDictate, including its error correction, but also because it is designed to reliably capture utterances of a significant number of known words with can be used for both adaptive and batch training. These tokens enables the speech models which come with DragonDictate to be significantly improved for use at recognizing an individual user's speech patterns. If, however, the user doesn't wish to take the time to run the tutorial, step 434 at least forces him to perform the very quick Select Base Vocabulary Program 186.

FIG. 16 shows the Select Base Vocabulary Program. In step 436 it displays a sentence of text and prompts the uses to separately read each highlighted word in that sentence. Then a loop 438 successively highlights each word, waits for the user to utter that word in response to its being highlighted, and then labels that utterance's token as being for the highlighted word. Once this has been performed for the whole sentence, step 440 scores each utterance's token against its labeled word in each of more than one base vocabularies. Base vocabularies correspond to separate USR files containing separate phoneme-in-context tables 282 and separate PEL model lists 288 to reflect the speech patterns of different populations of speakers. In the current embodiment, there are two base vocabularies which correspond approximately to models for male and female speakers. It should be appreciated, however, that in other embodiments different base vocabularies could be used, including base vocabularies for people with each of plurality of types of accents. Once step 440 has scored the utterances associated with the displayed sentence against each base vocabulary, step 442 finds the total of the scores of all of those words against each of the base vocabularies, and step 444 selects the base vocabulary with the total best score as the user's .initial USR file, and causes all further recognition and training for that user to be performed with and upon the acoustic models in that .USR file.

Returning now to FIG. 6, if the user types a user name in response to the prompt of step 416 for which the system already has .VOC and .USR files, step 446 selects those .VOC and user files for use by the DragonDictate Program. And then step 448 exits the Voice Console. It should be appreciated that when the program exits the Voice Console, as is shown in step 432, step 434, or step 448, the DragonDictate Program continues to stay resident as a TSR.

If the user input in response to the Voice Console menu displayed by step 408 is the selection of the Utilities Command 450, steps 452 will display a Utilities Menu and wait for input. If that input is the Parameters Command 454, steps 456 will display a Parameters Menu and wait for input. If the resulting input corresponds to the Confirmed Training Only Command 468, the system will set the Confirmed Training Only Flag, referred to above in step 392 of FIG. 5. Similarly, if the user selects the Save Tokens Command 460 in the Parameters Menu, the system sets the Save Token Flag, referred to above in step 398 of FIG. 5.

As was stated above in the discussion of FIGS. 5 and 12, DragonDictate normally performs adaptive training, either on every normal utterance received, or on only those for which the user has specifically selected or confirmed the first choice word by use of a choose command or the equivalent. Such adaptive training has the benefit of improving recognition performance as soon as the user starts to use the system. It also has the benefit &being performed in the background without requiring any effort on the part of the user, or taking an noticeable time away from the use of the program for recognition purposes. However, it is well known in the art, that given a certain number of utterances which have each been labeled as being associated with given words, one can better train word models from those utterances by using batch training rather than adaptive training. This results for two major reasons. First, when training is performed upon a relatively large number of utterances at once, all the utterances which correspond to a given word can be compared against each other and those which do not appear to be similar to the other utterances for the word can be rejected as erroneously labeled utterances. This substantially reduces the chance that utterance that don't sound anything like a given word will be used to train, and, thus, corrupt the model for that word. Secondly, in batch training the iteration 328 of the Training Subroutine shown in FIG. 13 can be performed using all the utterances associated with the given word rather than being performed for only one word. As a result, this iteration process weights all the words evenly and tends to produce a model which more accurately represents all of those words. Thus, the resulting word model tends to provide a more statistically accurate model of the utterances of the word it is to represent.

FIG. 15 describes the Batch Training Program 184. It includes a loop 464 which is performed for each word in the batch training file for which there is one or more tokens. For each such word, step 466 tests to see if the word has one or more phonetic models. If it does, steps 468, 470, and 472 are performed. Step 468 performs a step 469 for each phonetic model the given word has. Step 469 scores all the tokens associated with the given word against that phonetic model and removes any outlyers, that is words which score poorly against that phonetic model from a token list which is created for that phonetic model. After step 468 is performed for each of the one or more phonetic models associated with the given word, there will be a list of the tokens associated with that word which appear to be utterances of that phonetic model. Once this is done, step 470 checks to see if any token is on the token list of more than one phonetic model for the given word. If so, it removes that token from the token list of all such phonetic models except the one it scores best against. Then step 472 calls the Training Subroutine for each such phonetic model and its associated token list.

Step 476 explains how the Batch Training Program operates if the word has a helper model. And step 478 explains how it operates if it has no phonetic or helper model.

As can be seen from the discussion of the DragonDictate speech recognition system, above, it is important for that system to obtain properly labeled utterances of a several hundred words in order for the system to properly train the acoustic models in the .USR file to reflect his or her own speech patterns. If the user does not properly correct misrecognitions when they occur, utterances used to perform adaptive or batch training may be erroneous, and thus cause such training to produce far from optimal performance, or perhaps even degrade recognition. Thus, it is important to help users adaptively train speech models in a way that reduces the chance that training will be performed upon erroneously labeled utterances. It is also desirable that such tokens be derived from utterances which are spoken in the same way in which the user speaks when actually using DragonDictate. In addition, it is desirable to properly train users how to operate the speech recognizer, including, in particular, its error-correction capabilities, so that as they continue to use the system, they will get satisfactory performance, and that future adaptive training will have a positive effect. To help accomplish all these goals, the inventors of present application have designed a Tutorial Program 172. This program interprets and executes instructions contained in a Lesson File 182, which causes it to provides a sequence of programmed instruction and exercises for the user.

FIG. 17 provides a highly simplified description of the Tutorial Program 172. It shows a first step 460 which initializes the Tutorial Program, and then a loop 461 which is repeated as long as the user stays in the Tutorial Program. This loop repeatedly performs steps 462 and 463. Step 462 reads the next line from the lesson program and step 463 interprets and executes the instructions contained in that line. Step 463 includes the use of an interpreter which parses each line of the Lesson File 182 to determine what should be done in response to that line and then it performs that function. How to make such interpreter is well known in the computing arts. Loop 461 is continued until the user or the lesson cause the loop to be exited.

As is shown in FIG. 18, the Lesson File is comprised of a sequence of chapters 446 and plurality of modules 466, including a Dictation Module 466A, a Global Module 466B, and a Tutor Menu Module 466C.

FIG. 19 represents a typical chapter. Each chapter normally starts with a DEFAULT step 469 which places entries for the chapter in the Defaults section 474 of the Tutorial Program's Event Stack 471.

FIG. 32 displays the contents of the Event Stack at a given point in time. This stack contains a listing of the events to which the tutorial will respond to at any given point. Most of these events correspond to user inputs. The user responses specified in the Event Stack, combined with the expected response defined by the current lesson, described below, define the tutorial's currently allowed responses. These are the only responses for which the tutorial has a defined response. As can be seen from FIG. 32, most entries in the Event Stack are followed by a command to CALL or GOTO a given named lesson in the Lesson File. Each such command will be executed when a user's input corresponds to the event which precedes it on the left in the Event Stack. The Event Stack includes a Globals section 472 which includes responses always allowed when in the tutorial. These include saying the "get help" command, which causes help information to be displayed and "Tutor menu", which places the Tutor Menu shown in FIG. 33 on the screen and allows the user to jump to any selected chapter in the Lesson File. Entries placed in the Defaults section 474 of the Event Stack normally remain there, and in effect, as long as the Tutorial Program is executing the chapter which installed them. Entries placed in the Cases section 476 of the stack only remain their during the lesson which placed them there. The Ceiling section 477 is used to temporarily store entries which were in the Cases section when a call to another lesson is being executed.

Returning now to FIG. 19, after the DEFAULT step, each chapter normally contains a plurality of lessons 468. Each such lesson can contain an optional step 470A in which it displays a message to the user, an optional step 470B in which it fakes or simulates a dictation action, and an optional step 470C in which it adds entries to the Cases section 471 of the Event Stack 476 shown in FIG. 32. When such entries are added to the Cases section of the Event Stack, they normally are for words which represent common mistakes which users often make in the exercise associated with the particular lesson, or they are alternate response words which normally are other words which accomplish the same thing as the expected response. Usually each lesson includes a step 470D, which causes the tutorial to wait for the user to provide an expected response, in the form of an expected word or keystroke. If the response is recognized as an utterance of one of the limited number of an allowed response words, a token of the utterance is used to perform adaptive training on the models for that allowed response word and is stored in a batch training file as a token of that allowed response word. Once an allowed response is received from the user, step 470E advances to the next lesson 468 if the user's input is the expected response, or else it branches to a location in the Lesson File indicated by the function following that response in the Event Stack.

Figure 31:
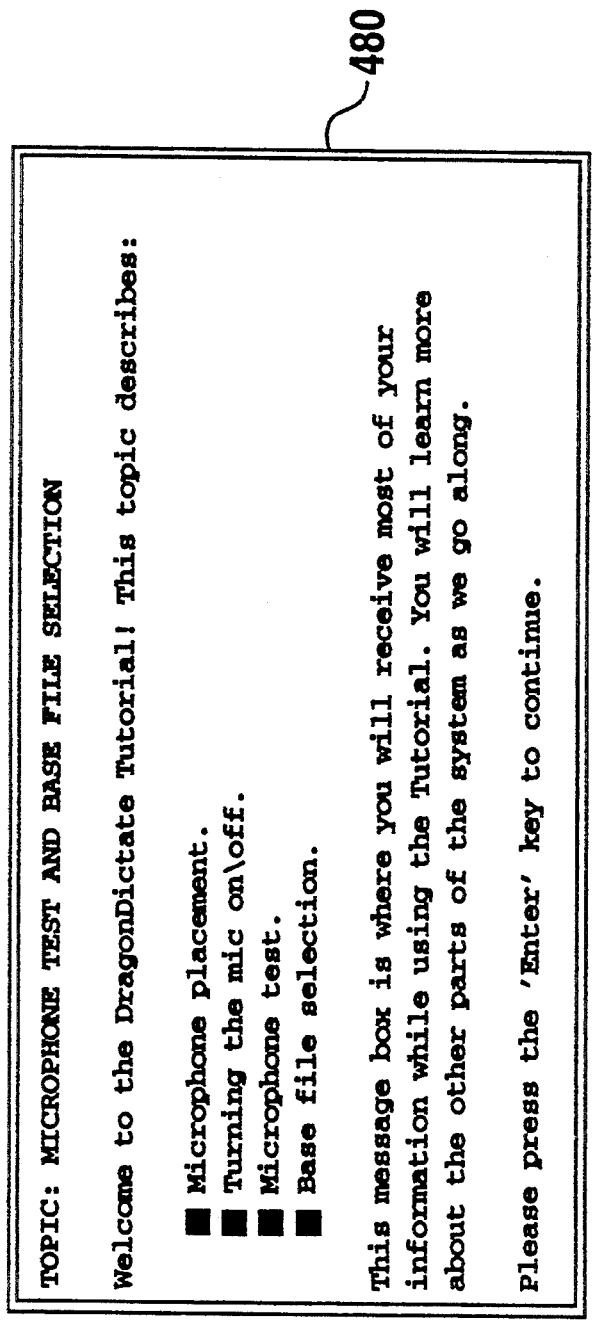
FIG. 31 is a representation of the screen prompt which results when a new user first enters the Tutorial Program of FIG. 17.

Returning now to FIG. 18, as was described above with regards to step 422 of FIG. 6 and FIGS. 26 through 30, when a new user is defined with the Voice Console Subroutine, the user is encouraged to run the Tutorial Program. If the user selects to do so, the Tutorial Program is loaded and it starts to interpret and execute the Lesson File. This will cause the Tutorial to start executing chapter 1 of the Lesson File. In Chapter 1, step 476 places allowed responses for the chapter in the Defaults section 474 of the Event Stack. Then, a lesson 468A displays the introductory screen shown in FIG. 31 and waits for the user to press the "Enter" key as is prompted in the message box 480 shown in that figure. In a subsequent lesson 468B in that chapter, the user is prompted to run the Select Base Vocabulary lesson. When the user does so, the Lesson File contains instructions which cause the Tutorial Program to be temporarily exited while the Select Base Vocabulary subroutine 186 described above with regard to FIG. 16 is executed. This selects the .USR file which is best for the user, providing the user with a set of initial models for use with adaptive training which most closely represent his or her speaking patterns. It also improves the reliability of recognition during the Tutorial, increasing the accuracy of adaptive training and batch training performed as a result of the tutorial.

The Lesson File includes a plurality of chapters which instructs the user how to operate different aspects of DragonDictate, such as the chapters 2–13 shown in FIG. 18. It also contains a chapter 464C which includes a lesson 468C which asks the user in a step 486 whether or not he or she wishes to exit the Tutorial and perform batch training. If the user says yes, the Tutorial Program will be exited and the Batch Training Subroutine described above with regard to FIG. 15 will be called. This causes batch training to be performed using all the tokens for allowed response words received by the Tutorial. If the user selects not to perform batch training, the Tutorial will continue on to an Exit Lesson 468D in which a message window asks the user if he wishes to exit the Tutorial in step 490. If the user selects to do so, step 492 will exit the Tutorial. If not step 494 will prompt the user to call a tutor menu which describes his options if he should decide to stay within the Tutorial.

In addition to the chapters 464, the Lesson File also includes a plurality of modules 466. These include a Dictation Module which includes lessons called by other lessons 468 to receive and respond to user input, including utterances, in specified ways. The Global Module 466B include other non-dictation lessons which are called or jumped to by other lessons. The Tutor Menu Module 466C includes lessons which display a Tutor Menu, the first page of which is shown in FIG. 33 and which responds to each of the commands shown in that menu by performing the function indicated next to that command. As is indicated by FIGS. 26 and 27, the user can execute the Tutorial Command from the Voice Console Menu which causes the Tutorial Program to load and start executing Tutor Menu Module, popping up the Tutorial menu shown in FIG. 33. This enables the user to refer to any of the Chapters contained within the Tutorial at any time when using DragonDictate, and to branch to any of those chapters as desired. The Tutor Menu can also be accessed at any time when using the Tutorial Program by saying "Tutor menu", as is indicated in the Globals section 472 of the Event Stack in FIG. 32. This enables the user to selectively move to, or skip over, individual chapters as desired.

FIGS. 34 and 35 provide examples of text from the Lesson File used with a preferred embodiment of the invention. This text is shown in FIGS. 34 and 35 in an uncompiled format. However, the actual Lesson File interpreted by the Tutorial Program is compiled to reduce memory space.

The lines 502 at the top of FIG. 34 start with "*", indicating the lines are comments intended to be read by humans, not the Tutorial's interpreter. Since they are not meant for the interpreter, all lines starting with a "*" are not placed the compiled version of the Lesson File. The lines 502 show that the portion of the lesson shown in FIG. 34 corresponds to chapter 7, 464B, of the Lesson File shown in FIG. 18. This chapter relates to correcting dictation with the choice list. The text on line 504 identifies the starts of a chapter. When the lesson text is compiled, it causes the address of this location in the compiled lesson file to be identified as that of the start of the specified chapter. Lines 506 all include DEFAULT statements, which cause event words following those DEFAULT statements and their associated function to be loaded into the Defaults section 474 of the Event Stack 471. These events and their associated functions will remain loaded in the events stack as long as the Tutorial continues to execute their associated chapter.

Line 508 causes the simulated text editor used in the screens of the Tutorial shown in FIGS. 36 through 63 to be cleared. As will be explained below, when the user simulates dictation, the Tutorial will insert words into the simulated editor in a manner similar to that in which DragonDictate would insert words into a text editing program used in conjunction with it. Lines 510 are CONSOLE commands which cause the sound board 136 to respond to the microphone 122 shown in FIG. 4 and which turn the sleep mode of the system, which causes it to ignore all words except a special wake-up command, off. Then line 512 hides the prompt window. As will be shown in FIGS. 37 through 63, the prompt window is a window used to supply the user with text to read when simulating dictation. Next, line 514 causes the simulated editor to be shown. At this time, however, the simulated editor is empty, since no words have been entered into it.

The interpreter of the Tutorial responds to a sequence of lines, such as the lines 516, which start with "''" by placing the following text in each of those lines in a window on the screen. Normally it will place such text in a message box, which is usually a long box near the center of the screen. But if there is already a message box on the screen when a sequence of lines starting with "''" occurs in the lesson text, the text on those lines is placed in a help box, which is a smaller box often located in the upper left-hand corner of the screen. The sequence of lines 516 results in the display of the message box shown in FIG. 36.

The next line 518 is an EXPECTING command, stating that the program is expecting an utterance of the word "Okay". The EXPECTING command calls the Get Expected Response Subroutine 178.

FIG. 20 describes tiffs Get Expected Response Subroutine. Its step 520 calls the Get Allowed Response Subroutine 180 shown in FIG. 21. As will be explained below, this subroutine will only return if the user responds with an allowed response; that is, either the expected response defined by the EXPECTING command calling the Get Expected Response Subroutine or a response defined in the current Events Stack. Once the Get Allowed Response Subroutine returns with the user's allowed response, step 522 returns to the EXPECTING line of the Lesson File if the user's response was the expected word. If not, step 524 finds the function associated with that response in the events stack and execute it. As can be seen from FIG. 32, these functions normally call other lessons in the lesson program, as is indicated by the "CALL" functions, or jump to such lessons, as is indicated by the "GO TO" functions. If the Event Stack function performed by step 524 is a CALL to a lesson, and if, after that lesson is executed it returns to the Get Expected Response Subroutine with a "REPEAT" value, step 525 will cause the program to jump to step 520, so as to repeat the performance of the Get Expected Response Subroutine all over again.

For example, if the user says "Tutor menu" when the EXPECTING command is expecting another word, step 524 will cause a CALL to the global-mainmenu lesson in the Global Module, as is indicated in the Globals section of FIG. 32. If the user does not use the Tutor menu to branch to another part of the program, but instead returns, it will return to step 525 with a "REPEAT" value. This will cause the Get Expected Response Subroutine to wait for the user to say the response expected by the EXPECTING command before returning to the line after that command in the Lesson File. This, is done so that the user will not advance in the tutorial unless he or she has entered the expected response, or its equivalent. This allows the Lesson File to assume that the user has entered a given set of responses by the time it gets to a certain location in the tutorial. It also helps ensure that the tutorial gets utterances of all the words it expect.

FIG. 21 explains the Get Allowed Response Subroutine 180, called by the Get Expected Response Subroutine, just described. As stated above, the Get Allowed Response Subroutine does not return until the user has entered what the subroutine considers to be an allowed response, that is, either the expected word defined by the EXPECTING command which caused the call to Get Allowed Response or an event on the current Event Stack.

In step 526 this subroutine sets a variable Utterance Number to zero. Then an Utterance Loop 528 repeats a sequence of steps until exited from within. The first step of the Utterance Loop, step 530, increments the Utterance Number variable, causing that variable to provide the number of the current pass through the Utterance Loop. Then a step 532 waits for user input. If the input is a keystroke and if it is an allowed response, step 534 exits the subroutine, returning the key as the response. If on the other hand, the response is an utterance, Step 536 calls the large vocabulary recognizer to score the utterance against a large vocabulary, such as the full 30,000 words DragonDictate vocabulary. The call in step 536 requests the recognizer to return the best-scoring 25 words produced by the recognition attempt, with the score for each. Once the call to the recognizer has been completed, step 538 sets a variable User Response to zero. Then step 540 advances to the Word List Loop.

The Word List Loop is performed for each word returned by the recognizer in order of its recognition score, with best-scoring words first. The first step of the Word List Loop tests to see whether the score for the current word is worse than a given level. If so, it exits the Word List Loop, causing the program to advance directly to step 544, described below. If the current word for the current pass through the Word List Loop is an allowed response word, then steps 548, 550, 552, and 554 are performed. Step 548 sets the User Response variable to the current word for which the word list loop is being performed. This word will be the best-scoring allowed response word returned by the call to the large vocabulary recognizer in step 536. This will be the case since the Word List Loop starts with best-scoring words first and since step 546 will only allow step 548 to be performed if the current word is an allowed response and since when step 548 is reached the Get Allowed Response Subroutine will be exited before any subsequent pass through the Word List Loop can be made. Next, step 550 calls the Adaptive Training Subroutine 152, described above, to update the acoustic models associated with the best scoring allowed response word from the token of the current utterance if that word is the currently expected word. In the call to the Adaptive Training Subroutine in step 550, if there are currently any token[x]s which have been stored from previous passes through the Utterance Loop 528 which closely match the token of the current utterance which score well against the expected word they are also used in the adaptive training. Then, if the best scoring allowed response is the expected word, step 552 labels that token with the expected word in a file for use in possible batch training. In step 553 the program exits the Get Allowed Response Subroutine and returns to its calling program with the best scoring allowed response word as the User Response.

If the Word List Loop is completed, the program advances to step 544. It tests to see whether the User Response variable is zero. If so, this indicates either that none of the twenty-five words returned by the large vocabulary recognizer was recognized as an allowed response word, or that, if any of those words did correspond to an allowed response word, their recognition scores were all worse than a given level.

It should be noted that the call in step 536 to the recognizer uses a large, multi-thousand word, vocabulary even though the system is only seeking an utterance which corresponds to a small number of allowed responses. This is purposely done to improve the reliability of the Tutorial's recognition. When traditional recognizers seek to determine if an utterance corresponds to a word in a small active vocabulary, they usually only score that word against the words of that small vocabulary. Unfortunately, this often causes utterances which do not correspond to the small number of active words to be recognized as one of those words. This happens because such an utterance will always score best against one word in such a small vocabulary, and since it is possible that its score against that word might not be bad enough to cause it to be rejected. In the Get Allowed Response Subroutine, however, a word will be rejected as not corresponding to an allowed response not only if its recognition score falls below a certain level, but also if it is not one of the twenty-five best-scoring words returned by the thirty-thousand word recognition. Thus, for example, if the user says a word which is only roughly similar to one of the allowed response words, it is likely that that utterance will be rejected, since it is likely that out of the vocabulary of thirty-thousand words more than 25 words will score better against it than one of the allowed response words.

Although this concept of scoring utterances against large vocabularies when there is only a small active vocabulary could be used in many different contexts, it is particularly useful in the Tutorial, where preventing mislabeling of utterances is particularly important, since they are being used to perform a new user's initial adaptive training of base vocabulary models.

If the test of step 554 is met as was stated above, it indicates that the last utterance was rejected as most likely not being an utterance corresponding to either the expected word or any other allowed response word. But, since the Tutorial is training new users, and since it is possible for some people to speak words very differently than indicated by the models contained in the USR files which comes standard with DragonDictate, the Get Allowed Response Subroutine does not merely reject the utterance. If the User Response variable for a given utterance is zero, steps 556, 558 and 560 are performed. Step 556 saves the token in an array of tokens with an index corresponding to associated Utterance Number. Then step 558 places a prompt window on the screen asking the user to repeat what he just said if the utterance number is 1, indicating that the rejected utterance was the first utterance received in the current call to Get Allowed Response. If however the current utterance number is greater than 1, the test of step 560 is met, which causes steps 562 and 564 to be performed. Step 562 places a help window on the screen which prompts the user to explicitly say the current expected word specified by the EXPECTING statement in the lesson which gave rise to the current call to Get Allowed Response.

Then, if the Utterance Number is three or greater, steps 566, 568 and 576 are performed. Step 566 compares all of the tokens which have been stored in the token array by passes through the Utterance Loop with each other. Step 568 tests to see if any three of those tokens score within a given distance of each other, indicating that the user has most probably said an utterance of the same word three times. If this occurs the system assumes the user is saying the expected word since at least one of those utterances has been made after step 562 has explicitly prompted the user to say the expected word. If this is the case, step 570, 572 and 574 are performed. Step 570 labels the 3 closely-scoring tokens with the expected word and saves them for use in adaptive training and possibly batch training. Then step 572 sets the User Response to the expected word, and step 574 exits the Utterance Loop which causes the program to advance to step 584, which calls the Adaptive Training Subroutine for the currently expected word and the 3 best-scoring tokens and then exits the Get Allowed Response Subroutine.

If the test 568 is not met, indicating that none of the three utterances score sufficiently dose to each other, step 576 will be performed. It tests to see if the utterance number equals five. If so, steps 578, 580 and 582 are performed. Step 578 finds the three tokens which compare most closely to each other and labels them as the expected word for future use in adaptive training and possible batch training. Then step 580 sets the user response to the expected word and step 582 exits the utterance loop, causing the program to advance to step 584 which performs adaptive training on the three best-scoring tokens found by step 578 and then exit the subroutine.

The Get Allowed Response Subroutine will always return with an allowed response. As can be seen its Utterance Loop 528 will be repeated until either the step 534 returns with a keystroke, step 553 returns with an utterance which scores reasonably well against an allowed word, step 574 exits the Utterance Loop with three utterances which score well against each other, or step 582 exits it after five passes through that loop. Thus the subroutine will only return with an allowed response other than an expected word if that allowed response word scores better against an utterance than some minimum required score and is one of the 25 best-scoring words from among a multi-thousand word vocabulary against that utterance. It will only return with the expected response if A) an utterance has been performed which meets the test just described for other allowed responses, B) if the user has made five utterances which do not pass that test for any allowed word, three of which utterances were made after the user has been explicitly prompted to say the expected word, or C) the user has made three such utterances which, although they do not score favorably against any of the allowed responses score favorably against each other, at least one of which was made after the user was explicitly prompted to say the expected word. Thus, the subroutine provides an effective mechanism for obtaining tokens of utterances which are accurately labeled with an associated word and, thus, provide good utterances for adaptive and batch training. At the same time, subroutine is flexible enough to deal with users which speak certain words very differently than is indicated by the standard models for those words. The system will also normally reject utterances, such as coughs or brief conversation with other people which might occur during a user's performance of the Tutorial.

Returning to FIGS. 34, the lines 590 reset the prompt window, make it visible and turn off its highlight function. The highlight function causes the currently selected word in the window to be highlighted on the screen when that function is turned on. Lines 592 causes each of the words enclosed in slashes ("/") which follow the word PROMPT to be inserted into the prompt window as is indicated in the prompt window 594 shown in FIG. 37. The prompt window is only two lines wide, and, thus, only two lines of the text inserted into the prompt window by the lines 592 are shown in FIG. 37. Line 596 turns the highlighting on in the prompt window, which causes the currently selected word to be highlighted, which is currently the first word in the prompt window, "There", as is indicated by the box around that word in FIG. 37. Lines 598 causes the text in those lines to be inserted in a message window 600 shown in FIG. 37. Line 602 calls the Get Expected Response subroutine 178 with the utterance "new paragraph" being the expected response. This causes the system to wait with the screen having the appearance shown in FIG. 37 until the user enters a response.

Figure 39:
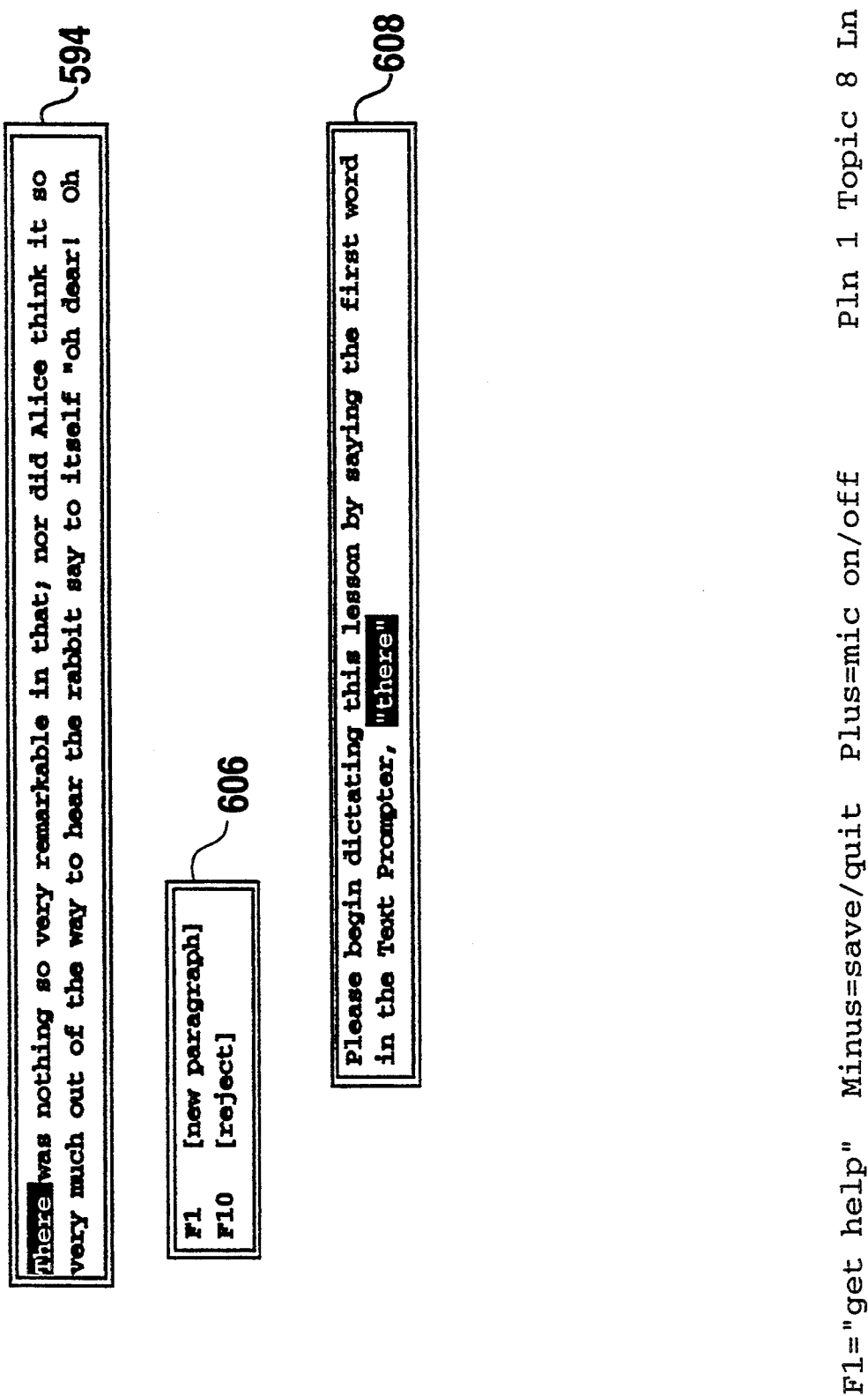

When the user responds by making one or more utterances which are recognized as the expected response, "new paragraph", line 604 causes a choice list 606 to be placed on the screen, as is shown in FIG. 39. In this choice list the expected word New Paragraph is the first choice word. The command "CHOICELIST 1=" 604 indicates that recognition of the expected word is to be simulated in the text editor, but by simulating the entry of its associated keystroke sequence into an editor and by placing a choice menu on the screen which places it as the first choice word. This is done regardless of whether or not the expected word is the best scoring word. The CHOICELIST command uses the best scoring words from the recognizer to fill the slots of the choice window other than that specified by the number before the "=" in the CHOICELIST command. If there are not enough words returned from the recognizer to fill the list, it goes to the word list 260 contained in the .VOC file (shown in FIG. 10) and randomly picks words which are close to the spelling of the expected word. This is done because there will almost always be enough words to fill the choice list, unless the user has performed alphabetical filtering which limits the vocabulary used by the recognizer to words which start with a certain sequence of letter.

In the current example, the system simulates the recognition of "new paragraph" by skipping a line, going to the start of the next line, and causing the next word to be entered to start with a capital letter. Next, line 606 places another message box on the screen, which instructs the user to say the first word in the prompt window, which is the word "There". Then line 610 call the Get Expected Response Subroutine expecting the word "There". At this point, the screen waits with the appearance shown in FIG. 39.

When the user says the expected word "there", the EXPECTING command on line 610 returns. The "CHOICELIST 1-" command on line 612 simulates a recognition of that word, causing it to be inserted into the simulated editor as is shown at 613 in FIG. 40 and for a choice list 224 to be displayed which shows it as the first choice. Lines 616 causes the portion of the message box 618 shown in FIG. 40 to be placed on the screen. Line 620 in FIG. 34 causes a prompt 622 to be added to the message box, instructing the user to say "next page" to see the next page of that message box. The NEWPAGE command 620 includes a call to the Get Expected Response subroutine with the phrase, "Next Page" as the expected word. When the user responds by saying "Next Page" the NEWPAGE command causes the text in lines 622 to be placed on the screen in the portion of the message box 624, shown in FIG. 41. The NEWPAGE command on line 626 causes the portion of the message box 628 to be added, which makes the word "next page" the expected response, and the word "previous page" an allowed response, since there is currently a previous page to the current page of the message box being shown. When the user responds by saying "Next Page", lines 630 cause the text 632 shown in FIG. 42 to be placed on the screen. Since this text is in a message box with a previous page, it contains a portion 634 which makes the phrase "Previous Page" an allowed response. Then the EXPECTING command on line 636 hilites the word "was" and waits for the user to it. When the user says "was", line 638 calls the lesson dictate1-no-error.

FIG. 35 shows the text of the dictate1-no-error lesson 640. Its first line, line 640A, simulates correct recognition of the currently hilited word, CURWORD. This causes the currently hilited word, "was" in our example, to be inserted in the editor's text, as shown at 642 in FIG. 43 and a choice window 644 to display it as the first choice. Then dictate1-no-error continues with the steps 640C-G of its included lesson dictate1-no-error-after. Line 640C advances the currently hilited word, CURWORD, to the next word "nothing" in the prompt window as shown in FIG. 43. Lines 640D and 640E place "Okay" and "Choose-1" into the Cases section 476 of the Event Stack, making them allowed responses, and causing jumps to d1gd-said-okay if the user says either of those words.

FIG. 35 shows the d1gd-said-okay lesson 646. If the program jumps to d1gd-said-okay, the CHOOSE command on line 646A merely causes the last word hilited in the prompt window, which in the case shown in FIG. 43, would be the word "was," to be chosen. This would merely have the affect of removing the choice window for the recognition of that word. Once this was done, the last two lines of the lesson would be executed. These lines are identical to the last two lines of dictate1-no-error. They both wait for the user to say the current hilited word, "nothing" in our example, and once that word is said, return to the lesson from which dictate 1-no-error was called.

Returning to FIG. 34, in the example, such a return would place the interpreter at step 640. This step again calls dictate 1-no-error. This causes a simulated recognition of the word "nothing", inserting it into the simulated editor at 648 and into the choice window 650 as first choice. Dictate1-no-error then, advances the hilite to "so" and then waits for the user to say that word. When the user does line 640 returns. Then lines 652 cause the message text 654 to be placed on the screen, as is shown in FIG. 45, and line 656 calls dictate1-no-error. This simulates the recognition of "so", as indicated at 650 and 658 in FIG. 45, advances the hilite to "very", and waits for the user to say that word.

Figure 46:
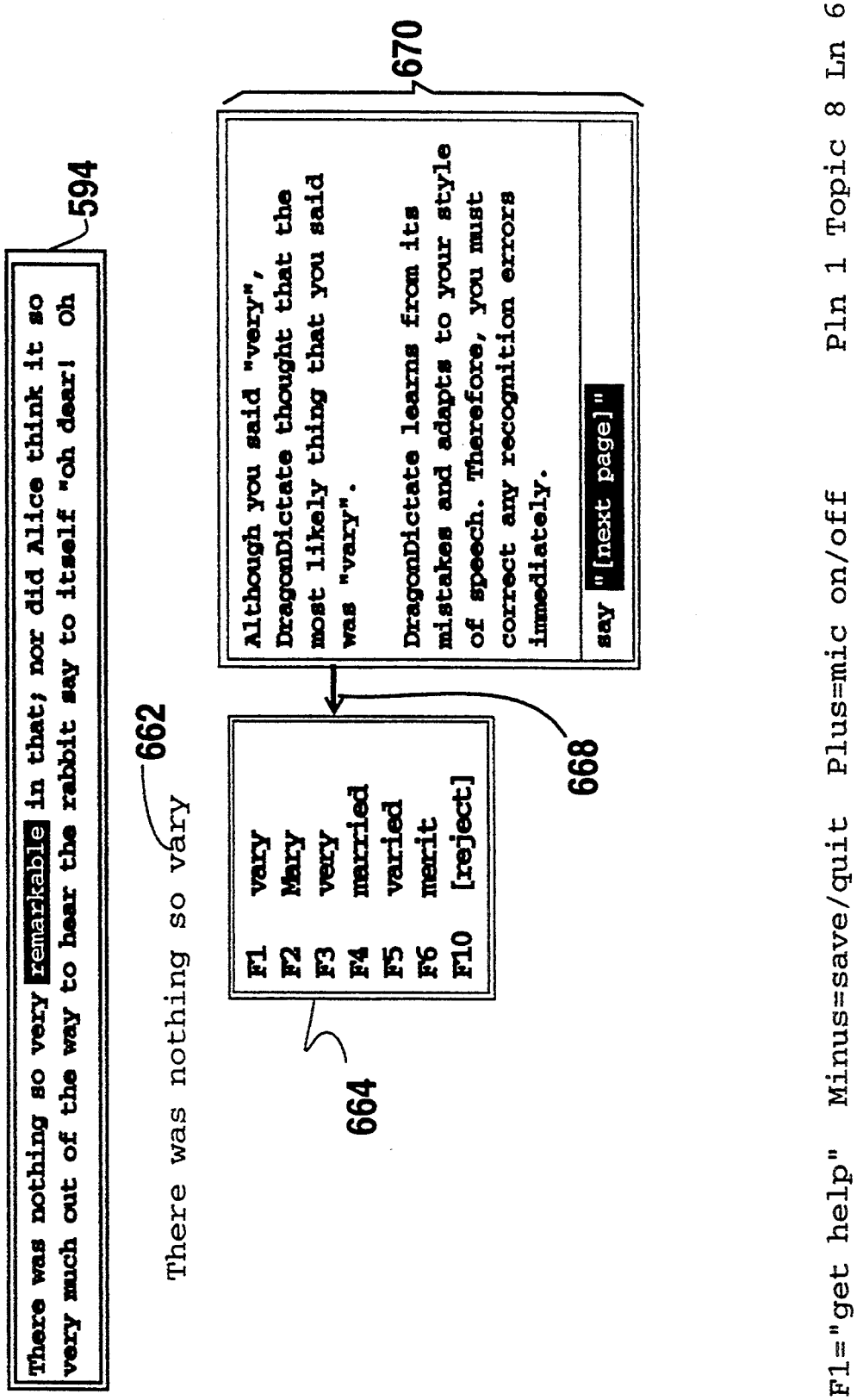
Figure 47:
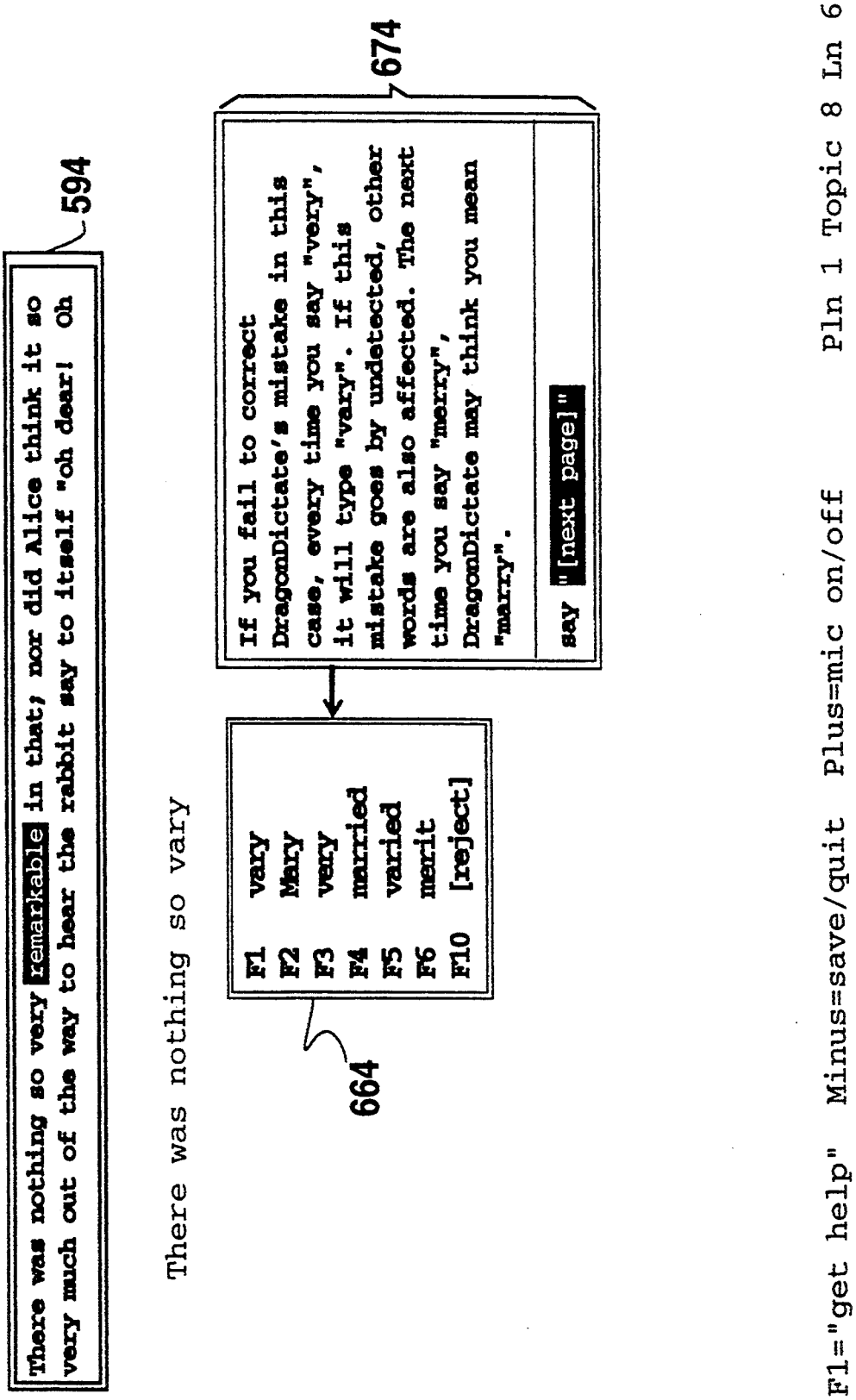
Figure 48:
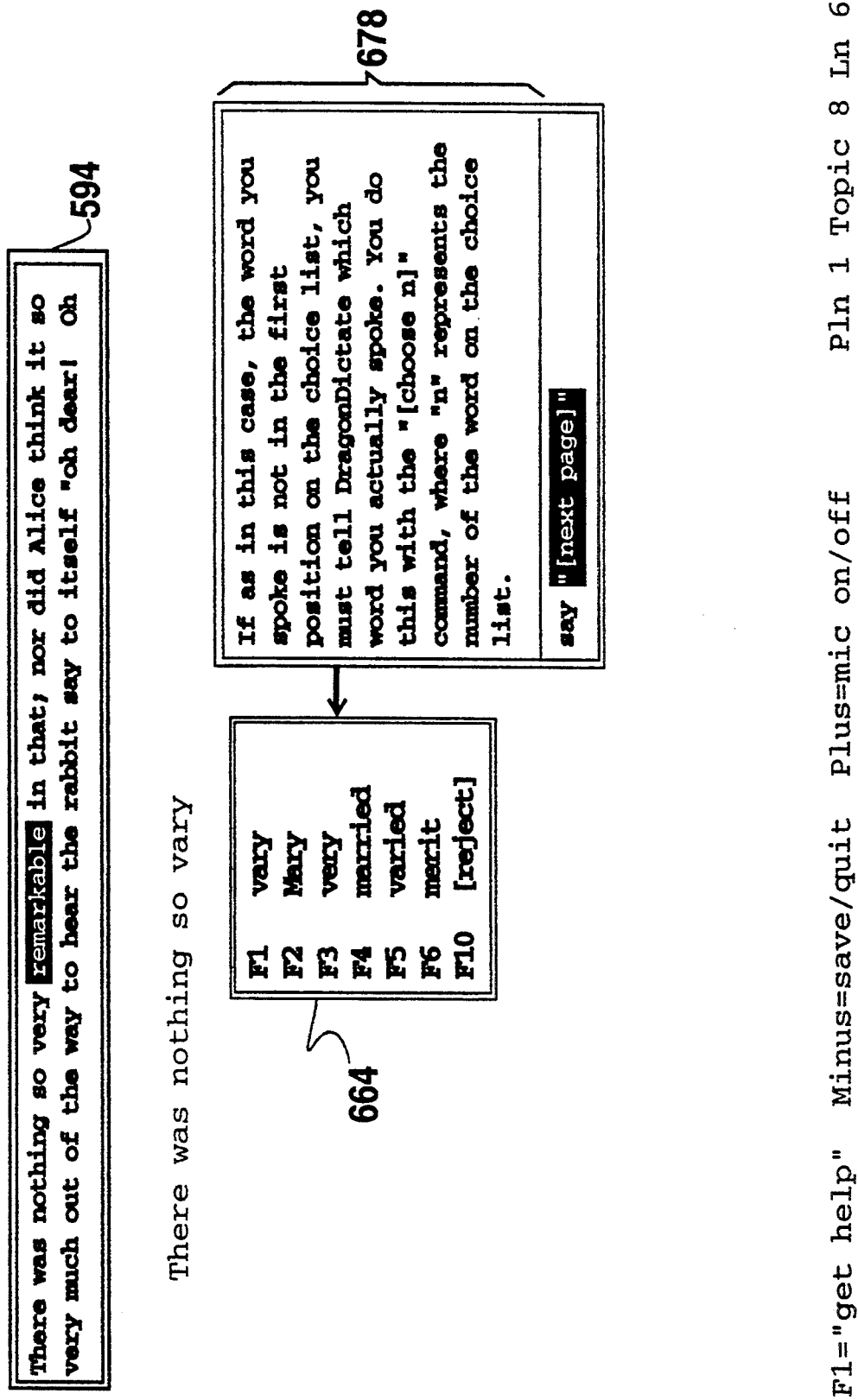

When the user says "very", line 660 simulates a misrecognition, placing the word "vary" in the simulated editor and first place in the choice menu, as is shown in FIG. 46. It also cause the expected word "very" to be listed as the third choice. Finally, it advances the hilite to the word "remarkable". Then line 666 causes the pointer 668 to point to the third choice word "very" to help the user find it, and lines 668 place the message 670 up on the screen, causing the screen to appear as is shown in FIG. 46. This message points out the error and explains the need to correct such errors when they occur. When the user says "Next Page" the program advances to line 672, which displays the message box 674 shown in FIG. 47. Saying "Next Page" a second time, causes lines 676 to display the message box 678 shown in FIG. 48. Saying "Next Page" a third time causes lines 680 to display the message box 682 shown in FIG. 49. The text associated with these message boxes explains how to perform error correction using the "choose-n" command.

Line 684 adds an entry to the Cases portion 476 of the Events Stack of FIG. 32 which indicates that if the user makes the common mistake of saying the next word in the prompt window, "remarkable", rather than correcting the simulated error, the subroutine must-say-choose-n will send a screen message telling the user that he or she must use the "choose" command. Then the EXPECTING command on line 684 waits for the user to say "choose-3". At this time, the screen has the appearance shown in FIG. 49.

Figure 49:
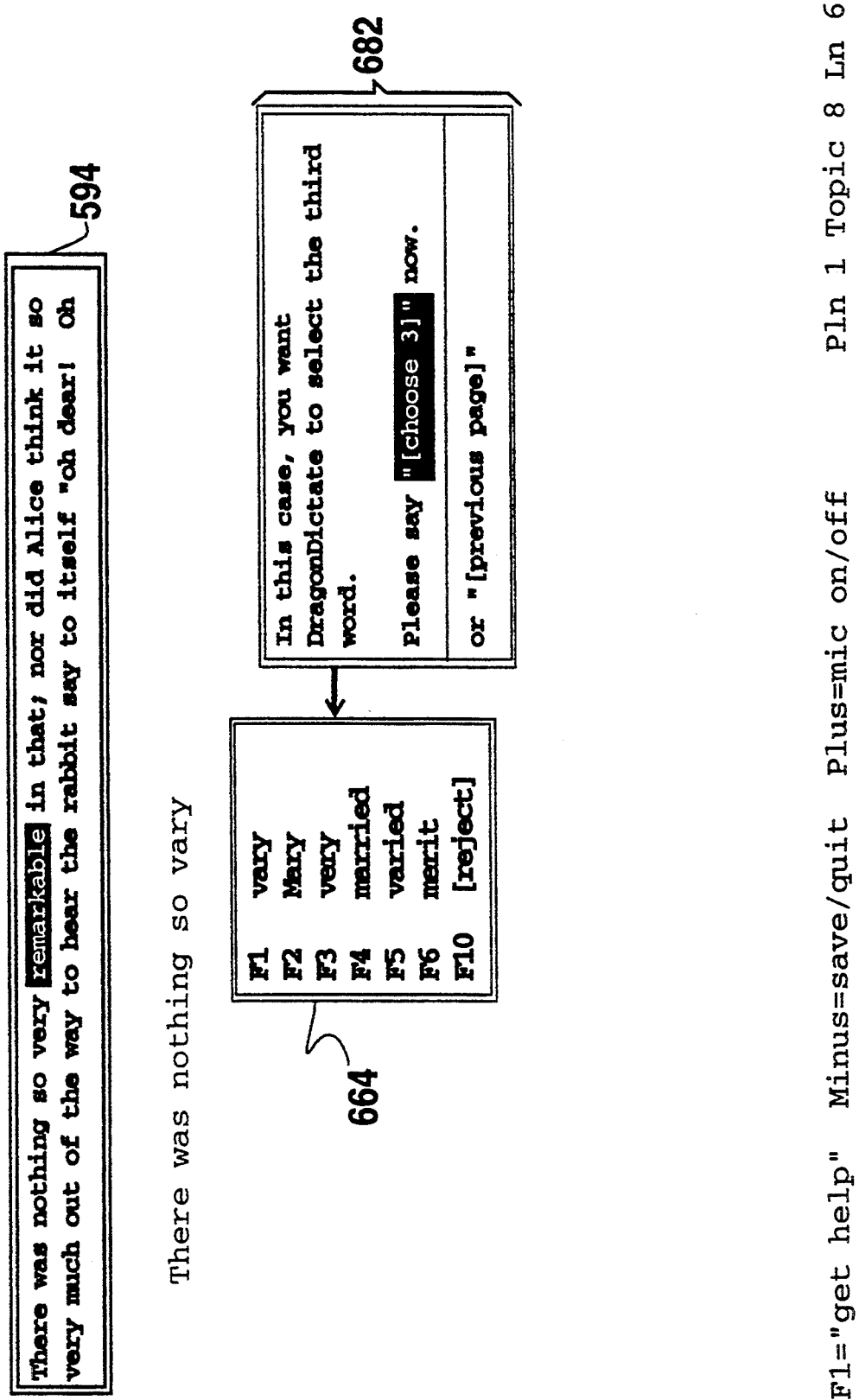

When the user responds by saying "Choose 3", the program advances to line 688 which selects the third word in the choice window 664 shown in FIG. 49 and causes that word to replace the word "Vary" placed in the simulated editor's text, as indicated at 690 in FIG. 50. Once this is done, line 692 and 696 place up the two pages of messages 694 and 698, shown in FIG. 50 and 51, respectively. Then line 700 waits for the user to say "remarkable".

Figure 52:
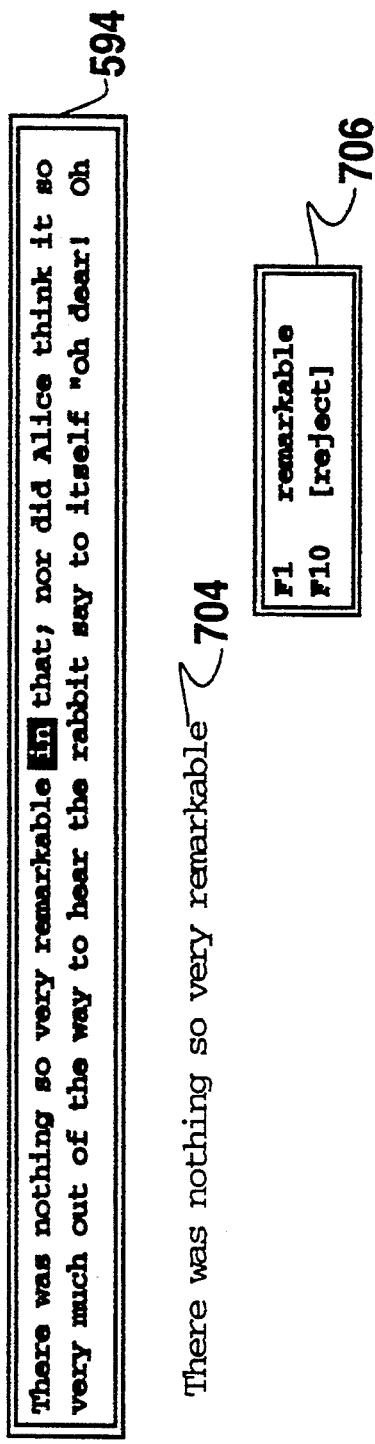

When the user says "Remarkable", line 702 simulates its recognition and advances the hilite to the next word "in", as shown in FIG. 52. Then it waits for the user to say that hilited word. When the user does so, line 708 simulates the recognition of "in", hilites "that", as shown in FIG. 53, and waits for the user to say "that". When the user does, line 714 simulates a recognition of "that" and advances the hilite to ";". Line 720 prompt the user to say "Semicolon", since a new user might not know how to dictate the punctuation mark. Lines 724 have the same effect as lines 640D-E described above with regard to FIG 35. That is, they add entries to the Events Stack so the system will respond to "choose 1" and "Okay" by removing the choice window. Then line 726 waits for the user to say "semicolon". At this time the screen has the appearance show in FIG. 54. When the user says "semicolon, line 728 simulates the recognition of ";" and advances the hilite to "nor", as shown in FIG. 55, and waits for the user to say "nor".

When the user does, line 734 cause the message box 736 shown in FIG. 56 to be displayed which informs the user that there has been a misrecognition and line 738 calls dictate 1-on-list, which simulates such a misrecognition, advances the hilite to the next word in the prompt window, "did", waits for the user to correct that simulated error, and then, once the user has made that correction, waits for the user to say the currently hilited word "did".

FIG. 35 shows the dictate1-on-list lesson 740. It's first functional line is a CHOICELIST command 740A. Because this contains "?={CURWORD}" it causes the last expected word to be treated as other than the best-scoring word. The "?" indicates that the system is to randomly pick the expected word's position on the choice window from among the positions 2-9, and to cause the best scoring word returned by the recognition other than the expected word to be treated as the best scoring word. In our example, this causes "more" to be treated as the best scoring word and "nor" to be displayed as the third best scoring word. Then step 740B causes the next word in the prompt window 594 to be highlighted, which in the current case is the word "did". Then steps 740C, 740D and 740E place the currently highlighted word and the words "OK" and "Choose One" in the Cases section 476 of the Events Stack with the instruction to call the d1on-say-choose-n lesson if the user says any of those words.

This lesson, d1on-say-choose-n, is shown in lines 746 through 746E in FIG. 35. Its line 746A includes an AFTERSEEN command, which increments a count of the number of times the individual line containing that command line has been executed in the current running of the Tutorial. It also tests to see if that count is greater than the number which occurs after the word "AFTERSEEN". If so, the line jumps to the lesson which follows it. Thus, line 746A causes steps 746B through 746E to be performed the first time a call is made to d 1 on-say-choose-n during the current running of the Tutorial. On subsequent calls to that lesson, however, step 746A branches to the lesson d1on-short1-say-choose-n. Line 748A of this lesson, in turn, will jump to d1on-short2-say-choose-n twenty-five percent of the time. If line 748A does not branch, line 748B will branch to subroutine d1on-short3-say-choose-n thirty-three percent of the time. If line 748B does not branch, line 748C will jump to d1on-short4-say-choose-n fifty percent of the time. And if line 748C does not jump, lines 748D through 748F will be executed. Lines 748D cause the text message in lines 748D to be shown to the user. The REMOVEUTT on line 748E causes the utterance of either the hilited word, "okay" or "choose 1" which caused the call to d 1 on-say-choose-n to be removed from the Cases section of the Event Stack. Then the return command returns with a REPEAT, causing the EXPECTING command on line 740F of FIG. 35 to be performed again so the user will correct the error simulated by the call to dictate1-on-list.

The first call to d 1 on-say-choose-n during the running of the Tutorial causes the long message associated with lines 746B to be placed on the screen. Successive calls cause one of the other messages associated with lessons 748, 750, 752 and 754 to be placed on the screen. This is done so the user only receives the long message once for the common mistake of failing to correct an error, and so that subsequent occurrences of that mistake will cause the user to receive randomly chosen messages from among the shorter messages of the lessons 748, 750, 752 and 754. This shortening and then randomizing of common error messages is used often in the tutorial to make the Tutorial seem less "canned" and thus more enjoyable to use. Similarly, the REMOVEUTT instruction in each of the lessons 746, 748, 750, 752, and 754 is used to prevent the user from repeatedly getting an getting error messages if he repeats the same utterance multiple times in a row. REMOVEUTT is used throughout the tutorial to prevent the tutorial from repeatedly sending the user a wrong error message if the system is misrecognizing a word being spoken by the user. It also functions to prevent the users from being insulted by repeated error messages when they repeatedly make the same mistake.

Returning now to our description of dictate1-on-list 740, show in FIG. 35. The line 740F causes a call to be made to the GET EXPECTED RESPONSE subroutine with the "choose ?" as the expected command where "?" is number of the position at which the last expected word was placed in the choice list by step 740A. When the user responds with that expected utterance of "choice ?", line 740G calls the CHOOSE command for the number ?, which causes the previously expected word in the current choice window to be selected, its corresponding text to be inserted into the simulated text editor, and the choice window to be removed from the screen. The EXPECTING command in line 740H then waits for the user to say the currently hilited word in the prompt window, and when that is received, step 7401 returns.

Returning now to FIG. 34, we assume that after the call to dictate1-on-list at line 738 displays the choice window 744 shown in FIG. 56, the user correctly responds by saying "Choose 3", causing the word "nor" to be inserted in the simulated text editor, as shown at 760 in FIG. 57 and for line 740H of dictate 1-on-list to wait for the user to speak the currently highlighted word "did" shown in the prompt window. When this happens, dictate1-on-list returns to the lines 762 shown in FIG. 34, which simulate recognition of the expected word "did", hilite the next word "Alice", and then wait for the user to say that word with the screen appearing as shown in FIG. 58. When the user says "Alice", the call to dictate 1-no-error in line 766 causes the screen to look as in FIG. 59 and causes the system to wait for the next hilited word "think". When the user says "think", line 768 causes the screen to have the appearance shown in FIG. 60 and then waits for the user to say "it".

When the user says "It", however, line 770 calls the dictate 1-on-list lesson 740, described above with regard to FIG. 35. Line 740 of that lesson simulates a dictation error and advances the hilite to the next word. In the example shown, it is assumed the program again randomly chooses to place the expected word "it" in the third slot of the choice window, and it treats the best scoring word returned by the recognizer other than "it" as the best scoring word Then in the example, line 740F waits for the user to say "choose 3" with the screen appearing as in FIG. 61.

In our example, however, the user makes to common mistake of failing to correct the simulated error, and instead says the hilited word "so" in the prompt window. In this case, the previous entry of the currently hilited word in the Cases section 476 of the Event Stack by the line 740C causes the function associated with that entry to be executed, which, in this case, is a jump to the d1on-say-choose-n lesson 746 described above. In this case, since it is the user's first call to this lesson, the test on line 746A of d10n-say-choose-n fails and the long message associated with 746B appears on the screen as is shown in the window 778 in FIG. 62. This text explains that the user has failed to correct a recognition error, and states that if such failures are not corrected DragonDictate's performance will degrade. It then instructs the user how to properly correct the simulated mistake by saying the word "choose 3". Then line 746D removes current word's entry from the Events Stack so the user will not repeatedly be sent a similar error message if he continues to repeat the word "so". Then line 746E performs a RETURN REPEAT, which causes the EXPECTING line 740F to be repeated; causing the system to again wait for the user to say "choose 3". When he does so, the line 740G selects that word, causing its text to be inserted into the simulated text editor in place of the misrecognized word and the choice window to be removed. When this is done, the screen has the appearance shown in FIG. 63.

In the example just given from Chapter 7 of the tutorial, all of the misrecognitions occurred for predetermined words in the prompt window. Later in the tutorial, however, more sophisticated lessons from the dictation module 466A of the lesson file are called to make the occurrence of simulated misrecognitions more random and more natural.

One such dictation lesson is the dictate3-random lesson 779, shown in FIG. 35. This dictation lesson is called in Chapters 11 and beyond in the tutorial. Most of the "dictate3- . . . " and "d3- . . . " lessons allow users to correct simulated misrecognition by either the CHOOSE or OOPS commands. They normally handle two words in the prompt window each time they are called. That is, they normally either simulate correct or incorrect recognition of the last uttered word in the prompt window (word 1 ), wait for the user to say the next word in the prompt window (word 2), simulate correct recognition on that next expected word (word 2), prompt the user to say the next word in the prompt window (word 3 ), and get the utterance for that word (word 3 ). This is done to insure that simulated misrecognitions will never occur for two words in the prompt window in a row, since most of the "dictate3-" and "d3-" lessons are only designed to handle situations in which there is only simulated error in the oops buffer at a time, either in its most recent or second most recent entry. With these dictation lessons the user has the option of either correcting a simulated misrecognition by use of a CHOICE command as soon it has been represented on the screen or by use of an OOPS command after the next word is recognized. But, except in a couple special instances, if the user fails to correct the simulated mistake before speaking the second word in the prompt window after the word for which the misrecognition was simulated, the system will send him a message or help window informing him of his failure to correct the mistake.

Line 779A of the dictate3-random lesson jumps to the dictate3-no-error lesson if the last recognized utterance had an expected word which was a shortword, which has been defined as a word with three or fewer characters, a punctuation mark, or a word containing capital letters. This is done to prevent simulated misrecognitions on punctuation marks, because people are less likely to know how to pronounce punctuation marks and because the appearance of both the punctuation mark and its name on the choice menu confuses people. Line 779A prevents simulated misrecognitions on words with three or fewer characters because the parts of the tutorial which use this dictation lesson simulate the alphabetic filtering error correction in the actual recognizer which lets users limit the best scoring words returned by the recognizer to words which start with a given sequence of letters. For purposes of simplification, the simulated alphabetic filtering in the tutorial assumes that the word being sought includes more than three letters. Line 779A prevents simulated misrecognitions on capitalized words because the choice menu does not come up with capitalized versions of most common nouns, which confuses some users, and for purposes of simplification.

Dictate3-no-error will simulate correct recognition of the last utterance as well as of the next. Line 779B jumps to dictate3-no-error fifty percent of the time. Line 779C jumps to d3-error if the last hilited expected word was not selected as the best scoring word against the last utterance by the recognizer, indicating that it would have been misrecognized if spoken when using DragonDictate with another DOS program. As is shown on lines 779F-H, lesson d3-error jumps to dictate3-on-list, which simulates a misrecognition with the expected word on the choice list, sixty percent of the time, and to dictate3-off-list, which simulates a misrecognition with the expected word not on the choice list, the remaining forty percent of the time. If line 779C does not jump to dictate3-no-error, line 779 jumps to d3-error, which simulates an error, five percent of the time. If the program gets to line 779, it jumps to dictate3-no-error, which simulates correct recognition.

Thus dictate3-random seeks to insure that three out of four prompt window words have correct recognition simulated; that misrecognition is simulated in the other one out of four such words if a misrecognition would have occurred in DragonDictate; and that at least one out of forty such words will have a simulated misrecognitions, even if the recognizer is correctly recognizing all such words as the best scoring word.

As the above example shows, the Tutorial provides an effective means for instructing the user how to use a speech recognition system, while at the same time reliably obtaining tokens from the user which can be used to improve the recognizer's performance. The Tutorial performs adaptive training while it is operating, so that the user's response becomes increasingly more reliable during the Tutorial itself. Since many of the Tutorial's expected words are error correction commands, it normally does a good job of training up recognition models for those commands. The CHOICELIST ?={CURWORD} of line 740A in the dictate1-on-list lesson randomly varies the number of "?" in the expected "choose ?" command so the system will get training tokens for most, if not all of the very commonly used "choose ?"0 commands. As was described above with regard to FIG. 18, when the user is done performing the instructional chapters of the Tutorial, he or she is then given the option of performing batch training on the tokens which have been obtained and labeled by the Tutorial. This results in even better recognition performance.

It should also be understood that the Tutorial provides instruction about many other types of commands used with the recognizer besides the "choose ?" command used with the alternate choice window. For example, in Chapter 8, the user is instructed how to use the "Choose 10" command to remove a misrecognized word and its associated choice list window, when the desired word does not occur on the choice window at all. Chapter 9 explains how a user can use spelling commands to re-run recognition on a given utterance with the vocabulary limited to word candidates starting or ending with combinations of letters entered by the user. Chapter 10 tells the user how to add new words to the recognizer. Chapter 11 instructs the user how to use the Oops Subroutine, described above with regard to FIG. 7. Chapter 12 tells the user how to enter dates, numbers and addresses in the dictation system. Chapter 13 instructs the user how to save vocabulary files. In most of these chapters, the user is not only given instructions on how to perform a given function, but also is given exercises which lets the user perform the function in a situation which simulates using it in DragonDictate. This not only makes the training more interesting, but it also makes it more useful to users. In addition, it causes the utterances of both normal words and commands obtained for training purposes to more reliable, since they are more likely to be spoken in the same way they will be spoken when actually using the DragonDictate Program.

Referring now to FIGS. 22 through 25, a more detailed description will be given of the Context Language Model, described above briefly with regard to step 396 in FIG. 5.

FIG. 23 describes a Build Context Program 188 used to initially build the Context Language Model. When it is first loaded, step 800 prompts the user to specify one or more files whose text is to be used to develop the Context Language Model. Then step 802 allows the user to enter a list of file specifications, each of which can contain wild card characters enabling multiple files with similar names to be specified at once. Once the user has specified a list of one or more files, step 804 loops to perform the steps 806, 808, and 810 for each such file in that list. The first step of this loop, Step 806, dears the File Word List 190 which is to be used for the current file of the current pass through the loop 804. As shown in FIG. 22A, this list contains a list of words 816 which occur in the file, and, for each such word, a count 818 of the number of times it occurs in the file.

Then step 808 performs step 812 for each successive word read from the current file. Step 812 tests to see if the current word is in the recognizer's basic vocabulary. The basic vocabulary represent words which tend to occur in most contexts. For example, in a version of DragonDictate which can have up to 30,000 words active at one time, the basic vocabulary could comprise the 10,000 most common words derived from a large body of dictation text. This would leave 20,000 words which could be filled by various different context vocabularies at any given time. If step 812 finds that the current word is in the base vocabulary, it skips it, since the base vocabulary will always be loaded and, thus, there is no point in also including the word in the vocabularies associated with different contexts. If step 812 finds the current word is not in the basic vocabulary, step 814 and 820 are performed. Step 814 tests to see if the current word is already in the File Word List. If not, it makes an entry 816 in that list for the word. It also has the count 818 associated with that word set equal to one, since this is the first occurrence of the word in the current file. If step 814 finds the word is already in the File Word List, step 820 adds one to the word's count 818.

Once step 808 has been performed for each word in a file, step 810 is performed for that file. This step 810 performs steps 822, 824 and 826 for each word contained in the File Word List 190 produced by loop 808. Step 822 tests to see if the current word from the File Word List is already in the Same Document Word List 192.

FIG. 22 shows the structure of this list. It contains a word ID 828 for each word in the list, a count 830 for each such word, indicating the number of occurrences of that word, and an Other Word List 832 for each such word 828 in the Same Document Word List. This Other Word List includes a list of all the other words 834 which have been included in the same document as the word 828, and for each such other word the count of the number of times it has occurred in the same document as the word 828. The purpose of the step 810 is to update the Same Document Word List to reflect which pairs of words have occurred together in the current file of loop 804.

Returning now to FIG. 23, if the test in the step 822 finds that the current word in the File Word List does not already occur as a word entry 828 in the Same Document Word List, that step will add that word to the list as such an entry, and set its count value 830 equal to its count 818 from the File Word List. If, however, the current word already has an entry 828 in the Same Document Word List, step 824 will add its count 818 from the current File Word List to the count 830 in the Same Document Word List 192. Once steps 822 or 824 create or update the current word's entry 828 in the Same Document Word List, step 826 performs steps 838 and 840 for each other word, besides the current word, which occurs in the File Word List. Step 838 tests to see if that other word is already in the Other Word List 832 for current word. If it is not, it adds the other word for which the loop 826 is being performed to that other list 832 with a count equal to its count in the File Word List. If the other word is already in that Other Word List, step 840 adds its count 818 to the count 836 in the current word's Other Word List. Once step 810 has been performed for a file, it can be seen the Same Document Word List will have been updated to take into account all the joint occurrences of words within the same file which occurred for the current file of the loop 804.

Figure 64:
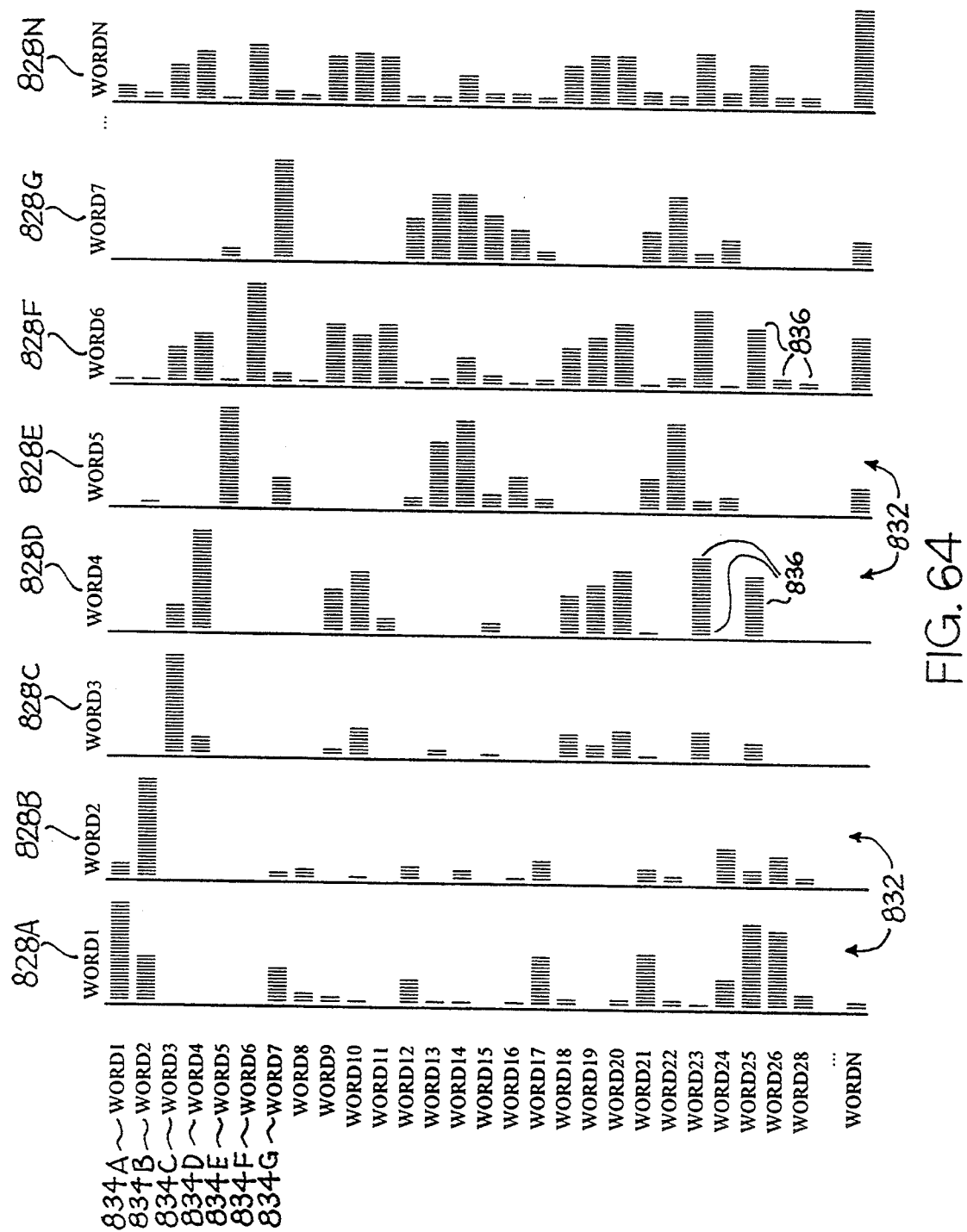
FIG. 64 is a schematic representation of a plurality of other—word—lists which are clustered into contexts by the Build Contexts Program of FIG. 23.

Once the loop 804 has updated the Same Document Word List for each of the files specified by the user in step 802, the program advances to a step 842, which clusters the Other Word List 834 contained within the Same Document Word List into clusters which we call "contexts". This is indicated in FIG. 64, in which the Other Word Lists 832 for each of a plurality of words 828 are indicated as vectors in which the counts 836 associated with each other word 834 are indicated by a bar graph. It will be appreciated, however, that a list structure is actually used to store this information since only a small percent of the words contained in the entries 828 in the Same Document Word List will occur each Other Word Lists 832. The step 842 clusters the word lists using well-known mathematical clustering techniques which have the affect of grouping together the Other Word Lists 832 whose distribution of count values are similar. For example, in the case shown in FIG. 64, the clustering would group the Other Word Lists associated with the words 828A and 828B into one cluster, those associated with 828C, 828D, 828F and 828N into another, and those associated with 828E and 828G into a third. Each of the Other Word Lists group into a context have a similar distribution of other words 834 with which they occur, meaning that the words 828 for which those Other Word List were made tend to occur in the same linguistic context. The clustering forms a composite Other Word List which has a count for each word 834 which is the mean of the values 834 for that word in all the Other Word Lists grouped into that cluster.

FIG. 24 shows the Context Language Model. Once clustering has been performed in step 842, steps 843 and 846 of FIG. 23 fill in the fields of this model. The Context Language Model includes for each of the contexts derived by the clustering step 842 an ID 852 for that context 852 and a Moving Average Score 854. As will be described in FIG. 25, the moving average score is used to indicate whether a given context should be called into memory given the words which have recently been recognized by DragonDictate. The Context Language Model also includes a Context's Word List 856 for each context, which lists each of the words 858 contained in that context's current subvocabulary. The model also includes, for each context a Last Loaded Word Pointer 860, which indicates which of the context's vocabulary words 858 are currently loaded in memory. The Context Language Model also includes a Word's Context List 862, which includes for each word in the total vocabulary its word ID 866, and, for each context 852 stored in the Context Language Model, an ID 869 for that context, an If Word Context Score 870 and an If Context Word Score 872. The If Word Context Score 870 indicates the probability that the context will be invoked if a given word is recognized, and the If Context Word Score indicates the probability that a given word will be recognized when the Context is active.

Returning to FIG. 23, after step 842 has clustered each of the Other Word Lists 832 into groupings or contexts, step 843 performs a step 844 for each context produced by the clustering. Step 844 places each word in the composite Other Word List produced for the cluster into the Context Language Model's Context's Word List 856 for that context 852. It only places such words into the Context's Word List which have a count above a given level, to prevent context vocabularies from including words whose association with that context is weak.

The for loop 846 builds the Word's Context List 862 in the Context Language Model. It performs a step 847 and 848 for each word 828 in the Same Document Word List. Step 847 creates an entry in the Word's Context list 862 for the current word, Then step 848 performs steps 849, 850, and 851 for each context in the Context Language Model. Step 849 creates an entry in the list of contexts for that word. Step 850 assigns If Word Context Score 870 to that entry, representing the conditional probability of subsequent words within the context being recognized if the current word 866 has been recognized in the current document. This is derived from the Same Document Word List 192 based on the ratio of A) the total of the counts 836 for all word is in the current context in the Other Word List 832 of the current word 828 for which loop 846 is being performed, to B) the total of the counts 836 for all words 834 in that Other Word List for the current word.

The step 851 computes the If Context Word Score 872 for the current word and current context. This represents the conditional probability of the current word being recognized if words of the current context have previously been recognized. This value is defined by the ratio of a) the total of the counts 836 which have the current word as the other word 834 in all Other Word List 832 for all words 828 in the current context's sub-vocabulary 856, to b) the total of all counts 836 of all words 834 in the Other Word Lists associated with the all such words 828 in the current context's sub-vocabulary.

FIG. 25 describes the Update Context Language Model Subroutine 158. As is stated above in FIG. 5, this subroutine is called by step 396 for each utterance upon which adaptive training is to be performed. This subroutine adaptively updates the context language model in response to successive recognitions. It also causes sub-vocabularies associated with various contexts to be swapped in and out of memory as a function of whether or not words associated with those contexts are being recognized.

After the Update Context Language Model Subroutine 158 is called, step 890 adds the first choice word with which the subroutine has been called to a 1,000 word buffer, representing the last 1,000 words with which the subroutine has been called. Step 892 tests to see if the current call to the subroutine causes the total count of such words which have been added to the buffer in the current session of DragonDictate to be an even multiple of 500. If so, loop 894 performs a step 896 for each word in the 1,000 word buffer.

Step 896 performs a step 898 for each context in the Context Language Model. Step 898 updates the given word's If Word Context Score 870 for the current context for which the loop 896 is being performed. This is done as a function of the ratio of the number of occurrences of context words to all other words in the 1,000 word buffer. It should be appreciated that in other embodiments this updating could be done as a ratio of the number of occurrences of context words to all other words in the current document. But since DragonDictate currently has no method for knowing which document it is being used in conjunction with, step 898 attempts to simulate data on what words occur in the same document together by basing updates on which words occur within the 1,000 most recently dictated words.

Once the loop 894 has updated all the If Word Context Scores, step 900 performs a step 901 for each for each active context, that is, each context which has part of its associated sub-vocabulary loaded in memory. Step 901 performs a step 902 for each word 866 in the Context Language Model's Word's Context List 862. Step 902 updates the current word's If Context Word score 872 for the current currently active context to reflect a the ratio of the occurrences of the current word in the 1,000 word buffer to all the words in that buffer, all multiplied by the current Moving Average Score of that currently active buffer.

Regardless of whether step 892 decides to update If Context Word Scores and If Word Context Scores, each call to the Subroutine of FIG. 25 advances to step 904, which performs a loop which performs step 906 for each context. Step 906 updates the context Moving Average Score 854 as a function of the If Word Context Score for the current context of the word for which the subroutine of FIG. 25 has been called. This updating uses a moving average weighting, so that the Moving Average Scores tend to weight the If Word Context Scores as a function of how recently their associated words were spoken.

Once this loop has updated the Moving Average Score of each context, step 908 performs a loop for each context is not fully loaded in the memory of the recognizer and which has a better Moving Average Score than any other context which is partially loaded. This loop is performed for contexts having the best Moving Average Scores first. It performs steps 909, 910, and 912 for each such context.

Step 909 reorders the Context's Word List 856 for the current context by the If Context Word Scores of the words of the context's associated sub-vocabulary, so that the words which occur most often in those contexts are listed first. Step 910 loads the current, not fully loaded, context from hard disk into a RAM buffer, so that the program doesn't have to do a separate disk access for each subsequent pass through the Unload Loop in step 914. Then step 912 performs a load loop, which repeatedly performs the Unload Loop 914 for each other partially loaded context whose Moving Average Score is worse than the current better scoring context for which the loop 908 is being performed.

The Unload Loop 914 repeats steps 916, 918, 920 and 922 until it is exited from within. Step 916 unloads the last loaded word in the poorer scoring context; that is, the word pointed to by the Last Loaded Word Pointer 860. Since the word associated with each context are ordered by the step 902, before being loaded into memory, as described above, this pointer points to the worst scoring word in the context whose words are being removed from memory. Then step 918 loads the next unloaded word in the context being loaded which is pointed to by its Last Loaded Word Pointer 860. This is the best scoring word in the context to be loaded which is currently not yet in memory. Then step 920 tests to see if all of the words in the context being removed have been unloaded. If so, it exits the Unload Loop, which causes the Load Loop 912 to start unloading words from the next poorest scoring context which currently has words in memory. If the test in step 920 is not met, the program advances to step 922, which tests to see if the context which is being loaded is fully loaded. If so, it exits the Load Loop 910, which causes the loop 908 to see if there are any other contexts which are not fully loaded which contain Better Moving Average scores than any other context which is partially loaded. If so, the steps 910 and 912 will be repeated again.

Thus, each time the Update Context Language Model Subroutine is called, the Moving Average Scores for each context are adjusted to reflect the recognition of the word for which that subroutine is called. If this causes the Moving Average Scores of a context which is not fully loaded to be better than that of one which is, it will cause the words of that better scoring subroutine to replace all of those of a lesser scoring subroutine. This context language model scheme enables a recognizer which only has the memory, or computational capability, to perform recognition against a given number of words to act as if it has the capability to recognize against a much larger vocabulary, by automatically switching in and out of memory word models as a function of the context which a user is currently dictating about. For example, if a user starts dictating a large number of medical terms, the Update Context Language Model Subroutine will swap into memory one or more context sub-vocabularies involving medical terms. Similarly, if a person starts dictating words which relate to a given company with which he or she has had extensive relations, the Update Context Language Model Subroutine would tend to swap into memory contexts involving the names of the people, places and things which he commonly uses in communications involving that particular company.

In some embodiment of the invention, the If Context Word Scores calculated in the Build Context Program and those created or updated by the Update Context Language Model Subroutine are used as language models scores which are combined with recognition scores by the recognizer to help the recognizer more accurately recognize words. As is stated above in the Background Of The Invention, traditional digram language models tend to consume vast amounts of memory if they are to be provided for each word in a large vocabulary recognizer. For this reason, it is common in large vocabulary recognizers to only include such digram language models for more common word pairs. The If Context Word Scores enable context dependant language model information to be provided for each word in an extremely large vocabulary speech recognition system without consuming nearly so much memory. This is because the total number of such scores required is only equal to the number of vocabulary words times the number of contexts. This number is much lower than the complete digram language model which would require a score for the square of the number of the words in the vocabulary.

It should be understood that the foregoing description and drawings are given merely to explain and illustrate and that the invention is not limited thereto except insofar as the interpretation of the appended claims are so limited. Those skilled in the art who have the disclosure before them will be able to make modifications and variations therein without departing from the scope of the invention.

For example, as is well known in the art, the broad functions described in the claims below, like virtually all computer functions, can be performed by many different programming and data structures using many different structural and sequential organization.

Furthermore, it should be understood that the invention of the present application is not limited to operation upon IBM compatible computers or to use with the DragonDictate Speech Recognition System described herein. It clearly could be used with any of the broad variety of computing systems capable of performing speech recognition and it could be used with a broad variety of speech recognition systems. For example, many of its features are not limited to use with large vocabulary speech recognition systems, and could as well be used with systems designed for use with smaller number of words.

It should be understood, that the present invention could be used with speech recognition systems which use other types of schemes for representing utterances to be recognized and for representing models of vocabulary words. For example, it is common in other speech recognition systems to use different numbers and types of parameters than those described with regard to the DragonDictate System.

It should also be understood that the present invention could be used with other types of user interface features than those of the DOS interface described above. For example, the features in the invention would be well suited for use in a graphical user interface, or even interfaces which provides only audio output.

It should be understood that many variations in the context language model scheme described above could be used. For example, refinements well known in the mathematical and statistical arts could be used, such as normalizing and weighting values to reflect different amounts of data which have been used in deriving different statistical information. It should also be appreciated that a scheme could be derived which would automatically create contexts as dictation progresses, rather than requiring the use of the initial Build Contexts Program, using the mathematical principles similar to those described above. It should also be understood that users could create a program which would load the words of various context subvocabularies in relative proportion to the ratio: of their moving average scores. It should also be understood that the If Context Word Scores 870 shown in FIG. 24 can be used to indicate, based on the updating resulting from use, to cause words to be added to or subtracted from a given context. In other embodiments of the context language model invention, users could use different groups of text files or different dictation to train specific contexts In that case, a word list similar to the File Word List 190 shown in FIG. 22A could be created for all the files used to train that context, and that word list could be treated by a program similar to the build context program as if it were the Other Word List of a cluster produced by the step 842. It should also be appreciated that other divisions besides files could be used to train up contexts, such as paragraphs rather than whole files. It should also be understood that many different forms of clustering could be used when building such context language models.

It should be understood the invention has many features which are not limited to speech recognition. For example, the invention's schemes for training recognition systems how a user represents words (and by "word" we many virtually any symbol) and for teaching the user how to use such a system are applicable to other types of word recognition systems. This includes handwriting recognition systems and gesture recognition systems.

What we claim is:

1. A method for instructing a user how to operate a word recognition system which recognizes which word, from an active vocabulary of possible words, appears to most closely match each of a plurality of user generated signals, including how to operate that system to perform a recognition task which uses an active vocabulary of N or more words, said method comprising the steps of:

defining a state machine having a plurality of states and a set of one or more allowed response words for each such state and associating with each such response word a new state which the state machine will enter in response to the recognition of a user generated signal as that response word, with the number of allowed response words associated with each such state being substantially less than N;

when said state machine is in each of a first set of said states, sending a user one or more instruction messages associated with that state to teach the user how to use the recognition system;

when said state machine is in states of a second set of said states, presenting the user with recognition exercises which simulate use of the recognition system for said task which uses a vocabulary of N or more words, but which prompts the user to produce a user generated signal representing a word corresponding to one of the smaller number of response words allowed for the current state of said second set;

when said state machine is in each of said states, using an automatic signal matching means to score closeness of matches between a user generated signal and models for each of a plurality of words, including at least the response words allowed for that state; and responding to the scores produced by said matching means to select which of the response words allowed for the current state probably corresponds to the user generated signal for that state and advancing the state machine to the state associated with that selected response word;

whereby the user can progress through a succession of said states, to receive a corresponding succession of instruction messages and exercises, selected in response to the scoring of his or her user generate signals against allowed response words.

2. An apparatus for instructing a user how to operate a speech recognition system which recognizes which word from an active vocabulary of possible words appears to most closely match each of a plurality of user generated utterances, and for instructing the user how to operate that system to perform a speech recognition task which uses an active vocabulary of N or more words, said apparatus comprising:

state means for advancing through a successions of states, said state means including:

means for specifying a set of one or more allowed response words for each such state and for associating with each such response word a new state which the apparatus will enter in response to the recognition of an utterance as that response word, with the number of allowed response words associated with each such state being substantially less than N;

means, operating when said state means is in each of a first set of said states, for sending a user one or more instruction messages associated with that state to teach the user how to use the recognition system; and means, operating when said state means is in states of a second set of said states, for presenting the user with recognition exercises which simulate use of the recognition system for said task which uses a vocabulary of N or more words, but which prompts the user to speak a word corresponding to one of the smaller number of response words allowed for the current state of said second set; and matching means operable when said state means is in each of said states for scoring closeness of matches between a user generated utterance and models for each of a plurality of words, including at least the response words allowed for that state; and wherein said state means further includes response selecting means responsive to an indication by said matching means that an utterance matches a response word allowed for the current state by selecting that response word as recognized and advancing the state means to the state associated with that response word;

whereby the user can progress through a succession of said states, to receive a corresponding succession of instruction messages and exercises, selected in response to the scoring of his or her user generated utterances against allowed response words.

3. Apparatus for instructing a user as in claim 2, wherein:

said means for specifying a set of response words specifies less than one hundred response words in certain states;

when the apparatus is in those certain states, said matching means scores user utterances against models for each word in a large vocabulary of over one thousand words; and said response selecting means includes means for determining whether or not a given response word is to be selected upon the number of words from said large vocabulary, including words other than currently allowed response words, which said matching means indicates score better against said utterance than that given response word.

4. Apparatus for instructing a user as in claim 2, wherein:

the word models used by said matching means are each comprised of one or more models of acoustic features associated with that model's corresponding word; and said apparatus further includes means for deriving information from an utterance which said response selecting means selects as being recognized as a given response word and for incorporating that information in models of acoustic features associated with said response word.

5. Apparatus for instructing a user as in claim 4, wherein:

said speech recognition system has word models for more words than are represented by the response words of said apparatus for instructing; and said models of acoustic features used in the word models of said response words are used to represent similar speech sounds in the word models of different words, including words other than said response words, used in said speech recognition system;

so that said means for deriving information from an utterance selected as being recognized as a given response word and for incorporating that information in models of acoustic features associated with that response word also, in effect, causes that information to be incorporated into the word models of other words which include the same models of acoustic features as does the given response word, including word models used by said speech recognition system.

6. Apparatus for instructing a user as in claim 4, further including means for prompting the user to repeat an utterance when the state means is in a given state one or more times when said score produced by said matching means for one or more utterances made by the user in that state and each of the allowed response words for that state is worse than a given amount.

7. Apparatus for instructing a user as in claim 6, wherein said means for prompting includes:

means for responding to the first utterance in a given state for which all the scores for allowed response words are worse than said given amount by prompting the user to repeat his last utterance without explicitly saying what that utterance should be; and means for responding to successive utterances in said given state for which all the scores for allowed response words are worse than said given amount by explicitly prompting the user to say a particular word.

8. Apparatus for instructing a user as in claim 6, wherein said means for deriving information from an utterance and for incorporating that information in models of acoustic features includes means, operable when said means for prompting prompts the user to repeat an utterance successive times in said given state, for comparing the acoustic features of resulting successive utterances which score worse than a given amount against the allowed responses for that state, for selecting those of such successive utterances whose acoustic features are most similar and for using acoustic information from those selected utterances for incorporation into the models of acoustic features associated with one of the response words for that given state.

9. An apparatus as in claim 2 wherein:
said means for specifying a set of one or more allowed response words includes means for specifying a word as an expected word for each of certain of said states; and
said means for presenting the user with recognition exercises includes scripting means for explicitly indicating that the user is to say the word which is currently the expected word.

10. An apparatus as in claim 9 wherein:
said matching means include means for receiving tokens, that is, acoustic descriptions, of each of a succession of said utterances said matching means scores against word models;
said apparatus further includes means for responding to a score of an utterance against the currently expected word by incorporating information from the token of that utterance into an acoustic model of speech sounds contained in that expected word, which acoustic models are of a type that can be used in the speech recognition system which the apparatus is instructing the user to operate.

11. An apparatus as in claim 10 wherein:
said means for specifying a set of one or more allowed response words includes means for specifying as allowed response words a set of one or more command words for each of certain of said states, in addition to the expected word specified for each such state, and means for associating a function with each of said command words;
said matching means includes means for scoring user utterances made when the state means is in a given state against models of each of said expected words and said set of one or more command words, if any, specified for that state; and
said state means includes means responsive to an indication by said matching means that an utterance spoken by the user matches one of said command words by performing that command word's associated function.

12. An apparatus as in claim 2 wherein:
said means for specifying a set of one or more allowed response words includes means for specifying a set of one or more common mistake words for each of certain of said states, and means for associating one or more mistake messages with each of said common mistake words;
said matching means includes means for scoring user utterances made when the state means is in a given state against models of each of said expected words and said set of one or more common mistake words, if any, specified for that state and
said state means includes means responsive to an indication by said matching means that an utterance spoken by the user matches one of said common mistake words by sending one of said mistake messages associated with that common mistake word.

13. Training apparatus for helping a user improve his or her use of a word recognition system, which recognition system scores matches of signal models for each of a plurality of words against each of a succession of user generated signals; which recognition system produces a succession of outputs corresponding to the succession of user generated signals, each such output representing as the recognized word the word whose signal model scored best against the corresponding one of said user generated signal, with such an output being considered a mis-recognition when that output represents as the recognized word a word other than that actually represented by the output's corresponding user generated signal and which recognition system responds to the receipt of a correction command from a user when a mis-recognition has occurred by correcting that mis-recognition, that is, by changing the mis-recognition's output to remove the representation as the recognized word of a word other than that actually represented by that output's corresponding user generated signal; said training apparatus comprising:
means for instructing the user to generate a user generated signal for each of a corresponding succession of expected words;
training output means for responding to the user's successive generation of said user generated signals by producing a corresponding succession of outputs, some of which represent as the recognized word the expected word corresponding to the output's user generated signal, and some of which represent a simulated mis-recognition of that expected word by representing as the recognized word for the output's user generated signal a word other than that signal's corresponding expected word;
means for receiving a correction command from a user indicating that the user desires to correct such a simulated mis-recognition when that mis-recognition has occurred and for responding to the receipt of such a correction command by changing the mis-recognition's output by removing that output's representation as the recognized word of a word other than the output's corresponding expected word; and
correction monitoring means for monitoring whether or not the user responds to a simulated mis-recognition by entering a correction command to correct that mis-recognition and for providing an output to the user to notify him or her when he or she fails to correct such a simulated mis-recognition.

14. Training apparatus as in claim 13, wherein:
said word recognition system which the apparatus helps a user improve his or her use of is a speech recognition system; and
the user generated signals which the means for instructing instructs the user to generate for each expected word are spoken utterances of that word.

15. Training apparatus as in claim 13, further including:
matching means for scoring closeness of matches between each user generated signal and pattern information representing that user generated signal's corresponding expected word and for producing a score representing the closeness of each such match; and means, responsive to the production by said matching means of a score for the match of a given user generated signal against that user generated signal's expected word which is above a given level, for incorporating information from that user generated signal into the pattern information representing that expected word.

16. Training apparatus as in claim 13, wherein:

said word recognition system which the training apparatus helps a user to improve his or her use of includes:

recognition output means for producing said system's succession of outputs, including means for producing an output for each user generated signal which includes an alternate choice menu which lists one or more alternate choice words, that is, words other than the word selected as the recognized word for that user generated signal whose signal models also scored well in said matches against that user generated signal; and means for receiving as one of said recognition system's correction commands a choice command in association with a given output selecting a word on that output's alternate choice menu; and means for responding to the receipt of such a choice command for a given output by changing the recognized word represented by that output to be the word on the alternate choice menu selected by that choice command;

said outputs of said training output means which represent recognitions and mis-recognitions of said expected word both include simulations of such alternate choice menus, with certain outputs which represent said simulated mis-recognitions including alternate choice menus which have the expected word listed as an alternate choice word;

said training apparatus's means for receiving a correction command includes receiving a choice command like that used by said recognition system; and said correction monitoring means monitors whether or not the user responds to a simulated mis-recognition which lists the expected word as an alternate choice by entering a choice command which selects the expected word.

17. Training apparatus as in claim 16, wherein:

said alternate choice menus produced by both said recognition output means and said training output means list alternate choice words in an order;

said choice commands used in both said word recognition system and said training apparatus include separate choice commands for selecting words at different places in the order of alternate choice menus;

said training output means includes means for causing the outputs which represent mis-recognitions to place the expected word in different locations in the alternate choice menu order on different simulated mis-recognitions; and said correction monitoring means monitors whether or not the user responds to a simulated mis-recognition which lists the expected word as an alternate choice at a given position in the order of an alternate choice menu by entering a choice command which selects the expected word's place in that order.

18. Training apparatus as in claim 13, wherein:

said correction commands which are responded to by said recognition system include user generated signals which said recognition system scores matches of against signal models for each of a plurality of words, including signal models representing such correction commands;

said recognition system responds to one of said correction commands as having been received when the score of the match between a user generated signal and the model representing that correction command receives a score above a certain level;

said training apparatus's means for receiving a correction command includes means for receiving substantially the same user generated signals to represent correction commands as are used by said recognition system, means for scoring matches of said user generated signals against signal models for each of a plurality of words, including signal models representing such correction commands, and correction command detecting means for responding to one of said correction commands as having been received when the score of the match between a user generated signal and the model representing that correction command receives a score above a certain level; and said training apparatus further including means for deriving information from a user generated signal responded to by said command detecting means as a given correction command and for using that information in a signal model of that correction command which is suitable for use in said recognition system.

19. Training apparatus for helping a user improve his use of a word recognition system, which recognition system includes means for matching signal models for each of a plurality of words against a succession of user generated signals which the user intends to represent words and recognition output means, responsive to the results of the matching for each successive user generated signal, for producing an output indicating the word selected as most likely to correspond to that user generated signal, said training apparatus comprising:

means for prompting the user to generate a user generated signal for each of a corresponding succession of expected words;

means for receiving each such user generated signal;

means for deriving information from each such user generated signal for use in a signal model for that user generated signal's corresponding expected word; and training output means for responding to the user's successive generation of said user generated signals by successively producing outputs which are similar to those said recognition output means would produce in response to the user generated signals corresponding to said expected words.

20. Training apparatus as in claim 19, further including:

recognition means for recognizing the words which user generated signals represent by scoring matches of such user generated signals against signal models representing a plurality of individual words, including that user generated sugnal's associated expected word; and means, responsive to a score of a given user generated signal against the signal model of that user generated signal's corresponding expected word which is above a given level, for incorporating information from that user generated signal into a signal model of that expected word suitable for use in said word recognition system.

21. Training apparatus as in claim 19, further including means for responding to certain of said user generated signals by providing the user with instruction messages which explain how to use the word recognition system, said messages being in addition to said prompting to generate said user generated signals for each of said succession of expected words.

22. Word recognition apparatus comprising:
input means for receiving successive user generated signals, each of which represents a word to be recognized;
means for storing a signal model for each word of a vocabulary of at least two thousand words;
matching means for scoring a match between each such user generated signal and the signal model of each word of said vocabulary;
word selecting means for selecting a word from a currently active subset of said vocabulary having less than five hundred words as the recognized word, that is, as the word considered most probably corresponding to a given user generated signal, said word selecting means including means for selecting a word from said currently active subset as the recognized word for the given user generated signal even if that word does not have the best scoring signal model against that user generated signal, provided no other word of said currently active subset has a better scoring signal model and provided that the number of other words of said vocabulary whose signal models have better scores is below a given number.

23. Word recognition apparatus comprising:
input means for receiving successive user generated signals from a user, each of which represents a word to be recognized;
means for storing a signal model for each of a plurality of vocabulary words;
recognition means for scoring a match between each such user generated signal and each of a plurality of said signal models, and for selecting the word associated with the signal model which scores best against each user generated signal as the recognized word for that user generated signal;
adaptive training means for altering the signal models of individual recognized words to take into account information derived from each such individual recognized word's associated user generated signal separately in response to the selection of each of said recognition words; and
batch training means for altering the signal model of each of a plurality of words to take into account information derived from multiple user generated signals for which that word was selected as the recognized word in a multi-word sample of user generated signals, said batch training means introducing such information from multiple user generated signals into that signal model in one training process.

24. A word recognition apparatus as in claim 23, wherein:
said word recognizer is a speech recognizer;
said user generated signals are representations of human utterances; and
said signal models are acoustic word models.

25. A word recognition apparatus as in claim 23, wherein:
said signal models are each comprised of a plurality of features;
said user generated signals are each comprised of a plurality of features; and
said batch training means includes:
mapping means for seeking an optimal mapping between the features of said multiple user generated signals associated with a given recognition word in said multi-word sample and the features of the signal model for that word;
updating means for using information from features in said multiple user generated signals mapped against each of a plurality of features of said signal model for altering that feature; and
iterative means for causing the operation of said mapping means and said update means to be performed repeatedly for the user generated signals and signal models associated with a given recognition word.

26. A word recognition apparatus as in claim 23, wherein said batch training means includes means for comparing user generated signals which have been associated with the same recognition word in said multi-word sample, and for rejecting from use in said batch training means' altering of signal models those user generated signals which differ by more than a given amount from other user generated signals associated with that recognition word.

27. Word recognition apparatus as in claim 23, wherein:
said recognition means includes means for performing said scoring originally against non-user trained signal models, to that is, signal models which have not been trained by said given user;
said adaptive training means includes means for starting said adaptive training for a given user by altering said non-user trained models to take into account said information derived from user generated signals from the given user, so as to cause those models to be at least partially trained by that user.

28. Word recognition apparatus as in claim 27, wherein said batch training means performs said batch training by using user generated signals from said given user to update signal models which have previously been adapted by said adaptive training means from said non-user trained models with information derived from user generated signals from said given user.

29. Word recognition apparatus comprising:
input means for receiving successive user generated signals from a user, each of which represents a word to be recognized;
means for storing a plurality of sets of signal models for each of a plurality of vocabulary words;
recognition means for scoring a match between each such user generated signal and each of a plurality of said signal models, and for selecting a recognized word for that user generated signal based on such scorings;
model set selecting means, including means for causing said recognition means to score one or more of said user generated signals against signal models of each of said sets, for selecting that one of said sets which produces the best scores against said user generated signals, and for causing said recognition means to give more weight to scorings of said user generated signals against signal models of said selected set than to scorings against signal models of any other of said sets.

30. A word recognition apparatus as in claim 29, wherein:
said word recognizer is a speech recognizer;
said user generated signals are representations of human utterances; and
said signal models are acoustic word models;

31. Word recognition apparatus as in claim 29, wherein said means for causing said recognition means to give more weight to scorings of said user generated signals against said selected signal model set includes causing said recognizer only to perform such scorings against signal models from that set.

32. Word recognition apparatus as in claim 29, further including training means for altering said signal models in said selected signal model set to take into account information derived from association of said user generated signals and words select as said recognized words by said recognition means once said recognition means starts giving more weight to scorings of user generated signal against said selected signal model set.

33. Word recognition apparatus comprising:
input means for receiving successive user generated signals from a user, each of which represents a word to be recognized;
means for storing a signal model for each of a set of vocabulary words;
recognition means for scoring matches between each such user generated signal and each of a plurality of said signal models, and for selecting the word associated with the signal model which scores best against each user generated signal as the recognized word for that user generated signal and one or more words, if any, associated with the next best scoring signal models as the alternate choice words for the user generated signal;
output means for producing a user visible output indicating the recognized word and said one or more alternate choice words, if any, corresponding to each of said user generated signals;
wherein said input means further includes means for receiving a choice selection command generated by a user, the sole purpose of which is to specifically select one of the words indicated by the output means for a given user generated signal as the word intended to be represented by that user generated signal; and
training means for altering said signal models to take into account information derived from said apparatus's association of words with said user generated signals, said training means including means for selecting whether or not to take information from a user generated signal for use in altering a signal model as a function of whether or not a choice selection command has been received from the user to select the word intended to be represented by that user generated signal.

34. A word recognizer as in claim 33, wherein:
said word recognizer is a speech recognizer;
said user generated signals are representations of human utterances; and
said signal models are acoustic word models.

35. A word recognizer as in claim 33, wherein said training means includes means for alternately operating in one of two different modes including:
a first mode in which said training means alters signal models to take into account information derived from association of user generated signals with words only when those words have been specifically selected by the user with choice selection commands, and
a second mode in which said training means alters signal models to take into account information derived from association of user generated signals with recognized words selected by said recognition means for user generated signals for which the user did not generate such a choice selection command.

36. Word recognition apparatus comprising:
means for receiving successive user generated signals from a user, each of which represents a word to be recognized;
means for storing a signal model for each word in a vocabulary;
recognition means for scoring matches between each such user generated signal and the signal models for each word in an active subset of said vocabulary, and for selecting one of the words whose signal model has the best score in such matches as the recognized word for the user generated signal;
language model means for storing, for each of a plurality of said vocabulary words, a separate if-word-context score for each of a plurality of context specific subsets of said vocabulary, with each such score indicating the probability that, once that score's associated word has been included in a verbal communication, words in that score's associated context-specific subset will also occur in that verbal communication; and
active vocabulary selecting means for summing, for each of said context-specific subsets, the if-word-context scores associated with the recognized words selected by said recognizer for each of a succession of said user generated signals and for making the words of a given one of said context-specific subsets part of said active vocabulary when the resulting sum of the if-word-context scores for that subset rises above a certain level.

37. A word recognizer as in claim 36, wherein:
said word recognizer is a speech recognizer;
said user generated signals are representations of human utterances; and
said signal models are acoustic word models.

* * * * *